United States Patent
Xin et al.

(10) Patent No.: US 12,414,156 B2
(45) Date of Patent: Sep. 9, 2025

(54) REQUEST TRIGGER FRAME AND TXOP SHARING LAUNCHED BY NON-AP STA

(71) Applicant: SONY GROUP CORPORATION, Tokyo (JP)

(72) Inventors: Liangxiao Xin, San Jose, CA (US); Mohamed Abouelseoud, San Francisco, CA (US)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 17/228,214

(22) Filed: Apr. 12, 2021

(65) Prior Publication Data

US 2022/0053560 A1    Feb. 17, 2022

Related U.S. Application Data

(60) Provisional application No. 63/066,354, filed on Aug. 17, 2020.

(51) Int. Cl.
*H04W 74/0816* (2024.01)
*H04W 28/02* (2009.01)
*H04W 84/12* (2009.01)

(52) U.S. Cl.
CPC ... *H04W 74/0816* (2013.01); *H04W 28/0268* (2013.01); *H04W 28/0278* (2013.01); *H04W 84/12* (2013.01)

(58) Field of Classification Search
None
See application file for complete search history.

(56) References Cited

U.S. PATENT DOCUMENTS

2006/0109857 A1* 5/2006 Herrmann ............... H04L 47/10
                                                     370/412
2012/0327870 A1* 12/2012 Grandhi ................ H04W 74/04
                                                     370/329

(Continued)

FOREIGN PATENT DOCUMENTS

CN    107637157 A    1/2018
CN    108141876 A    6/2018

(Continued)

OTHER PUBLICATIONS

Hsu, U.S. Appl. No. 63/005,491 Provisional Application (Year: 2020).*

(Continued)

*Primary Examiner* — Andre Tacdiran
(74) *Attorney, Agent, or Firm* — O'BANION & RITCHEY LLP; John P. O'Banion

(57) ABSTRACT

A wireless communication apparatus, system or method for operation on a network utilizing CSMA/CA, in which non-AP stations can share their TXOP. After obtaining a TXOP, a non-AP station informs the AP to share the TXOP within its BSS. The AP collects buffer status and the QoS requirements of the buffer from the stations and arranges transmissions during the shared TXOP to satisfy the QoS requirement of the buffer reported by the STAs. The non-AP station can also share its TXOP through the AP using trigger frames or other mechanisms. The AP station may be part of a multi-link device and the AP can arrange transmissions on multiple links of an MLD.

18 Claims, 50 Drawing Sheets

(56) References Cited

U.S. PATENT DOCUMENTS

| | | | |
|---|---|---|---|
| 2013/0028223 A1* | 1/2013 | Kim | H04L 5/0007 370/329 |
| 2014/0119288 A1* | 5/2014 | Zhu | H04W 74/0816 370/329 |
| 2014/0269544 A1* | 9/2014 | Zhu | H04L 1/1671 370/329 |
| 2014/0334387 A1* | 11/2014 | Doppler | H04W 74/0816 370/329 |
| 2015/0071051 A1 | 3/2015 | Zhu | |
| 2015/0172011 A1* | 6/2015 | Aboul-Magd | H04L 5/0007 370/330 |
| 2016/0037553 A1* | 2/2016 | Attar | H04W 74/04 370/338 |
| 2016/0100408 A1* | 4/2016 | Hedayat | H04L 5/0037 370/329 |
| 2016/0227533 A1* | 8/2016 | Josiam | H04W 74/006 |
| 2016/0345362 A1 | 11/2016 | Lee | |
| 2017/0019881 A1* | 1/2017 | Cao | H04W 76/30 |
| 2017/0064708 A1* | 3/2017 | Noh | H04W 74/0816 |
| 2017/0230860 A1* | 8/2017 | Li | H04W 28/0278 |
| 2018/0184401 A1 | 6/2018 | Ghosh | |
| 2018/0376467 A1* | 12/2018 | Patil | H04B 7/063 |
| 2019/0306685 A1 | 10/2019 | Cariou | |
| 2020/0008210 A1 | 1/2020 | Li | |
| 2020/0077350 A1 | 3/2020 | Gidvani | |
| 2021/0076413 A1* | 3/2021 | Lu | H04W 76/15 |
| 2021/0143884 A1* | 5/2021 | Kwon | H04W 74/0816 |
| 2021/0258823 A1* | 8/2021 | Zhu | H04W 72/21 |
| 2021/0266964 A1* | 8/2021 | Lu | H04W 74/002 |
| 2021/0315010 A1* | 10/2021 | Hsu | H04W 74/008 |
| 2022/0053560 A1 | 2/2022 | Xin | |
| 2022/0104071 A1* | 3/2022 | Jauh | H04W 28/085 |

FOREIGN PATENT DOCUMENTS

| | | |
|---|---|---|
| EP | 4165945 A1 | 4/2023 |
| WO | WO-2016028117 A | 2/2016 |
| WO | WO2017209501 * | 12/2017 |
| WO | 2019160489 | 8/2019 |
| WO | WO-2020156591 A1 | 8/2020 |
| WO | WO-2021202372 A1 | 10/2021 |
| WO | WO-2021262654 A1 | 12/2021 |
| WO | WO-2022038445 A1 | 2/2022 |

OTHER PUBLICATIONS

Adhikari, Shubhodeep et al., "Proposals on Latency Reduction", doc.: IEEE 802.11-20/0005r0, Jan. 5, 2020, downloaded from https://mentor.ieee.org/802.11/dcn/20/11-20-0005-00-00be-proposals-on-latency-reduction.pptx, 7 page PowerPoint slide deck.

Baron, Stephane et al., "Triggered P2P transmissions follow up", doc.: IEEE 802.11-20/0813r7, Aug. 31, 2020, downloaded fromhttps://mentor.ieee.org/802.11/dcn/20/11-20-0813-07-00be-triggered-p2p-transmissions-follow-up.pptx, 18 page PowerPoint slide deck.

Das, Subir et al., "Priority Access Support Option for NS/EP Services", IEEE 802.11-20-0463/r3, Jun. 2020, 17 pages.

Anonymous: "Service set (802.11 network)—Wikipedia", Wikipedia, Jun. 16, 2020 (Jun. 16, 2020), pp. 1-6, XP093149506.

Frank Hsu (Mediatek Inc.) "Traffic Indication of Latency Sensitive Application", IEEE 802.11-20/1067r0 , IEEE, Sep. 1, 2020, 8pgs.

* cited by examiner

**FIG. 2A
(Prior Art)**

| Frame Control | Duration | RA | TA | Sequence Control | Data | FCS |

**FIG. 2B
(Prior Art)**

ACK frame

| Frame Control | Duration | RA | FCS |

| 8μs | 8μs | 4μs | 4μs | 8μs | 4μs | | | |
|---|---|---|---|---|---|---|---|---|
| L-STF | L-LTF | L-SIG | RL-SIG | HE-SIG-A | HE-STF | HE-LTFs | Data | PE |

HE-MU: L-STF (8µs) | L-LTF (8µs) | L-SIG (4µs) | RL-SIG (4µs) | HE-SIG-A (8µs) | HE-SIG-B (16µs) | HE-STF (4µs) | HE-LTFs | Data | PE

FIG. 6 (Prior Art)

L-STF (8µs) | L-LTF (8µs) | L-SIG (4µs) | RL-SIG (4µs) | HE-SIG-A (8µs) | HE-STF (8µs) | HE-LTFs | Data | PE

FIG. 7 (Prior Art)

Trigger frame: Frame Control | Duration | RA | TA | Common Info | User Info | ... | User Info | FCS

FIG. 8 (Prior Art)

| Trigger Type | Length | Cascading Indication | CS Required | BW | GI And LTF Type | MU MIMO LTF Mode | Number of HE-LTF Symbols | STBC |
|---|---|---|---|---|---|---|---|---|
| LDPC Extra Symbol Segment | AP TX Power | Packet Extension | Spatial Reuse | Doppler | GI And LTF Type | HE-SIG-A Reserved | Reserved | Trigger dependent common info |

FIG. 9 (Prior Art)

| AID12 | RU Allocation | Coding Type | MCS | DCM | SS Allocation | Target RSSI | Reserved | Trigger dependent user info |
|---|---|---|---|---|---|---|---|---|

FIG. 10 (Prior Art)

| BAR control | BAR info |
|---|---|

MU-BAR variant

FIG. 11 (Prior Art)

| BA frame | Frame Control | Duration | RA | TA | BA control | BA info | FCS |
|---|---|---|---|---|---|---|---|

FIG. 12 (Prior Art)

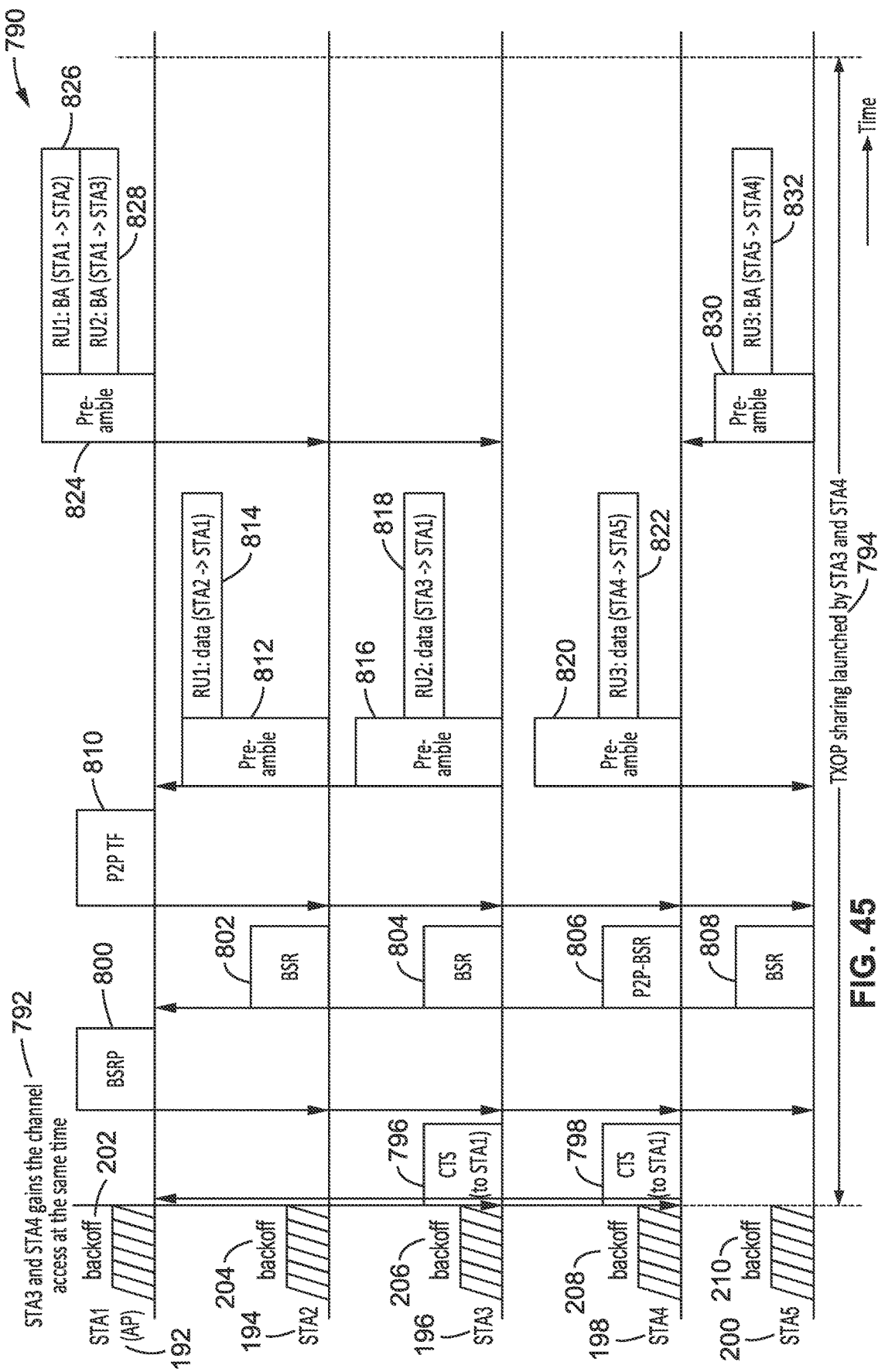

REQUEST TRIGGER FRAME AND TXOP SHARING LAUNCHED BY NON-AP STA

CROSS-REFERENCE TO RELATED APPLICATIONS

This application claims priority to, and the benefit of, U.S. provisional patent application Ser. No. 63/066,354 filed on Aug. 17, 2020, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless communication systems (WLANs), and more particularly to WLANs using CSMA/CA in which non-access-point (non-AP) stations obtain and share the transmit opportunity (TXOP), with the AP arranging transmission through the buffers during the TXOP.

2. Background Discussion

Current wireless technologies using Carrier-Sense Multiple-Access/Collision-Avoidance (CSMA/CA) focus on attaining high throughput performance of the network, yet they lack the ability to address the needs of some packets for low latency delivery, such as required by real time applications (RTA).

RTAs require low latency communication and use best effort communication. The data generated from the RTA is referred to herein as RTA traffic and will be packetized as an RTA packet at the transmitter station (STA). Also, the data generated from a non-time sensitive application will be referred to herein as non-RTA traffic and will be packetized as a non-RTA packet at the transmitter STA.

The RTA packet requires low latency due to its high timeliness requirement on packet delivery. The RTA packet is valid when it is delivered within a certain period of time.

One solution in the CSMA/CA wireless technology is to let the STA obtain channel access faster with less channel contention time.

Due to the random channel access scenario of CSMA/CA, a STA needs to sense and contend for channel access before transmitting each packet. Although short channel contention times accelerate channel access, the contention time can still be significant compared with the latency requirement of the RTA packet, thus preventing delivery within the required time interval.

Accordingly, a need exists for a mechanism for supporting low latency RTA packet transmissions. The present disclosure fulfills that need and provides additional benefits over previous technologies.

BRIEF SUMMARY

A WLAN protocol, utilizing CSMA/CA, is described in which a non-AP STA obtains the TXOP and informs the AP to share the TXOP within its BSS. The AP of the BSS collects the buffer status and the QoS requirement of the buffer from the STAs. The AP then arranges the transmissions during the shared TXOP to satisfy the Quality-of-Service (QoS) requirement of the buffer reported by the STAs.

In one variation of the above the non-AP STA sends a request trigger frame (RTF) to its associated AP, and embeds a suggested parameter setting of the Trigger Frame (TF) in the RTF. The AP receives the RTF and sends the TF as requested by the STA.

Additional variations describe how this is employed with multi-link operations. In one variant, the AP Multi-Link Device (MLD) sends a buffer status report (BSRP) frame on one link to collect the buffer status and QoS requirement of the buffer from its associated non-AP MLDs. The AP MLD shares buffer status and QoS requirements of the buffer with its associated non-AP MLDs with all its affiliated APs in multiple links. Each affiliated AP then uses the buffer status and QoS requirement of the buffer from its associated non-AP MLDs to schedule the transmissions.

In another variant the Non-AP STA accesses the channel on one link and shares its TXOP with its associated AP. The AP MLD of the associated AP contends for the channel on another link and gains channel access within the TXOP sharing duration on Link1. The AP MLD arranges transmissions on both of the links.

Numerous variations and examples are included for the present disclosure.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 2A and FIG. 2B are data field diagrams of a Data frame and ACK frame format in a regular WLAN system.

FIG. 3 is a data field diagram of an HE-SU PPDU frame format in IEEE 802.11ax.

FIG. 6 is a data field diagram of an HE-MU PPDU frame format in IEEE 802.11ax.

FIG. 7 is a data field diagram of an HE-TB PPDU frame format in IEEE 802.11ax.

FIG. 8 is a data field diagram of a Trigger frame format in IEEE 802.11ax.

FIG. 9 is a data field diagram of a Common information field in the trigger frame shown in FIG. 8.

FIG. 10 is a data field diagram of a User information field in trigger frame in the trigger frame shown in FIG. 8.

FIG. 11 is a data field diagram of a Trigger dependent user info field in the trigger frame as seen in FIG. 10 for the MU-BAR.

FIG. 12 is a data field diagram of a Block ACK (BA) frame format in regular WLAN systems.

FIG. 45 is a communications sequence diagram with an example of enabling P2P transmission when a non-AP STA shares its TXOP by sending a CTS frame to the AP according to at least one embodiment of the present disclosure.

DETAILED DESCRIPTION

1. WLAN Systems Under IEEE 802.11

1.1. CSMA/CA Systems

In WLAN systems, IEEE 802.11 uses CSMA/CA to allow stations (STAs) to obtain access to the channel for packet transmission and retransmission.

Figure 1:
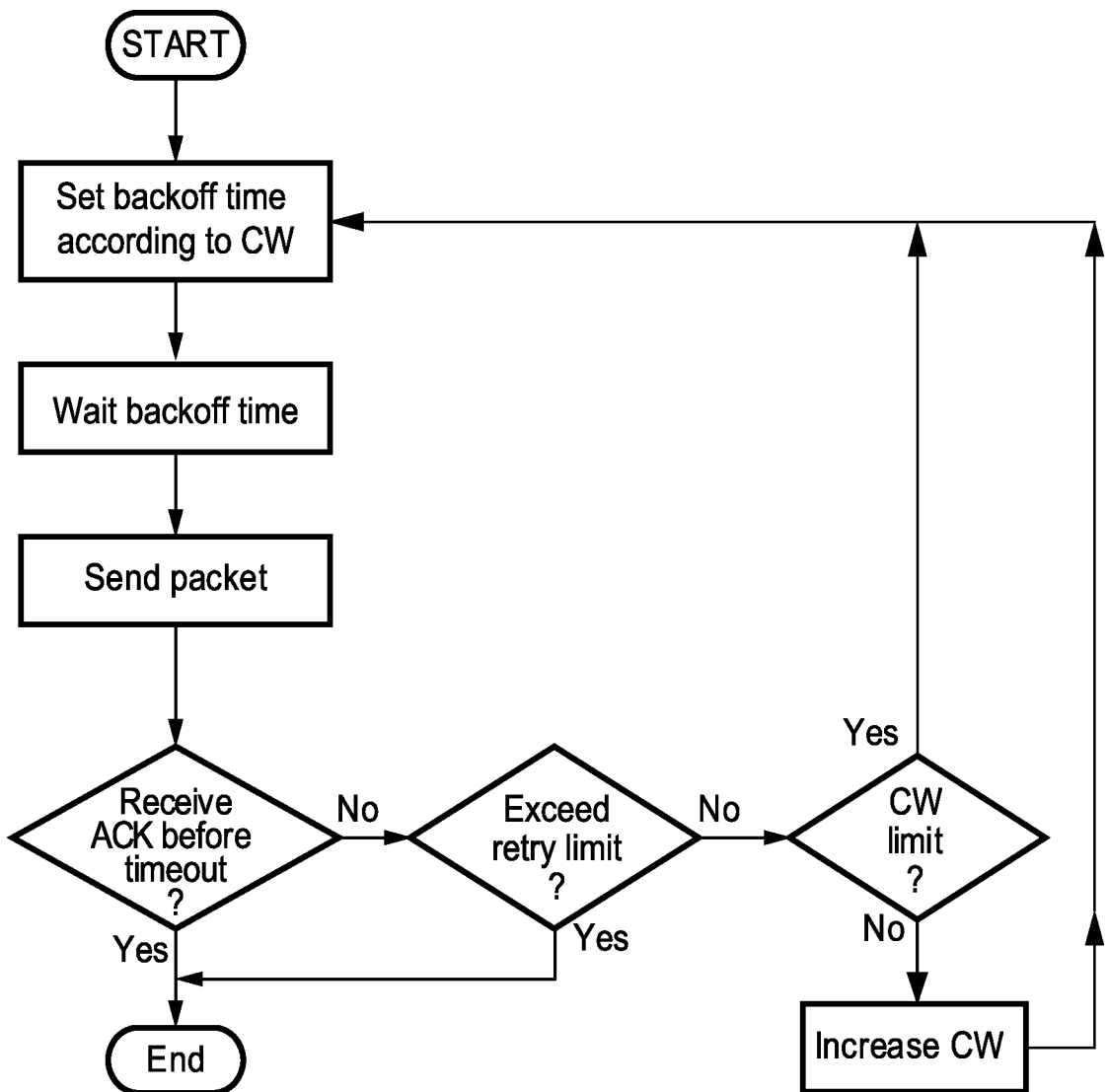
FIG. 1 is a flow diagram of a retransmission scheme in CSMA/CA under IEEE 802.11.

FIG. 1 depicts a flow diagram of this process. In CSMA/CA systems, before each transmission and retransmission, the STA has to sense channel status and set a backoff time to contend for channel access. The backoff time is decided by a uniform random variable between 0 and the contention window size. After the STA waits for the backoff time and senses that the channel is idle, then the STA may send a packet.

If an acknowledgement (ACK) for the transmission is received, then the transmission succeeded. Otherwise, retransmission of that packet is required; since the STA did not receive an ACK for packet transmission before the timeout occurred. When retransmission is required, the STA checks the number of retransmissions which have been performed for the packet. If the number of retransmission attempts exceeds the retry limit, then the packet is dropped and no retransmission is scheduled. Otherwise, the retransmission is scheduled.

If retransmission is scheduled, then another backoff time is needed to contend for retransmission channel access. If the size of the contention window has not reached the upper limit, the STA increases it.

The STA sets another backoff time depending on the new size of the contention window. The STA waits for the backoff time period for checking channel status and performing its retransmission and proceeds accordingly.

FIG. 2A illustrates a data frame format in a regular WLAN system, having the following fields. A Frame Control field indicates the type of frame. A Duration field contains NAV information used for CSMA/CA channel access. An RA field contains the address of the recipient of the frame. A TA field contains the address of the STA that transmitted the frame. A Sequence control field contains the fragment number and the sequence number of the packet. A data field contains the data payload of the frame. A frame check sequence (FCS) is also shown here and in other data structures described herein. FCS is an error-detecting code added to a frame in a communications protocol, when communicating data from a source to a destination.

FIG. 2B illustrates an Acknowledgement (ACK) frame format in a regular WLAN system having the following fields. A Frame Control field indicates the type of frame. A Duration field contains NAV information used for CSMA/CA channel access. An RA field contains the address of the recipient of the frame.

FIG. 3 depicts a High-Efficiency (HE) Single-User (SU) Physical-layer Protocol Data Unit (PPDU) format used for SU transmission in IEEE 802.11ax; which contains the following fields.

An L-STF field is a non-HT short training field. An L-LTF field is a non-HT long training field. An L-SIG field is a non-HT SIGNAL field. An RL-SIG field is a repeated non-HT SIGNAL field. An HE-SIG-A field is a HE SIGNAL A field. An HE-STF field is a HE short training field. An HE-LTF field is a HE long training field. A Data field is a field carrying the data as PSDUs. A PE field is a packet extension field.

Figure 4:
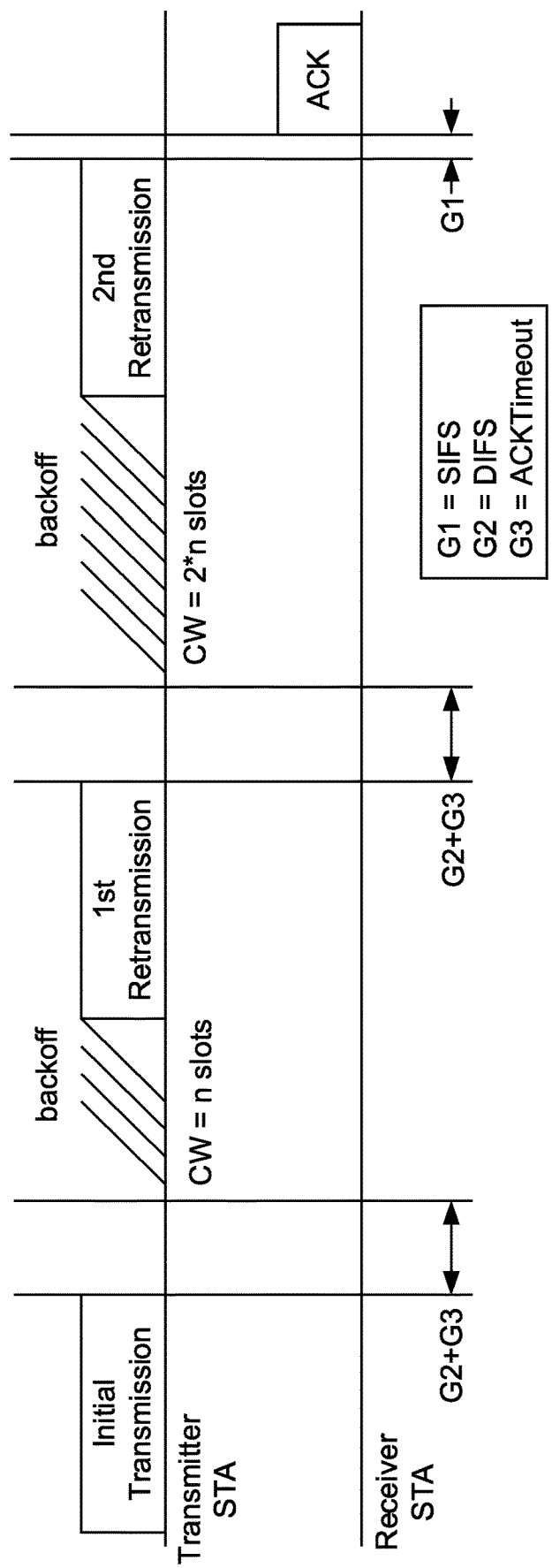
FIG. 4 is a communications sequence diagram of a double sized contention window when performing a retransmission in CSMA/CA.

FIG. 4 illustrates one example of the retransmission in CSMA/CA where the backoff time is increased due to retransmission. The data frame and the ACK frame use the formats as shown in FIG. 2A-FIG. 2B, respectively. The frames are packetized using the packet format as shown in FIG. 3. In this example, after the transmitter transmits the initial transmission of a packet it does not receive the ACK before timeout. So, it sets another backoff time for a first retransmission, whereby the size of the contention window is n slots. After waiting the backoff time, the transmitter STA retransmits the packet for the first time. However, the retransmission also fails. The transmitter STA needs to retransmit the packet and sets backoff time again to contend again for channel access. This time, the size of the contention window is doubled, which is 2*n slots, due to the retransmission. The expected backoff time is also doubled by the contention window size. The 2nd retransmission succeeds since it receives an ACK before timeout.

Figure 5:
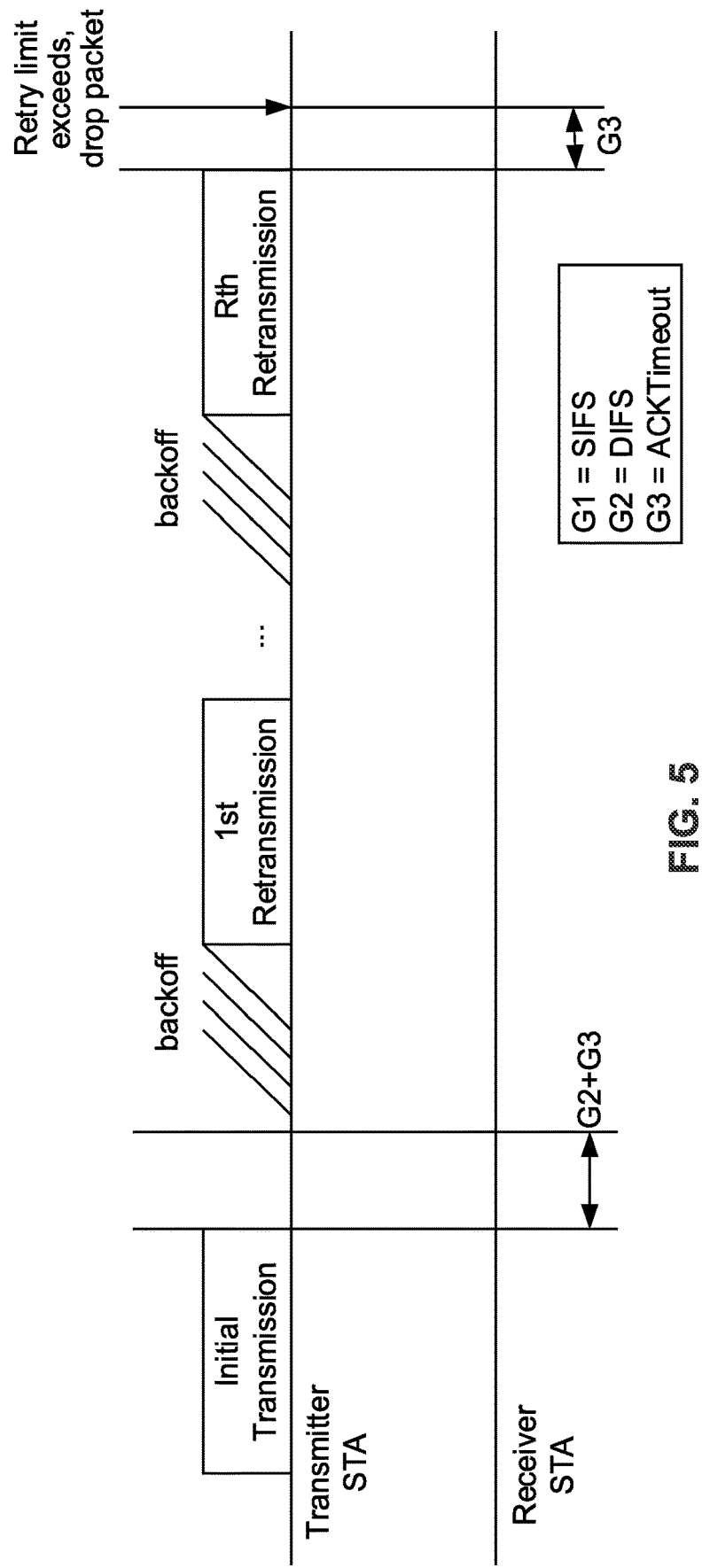
FIG. 5 is a communications sequence diagram showing a packet being dropped due to reaching the retry limit under CSMA/CA.

FIG. 5 illustrates one example in which the packet is dropped after the number of retransmissions exceeds the retry limit. Let us denote the retry limit by R. The data frame and the ACK frame use the formats as shown in FIG. 2A and FIG. 2B, respectively. The frames are packetized using the packet format as shown in FIG. 3. As shown in FIG. 5, after the initial transmission of a packet fails, the transmitter STA retransmits that packet multiple times. However, none of the retransmissions succeed. After retransmitting R times, the number of retransmissions exceeds the retry limit, whereby the transmitter STA stops retransmitting the packet and that packet is dropped.

1.2. Multi-User Transmission

Multi-user transmission is available in wireless networks, such as IEEE 802.11. Since IEEE 802.11ax, the network has supported multi-user transmission in both uplink and downlink directions. Multi-user transmission in IEEE 802.11ax includes Multiple-Input Multiple-Output (MIMO) mode and Orthogonal Frequency-Division Multiple Access (OFDMA) mode, which may be utilized either separately or together.

IEEE 802.11ax uses Multi-User (MU) transmission packet formats, such as depicted in FIG. 2A and FIG. 2B, to transmit data in multi-user mode. When multiple users transmit or receive a multi-user transmission packet, all the users share the same Physical Layer Convergence Procedure (PLCP) header of the multi-user transmission packet. Then, each user transmits or receives the data carried by the multi-user transmission packet using a separate resource block, including Resource Unit (RU) allocation, Modulation and Coding Scheme (MCS) and so forth.

IEEE 802.11ax defines multiple PPDU formats to transmit packets in different multi-user transmission scenarios. They are listed as follows.

FIG. 6 depicts an HE multi-user (MU) PPDU format used for Downlink (DL) multi-user transmission. Compared with a single user PPDU format as shown in FIG. 3, it adds the HE-SIG-B field into its format, which provides the separate resource block allocation information to each user.

FIG. 7 shows the HE Trigger-based (TB) PPDU format used for Uplink (UL) multi-user transmission. The fields in the HE TB PPDU format are identical to those in the HE single user PPDU format, except that the HE-STF field length is 8 μs.

FIG. 8 depicts the content of a trigger frame having the following fields. A Frame Control field indicates the type of frame. A Duration field contains NAV information used for CSMA/CA channel access. An RA field contains the address for the recipient of the frame. A TA field contains the address of the STA which transmitted the frame. A Common Info field includes the information for all allocated STAs, which is shown in FIG. 9. A User Info field includes the information for each STA, which is shown in FIG. 10. The Common Info field and the User Info field provide the separate resource block allocation information to each user.

The trigger frame as shown in FIG. 8 can be transmitted as a multi-user block ACK request (MU-BAR) by setting the trigger type in the common info field to "2". When the trigger frame is MU-BAR, the content of the trigger dependent user info field (as shown in FIG. 10) in trigger frame is shown in FIG. 11.

FIG. 12 shows the content of the block ACK frame having the following fields. A Frame Control field indicates the type of frame. A Duration field contains NAV information used for CSMA/CA channel access. An RA field contains the address for the recipient of the frame. A TA field contains the address of the STA which transmitted the frame. A Block Acknowledge (BA) Control field indicates the policy of the block ACK. A BA info field contains feedback of the transmission.

Figure 13:
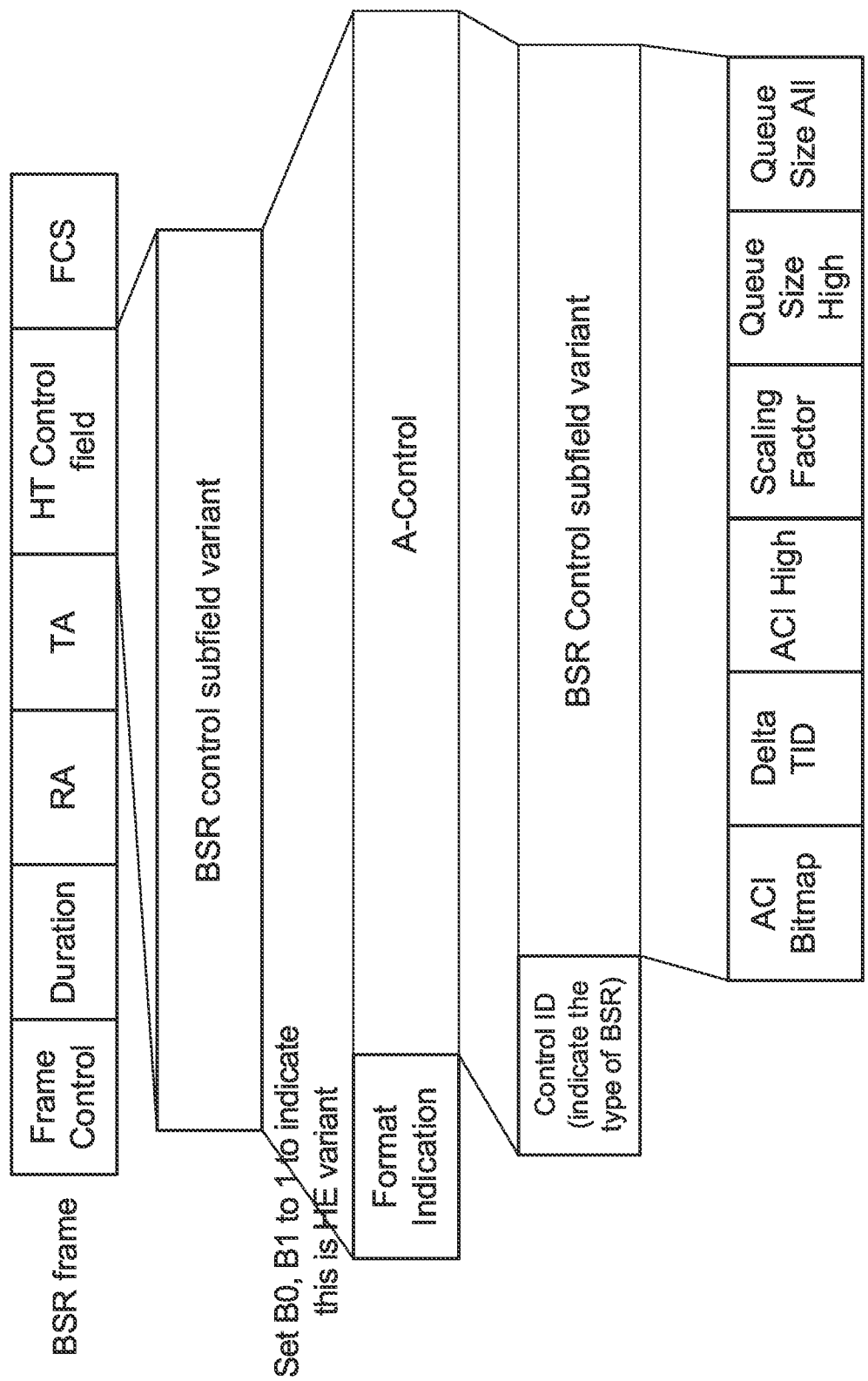
FIG. 13 is a data field diagram of a BSR frame format.

FIG. 13 depicts the content of the Buffer Status Report (BSR) frame having the following fields. A Frame Control field indicates the type of frame. A Duration field contains NAV information used for CSMA/CA channel access. An RA field contains an address for the recipient of the frame. A TA field contains the address of the STA that transmitted the frame. An HT Control field indicates the BSR control subfield variant. A Format Indication is a field used to indicate the format of the HT control field. When bits B0 and B1 therein are set to 1, this indicates that the HT control field uses the HE format. There is an A-Control field followed by this field. An A-Control field is a field which carries the buffer status report. A Control ID field indicates that the BSR is carried in the control information field. A Control Information field carries the BSR control subfield variant. An ACI Bitmap field indicates the access categories for which the buffer status is reported. A Delta TID field indicates the number of TIDs for which the buffer status is reported. An ACI High field indicates the access category which is reported in Queue Size High field. A Scaling Factor field indicates the units which are used by Queue Size High and Queue Size All fields. A Queue Size High field indicates the queue size of the Access Category (AC) indicated in ACI High in units of the Scaling Factor. A Queue Size All field indicates the queue size of the ACs indicated in the ACI Bitmap in units of the Scaling Factor.

Figure 14:
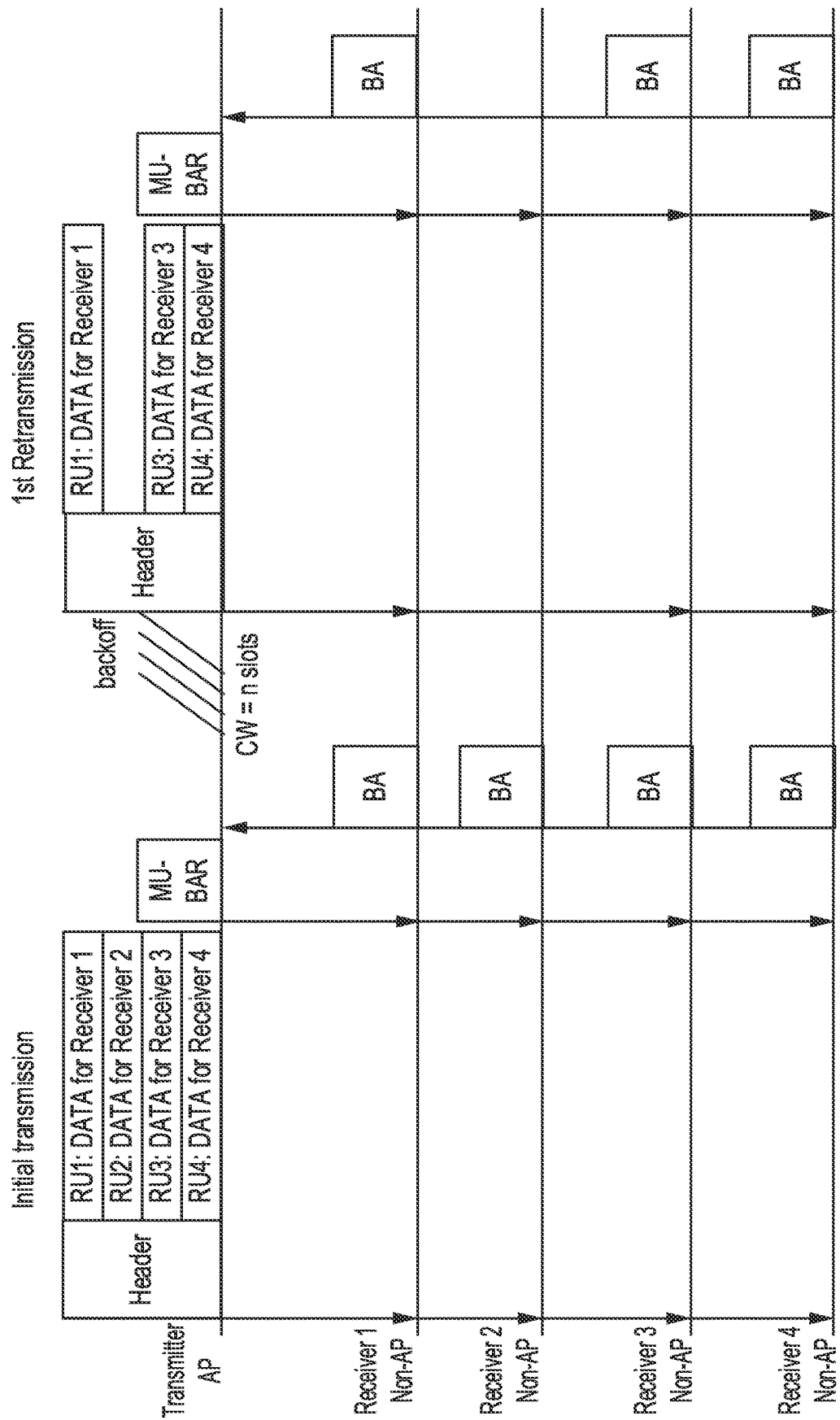
FIG. 14 is a communications sequence diagram of a CSMA/CA retransmission scheme in the downlink of OFDMA systems.

FIG. 14 depicts an example of downlink (DL) multi-user (MU) transmission using Orthogonal Frequency Division Multiple Access (OFDMA). The transmitter AP transmits data to its receivers 1, 2, 3, and 4 using the HE MU PPDU format. After finishing the initial transmission, the AP sends a multi-user Block ACK request (MU-BAR) to all the receivers. The receivers then send block ACK (BA) back to the AP. According to the content in the BAs, the AP decides to retransmit the packets to receiver 1, 3 and 4. It contends for the channel, waiting for the backoff time. The first retransmission occurs after the AP gains channel access.

Figure 15:
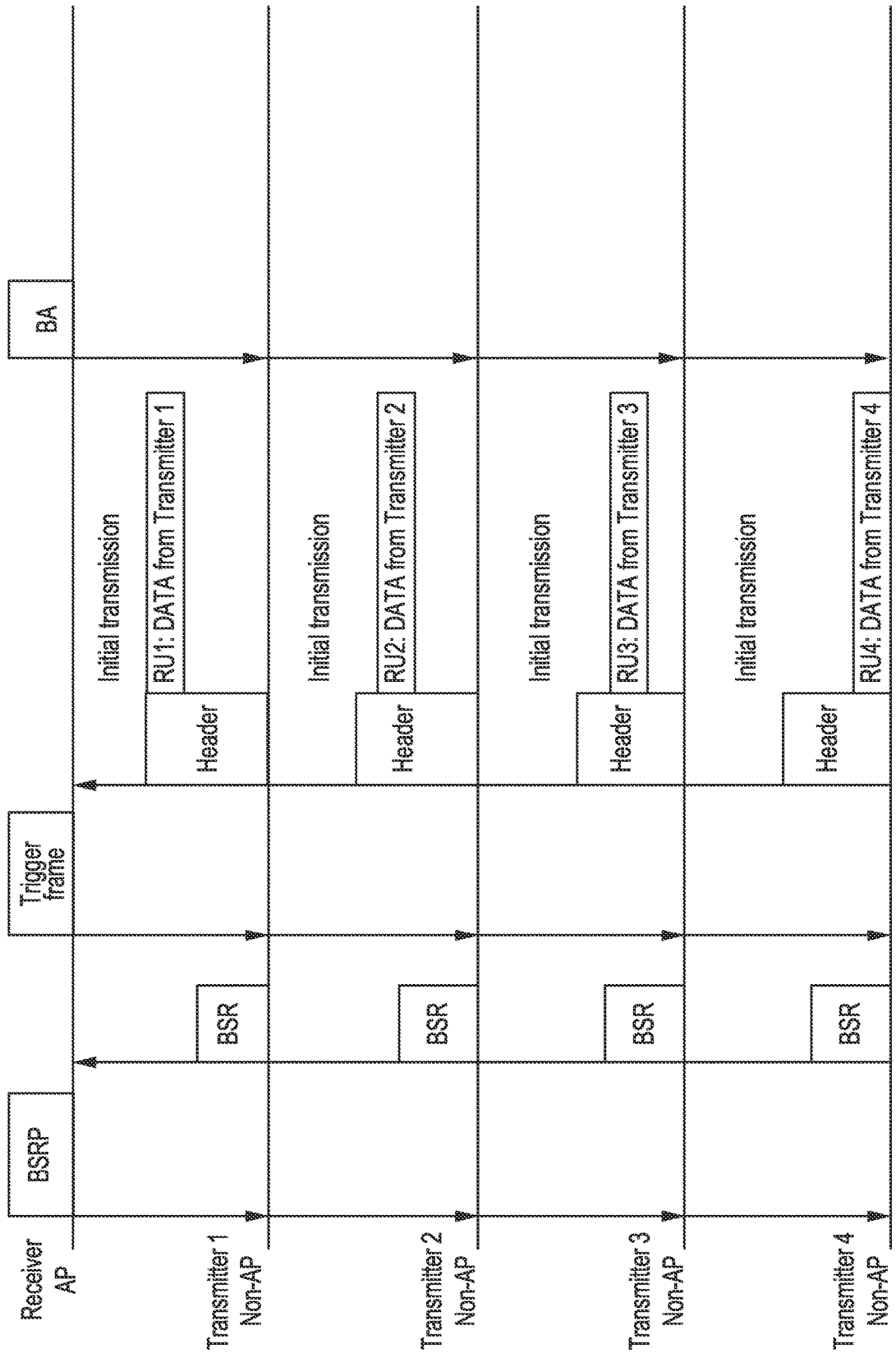
FIG. 15 is a communications sequence diagram of a CSMA/CA retransmission scheme in the uplink of OFDMA systems.

FIG. 15 depicts an example of uplink (UL) multi-user (MU) transmission using OFDMA. The AP first sends a buffer status report request (BSRP) trigger frame to all the transmitters 1, 2, 3 and 4. Then the transmitters receive the BSRP trigger frame and send their buffer status reports (BSRs) back to the AP. Then, the AP sends a trigger frame to all the transmitters 1, 2, 3 and 4. The channel resources allocated in the trigger frame are based on the BSRs received from the STAs. The transmitters receive the trigger frame and start the initial transmission using the resource block allocated by the trigger frame. The multi-user transmission packet uses the HE-TB PPDU format. The AP receives the packet from the transmitters and sends a BA frame to report that the transmission was properly received.

3.3. EDCA System

Figure 16:
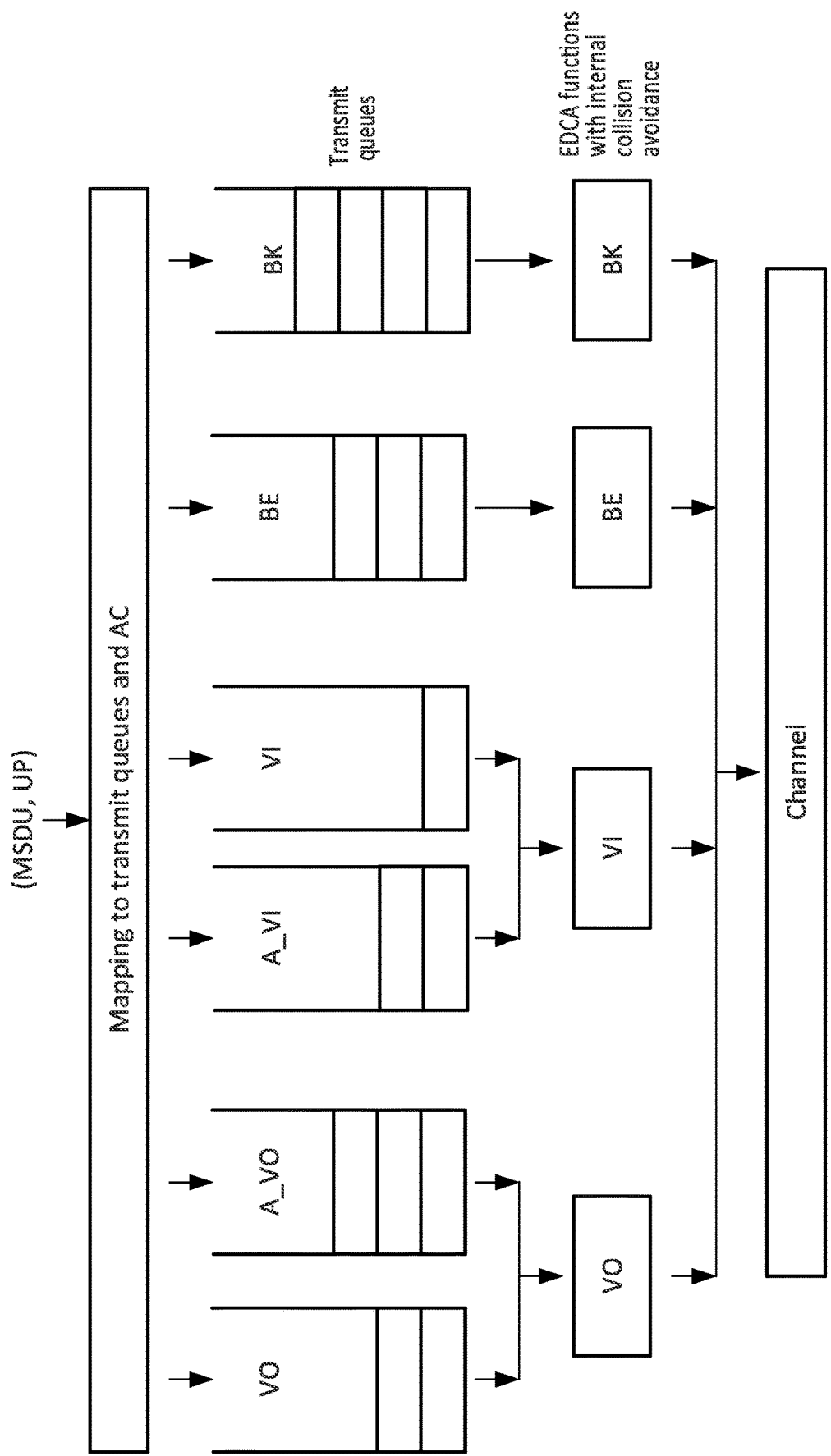
FIG. 16 is a queue structure diagram of an EDCA queue system.

FIG. 16 illustrates the reference model of the Enhanced DCF Channel Access (EDCA) queue system in IEEE 802.11. The system contains six transmit queues associated with four different access categories (ACs). Each AC uses EDCA functions (EDCAFs) to contend for channel access for transmitting packets in its corresponding transmit queues.

The six transmit queues are voice (VO), alternate voice (A_VO), alternate video (A_VI), video (VI), best effort (BE), and background (BK). Each transmit queue decides the transmission order of the packets in the queue.

The four ACs are voice (VO), video (VI), best effort (BE), and background (BK). Each ACs has an EDCA function (EDCAF) to provide the function of channel contention. An internal collision avoidance mechanism is used when multiple EDCAFs try to access the channel at the same time. When an internal collision occurs, the EDCAF with higher priority gain channel access.

Table 1 lists the User Priority (UP) to Access Category (AC) mapping used in EDCA queue of IEEE 802.11. The second and third columns represent the user priorities of the traffic and their corresponding designations in IEEE 802.1D. In each row, according to the user priority, the traffic will be enqueued in the corresponding transmit queue and access category. The priority increases from the top row to the bottom row. The traffic with higher priority has higher probability to be transmitted earlier.

Figure 17:
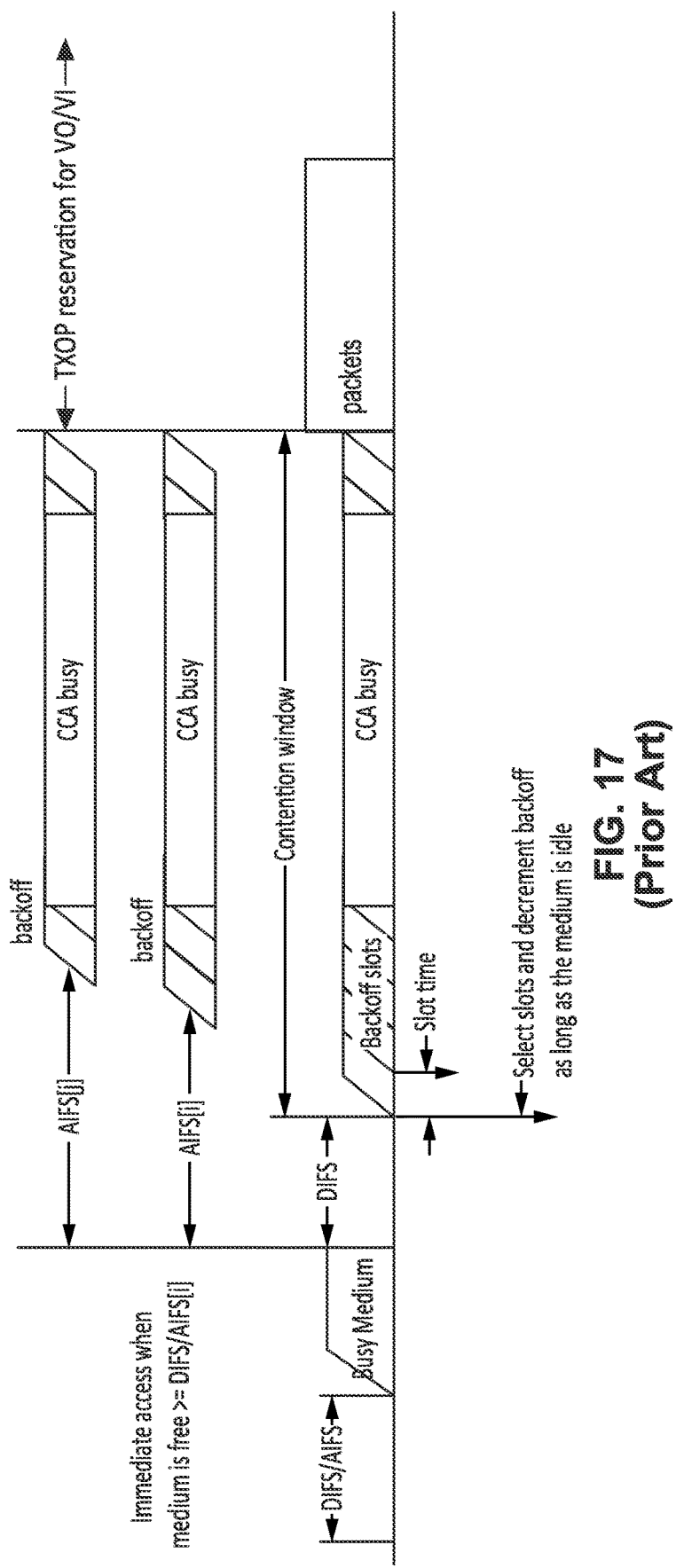
FIG. 17 is a communications format diagram of EDCA channel access.

FIG. 17 illustrates a channel access procedure for EDCA. As shown in the figure, it also compares the EDCA channel access when only Distributed Coordination Function (DCF) is utilized. When only DCF is used, the STA is able to immediately access the channel when the medium is free for more than the DCF Interframe Space (DIFS) time. Otherwise, it uses CSMA/CA to contend for the channel. After sensing that the channel is idle for the DIFS time, it starts to count down the backoff as long as the medium is idle. The number of backoff slots is randomly chosen between 0 and its contention window. The contention window is updated as shown in FIG. 1. The STA pauses to count down the backoff when CCA busy occurs, such as when the STA senses that the channel is busy. When the backoff counts down to zero, the STA starts to transmit packets.

In EDCA, each EDCAF as shown in FIG. 16 is able to immediately access the channel and the medium is free for more than the Arbitration Interframe Spacing (AIFS) time of the AC which is to gain channel access. It should be appreciated that AIFS[i] as shown in the figure represents the AIFS time for AC i. Otherwise, each EDCAF uses CSMA/CA to contend for the channel for each AC that is to gain channel access. After sensing that the channel idle for AIFS time, it starts to count down backoff as long as the medium is idle. The number of backoff slots is randomly chosen between 0 and its contention window size. The contention window size is updated as shown in FIG. 1. The STA pauses to count down the backoff when CCA busy occurs, such as when the STA senses that the channel is busy. When the backoff counts down to zero, the STA starts to transmit packets for that AC.

It should be appreciated that multiple EDCAFs could contend for the channel in parallel. For example, EDCAFs for AC i and AC j could contend for the channel at the same time as shown in FIG. 17. When an internal collision occurs, the EDCAF with higher priority will obtain channel access and the EDCAF with lower priority will double its contention window. When AC is VO or VI, they are able to reserve a period of contention free time, i.e., TXOP, for transmitting packets. The maximum duration of TXOP is denoted as TXOP limit.

Table 2 lists the default parameter setting for EDCA channel access. Each AC has its own minimum contention window and maximum contention window. AIFSN represents the AIFS duration in terms of the number of backoff slots. TXOP limit represents the maximum duration of TXOP that each AC could reserve every time.

1.4. Regular IEEE 802.11be PLCP Preamble

Figure 18:
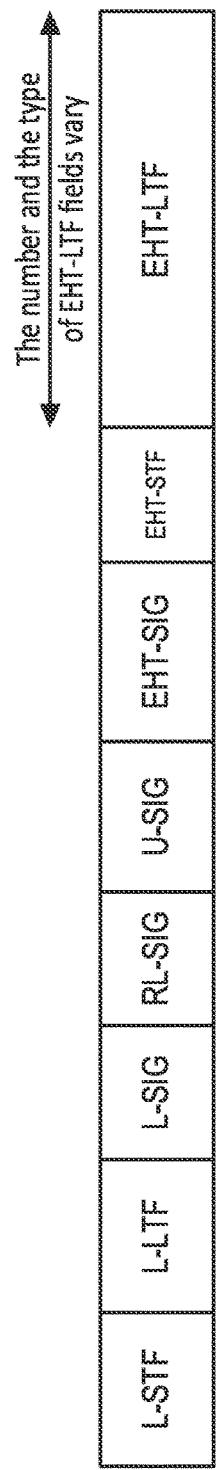
FIG. 18 is a data field diagram of a regular IEEE 802.11be preamble.

FIG. 18 is the regular IEEE 802.11be preamble format having the following fields. An L-STF field indicates the non-HT short training field. An L-LTF field indicates the non-HT long training field. An L-SIG field indicates the non-HT SIGNAL field. An RL-SIG field indicates the repeated non-HT SIGNAL field. A U-SIG field indicates the EHT universal field. An EHT-SIG field indicates the EHT SIGNAL field. An EHT-STF field indicates the EHT short training field; although it could be replaced by some other type of signal training field. An EHT-STF field indicates EHT short training field. An EHT-LTF field indicates an EHT long training field.

2. Problem Statement

The disclosed technology describes a WLAN protocol which supports TXOP sharing within one BSS. A non-AP STA obtains the TXOP and shares the TXOP within the BSS.

The current wireless communication systems using CSMA/CA does not allow a non-AP STA to share its TXOP with other STAs in the BSS. In previous wireless protocols each non-AP STA had to contend for the channel independently to obtain the TXOP.

To reduce the delay caused by contention time, a TXOP sharing mechanism is utilized to reduce contention time among multiple STAs. Any STA accessing the channel can share its TXOP within the BSS. When the TXOP is shared, multiple STAs are able to transmit during the shared TXOP, thus each channel does not have to independently contend for channel access.

Current wireless communication systems using CSMA/CA allow the AP to arrange transmissions in its TXOP, such as multi-user transmissions. The AP is able to collect buffer status from the STAs and it launches uplink transmissions. When the AP collects buffer status from its associated STAs, it only obtains the amount of buffered traffic for uplink transmission. However, it will be recognized that RTA traffic has a high timeliness requirement, yet the current BSR frame does not reflect the QoS requirement of RTA traffic. Hence, it is difficult for the AP to arrange transmissions in its TXOP to satisfy the QoS requirement of RTA traffic.

The current wireless communication systems using CSMA/CA does not allow the AP to arrange Peer-to-Peer (P2P) transmissions in its TXOP. It could pose a significant demand for some devices, such as AR/VR, to directly transmit large amounts of data from one non-AP STA to another non-AP STA.

The task of designing a TXOP sharing mechanism in a CSMA/CA system is more challenging when the following scenarios are considered. RTA packets and non-RTA packets coexist, and yet RTA packets have a timeliness requirement, wherein these packets must be transmitted before their expiration time arrives. Peer-to-peer (P2P) transmission is allowed, with the challenge being to launch P2P transmission during the shared TXOP. The TXOP sharing mechanism must be designed with an aim to consider the time-validity of RTA traffic and minimize RTA packet latency in a wireless network where RTA and non-RTA traffic coexist.

3. Contribution of the Disclosure

The disclosed technology solves the TXOP sharing problem when a non-AP STA obtains the TXOP and shares it within the BSS. The disclosed technology allows the non-AP STA which obtains the TXOP to send a frame to its AP to indicate the start of the TXOP sharing. Then the AP can collect buffer status from the STAs and arrange (order/schedule) transmissions during the shared TXOP.

The disclosed technology solves the issue in which the AP could only obtain the buffer size of the STAs when it schedules uplink transmissions. The disclosed technology defines different types of buffer status reports (BSRs) which can carry QoS requirement information about the reported buffer. The AP can arrange the transmissions during the TXOP to satisfy the QoS requirement of the reported buffer.

The disclosed technology solves the issue of an AP arranging a P2P transmission during the TXOP; as the STAs are allowed to report the P2P buffer status, and the AP is made aware of scheduling a P2P transmission in the TXOP.

The disclosed technology also allows the buffer status report to be shared between the APs that are affiliated with the same AP Multi-Link Device (MLD). When the buffer status of the non-AP MLD is collected on one link, this information can be shared with the other affiliated APs. The AP MLD is then able to arrange the transmissions over multiple links according to the buffer status reports from the non-AP MLDs.

4. Embodiment

4.1. STA Hardware Configuration

Figure 19:
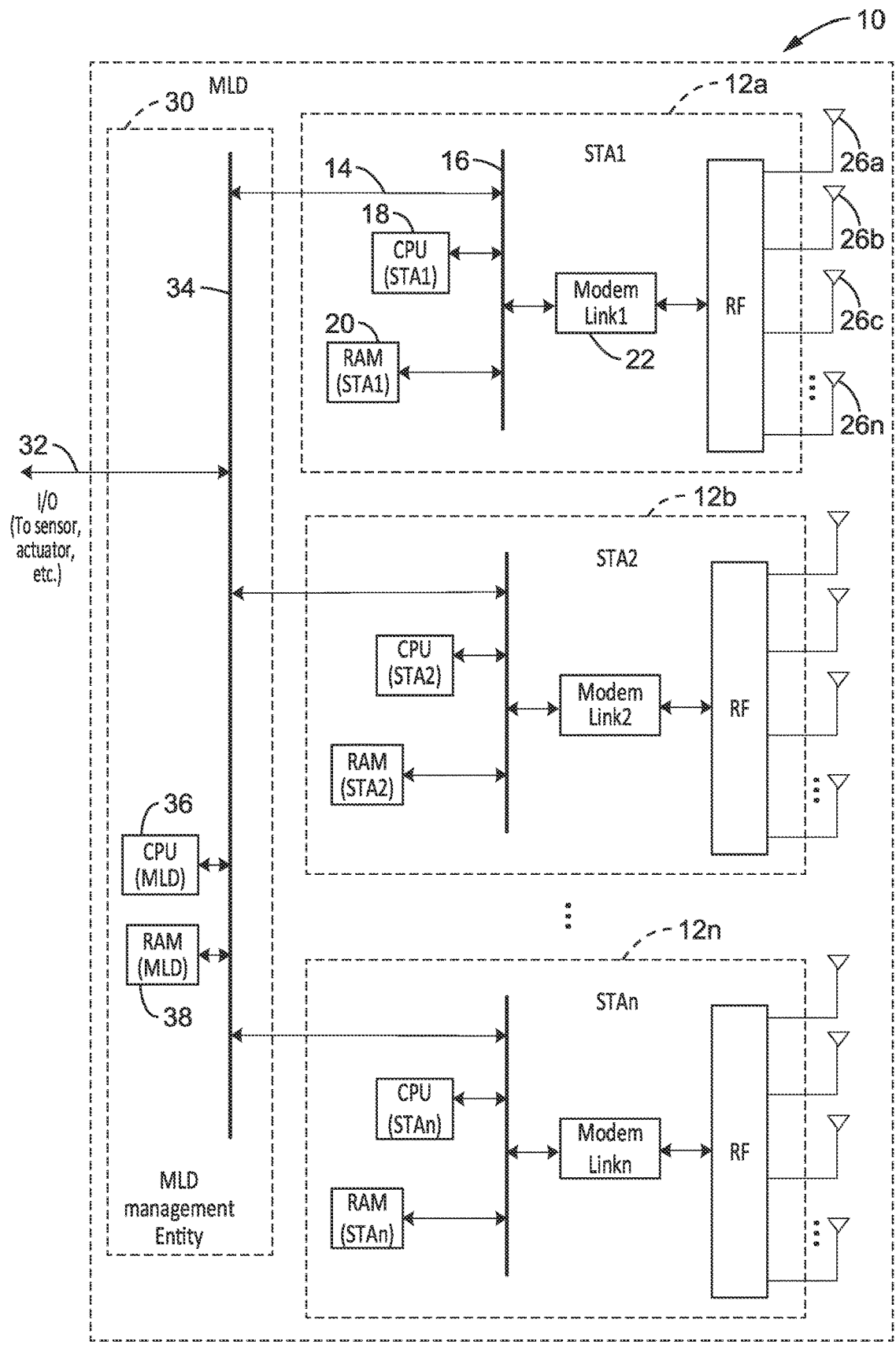
FIG. 19 is a hardware block diagram of a station configuration, such as contained in Multi-Link Device hardware, according to at least one embodiment of the present disclosure.

FIG. 19 illustrates an example embodiment 10 of station hardware, exemplified herein in a multi-link device (MLD) hardware configuration. Multiple STAs are affiliated with an MLD, having up to "n" stations 12a, 12b through 12n each of which operates on a link of a different frequency.

Hardware for each station (STA) has external I/O access 14 to applications, and an internal bus 16 connecting to at least one processor (CPU, MCU, SoC, or other control circuit) 18 and memory (e.g., RAM, or similar program and/or data store) 20, the combination being configured for execute programming that implements this wireless communication protocol.

Each STA accommodates at least one modem 22 to support communications coupled to at least one RF module 24 connected to one or more antennas 26a, 26b, 26c through 26n for performing communications, in one or more bands, such as sub-6 GHz band (e.g., 2.4, 5, 6 Ghz), and/or over millimeter wavelengths (mmW). In at least one embodiment the RF module 24 includes a frequency converter, array antenna controller, and other associated circuits.

In certain instances the RF can be configured for omni-directional antenna operation, and/or may be directional to increase gain. By way of example, RF module 24 is shown having multiple antennas to support beamforming for transmission and reception on that band. In this way, the STA may transmit signals using one or multiple sets of beam patterns. It should be appreciated that any desired bands can be supported by the teachings of the present disclosure. The present example shows multiple STAs grouped (clustered) in this multi-link device.

Bus 14 allows connecting various devices to the CPU, such as to sensors, actuators and so forth. Instructions from memory 20 are executed on processor 18 to execute a program which implements the communication protocol, which is executed to allow the STA to perform the functions of an access point (AP) station or a non-AP (regular) station (STA). It should also be appreciated that the programming is configured to operate in different modes (source, transmitter, intermediate, destination, receiver, first AP, other AP, non-AP stations associated with the first AP, non-AP TXOP holder station, non-AP TXOP participant stations, non-AP TXOP non-participant stations, stations associated with another AP, coordinator, coordinatee and so forth), depending on what role it is playing in the current communications context. In addition the protocol is configured for operating with separate stations or stations within multi-link devices (MLDs) which are configured for either Simultaneous Transmit and Receive (STR MLD), or do not have that capability (non-STR MLD).

It should be appreciated that the STAs of the present disclosure, such as those within this MLD, can be configured with multiple modems 22, with each modem coupled to any arbitrary number of RF circuits. In general, using a larger number of RF circuits will result in broader coverage of the antenna beam direction. It should be appreciated that the number of RF circuits and number of antennas being utilized is determined by hardware constraints of a specific device. Some of the RF circuitry and antennas may be disabled when the STA determines it is unnecessary to communicate with neighboring STAs.

The MLD is shown having an internal bus 34 for communicating between its processor 36 and associated memory 38 and each of the STAs 12a, 12b through 12n. In addition, the MLD has external I/O 32 to access applications for MLD, CPU and RAM of MLD management entity, to run a program that implements communication protocols at the MLD level. It can distribute tasks to, and collect information from, each affiliated STA and share information between affiliated STAs.

It should also be appreciated that each STA of the MLD need not have its own processor and memory. In at least one embodiment, one or more of the stations within the MLD may share processors and memory between themselves, or share the processor and memory of the MLD circuit. Thus, the present disclosure contemplates many possible arrangements for communication over multiple links within an MLD.

4.2. STA Topology for Consideration

Figure 20:
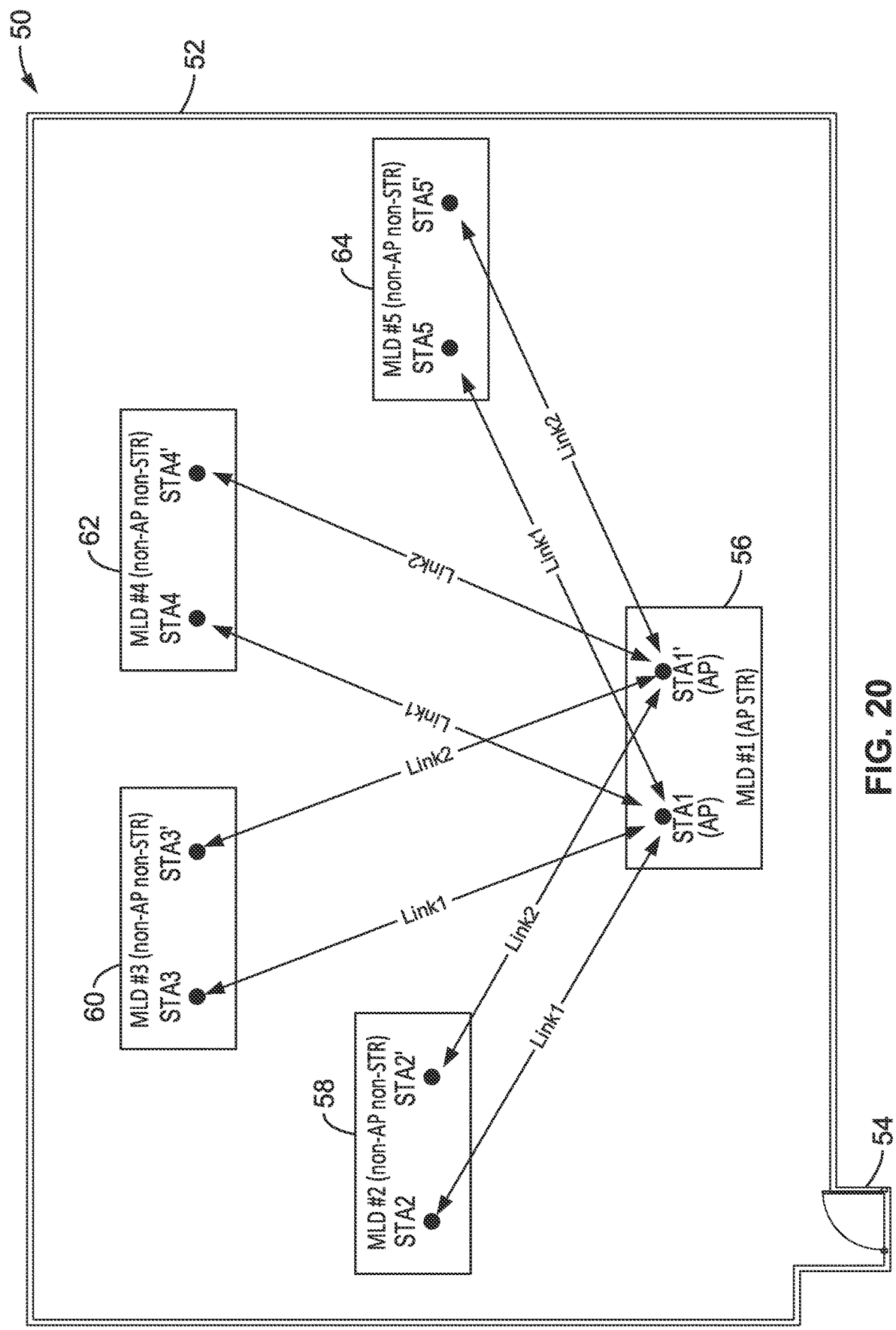
FIG. 20 is a station topology embodiment for consideration according to at least one embodiment of the present disclosure.

FIG. 20 illustrates an example embodiment 50 of a wireless topology between MLDs. To better explain the goal of the proposed technology, the figure sets up a network scenario. It should be appreciated that this topology is only shown for illustrating the example cases described herein; as the present disclosure provides a protocol which can be operated in any desired topology.

A multi-link device (MLD) is a device that has more than one affiliated STA and has one Media Access Control (MAC) Service Access Point (SAP) to a Logical Link Control (LLC), which includes one MAC data service. The example assumes that there are ten STAs spread across five MLDs 56, 58, 60 62 and 64 installed in some local area or structure (e.g., meeting room) 52, exemplified with one or more windows/doors 54. STA 1 and STA 1' are affiliated with AP MLD1 and STA x and x' are affiliated with non-AP MLDx, where x=2, 3, 4 or 5. STAs 2, 3, 4, 5 are associated with STA 1 over link 1 and STAs 2', 3', 4' and 5' are associated with STA 1' over link 2.

If an MLD is able to transmit on one link and receive on the other link simultaneously, then such an MLD is referred to as being a Simultaneous Transmit and Receive MLD (STR-MLD); otherwise if an MLD is not able to transmit on one link and receive on the other link simultaneously due to in-device operation constraints, then this MLD is referred to herein as a non-STR MLD. A non-STR MLD can either transmit on one or both links simultaneously or receive on one or both links simultaneously. In the network topology example, MLD1 is an STR MLD, while the other MLDs in this example can be either STR or non-STR.

All STAs use CSMA/CA for random channel access. It is possible that the MLD only enables one STA and behaves as a single link device.

4.3. TXOP Sharing Launched by Non-AP STA

This proposed technology proposes a way for non-AP STA sharing its TXOP with the other STAs in its associated BSS. When a non-AP STA gains channel access, it informs its associated AP to share its TXOP with the other STAs in the BSS. When a STA launches TXOP sharing, it allows the AP to fulfill requirements of the STA and trigger additional transmissions during the TXOP sharing time. The AP then schedules the transmissions during the TXOP according to the buffer status of the STAs in the BSS.

Figure 21:
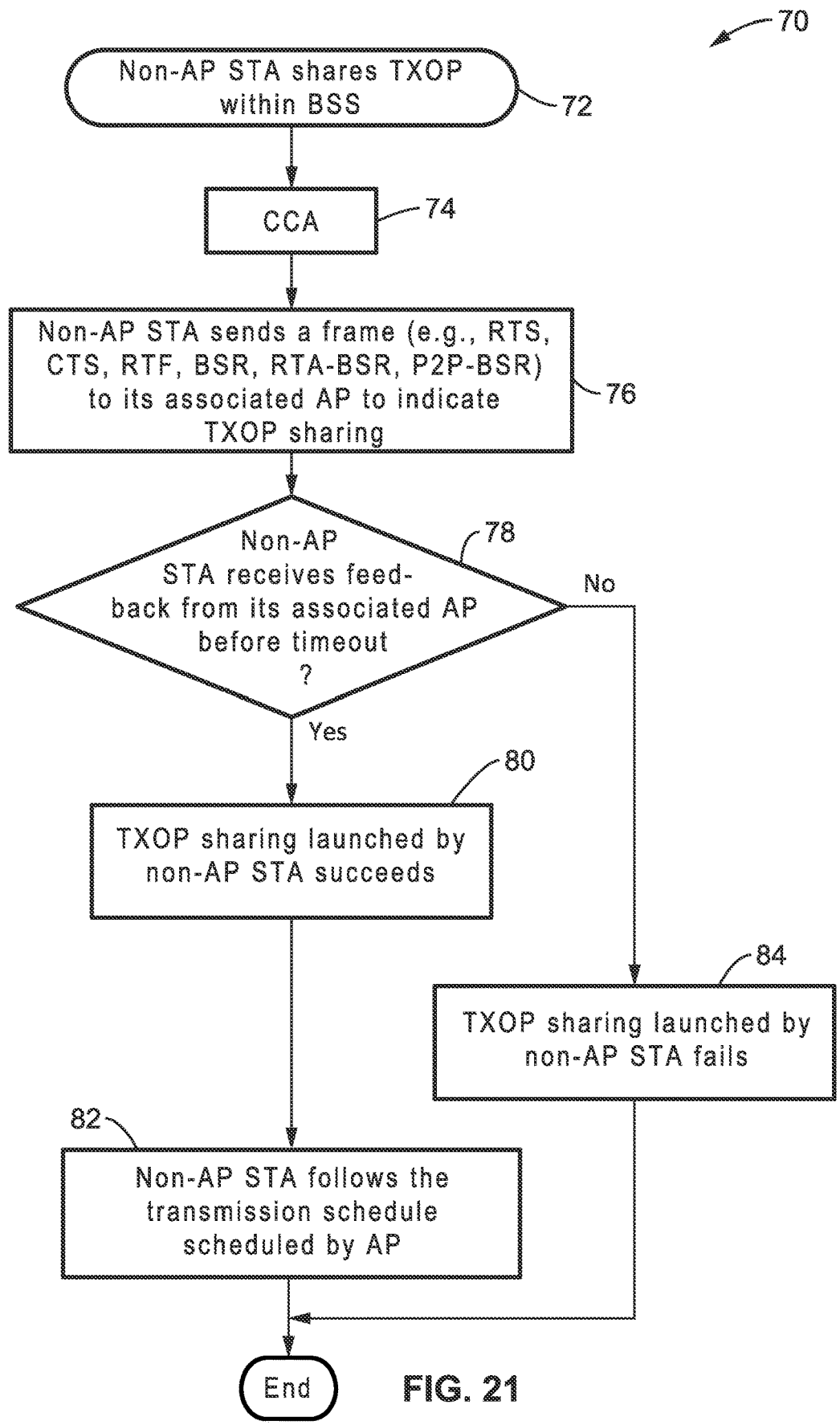
FIG. 21 is a flow diagram of a non-AP STA sharing a TXOP within its associated BSS performed according to at least one embodiment of the present disclosure.

FIG. 21 illustrates an example embodiment 70 of the steps taken when a non-AP STA shares 72 its TXOP within its associated BSS.

Figure 49:
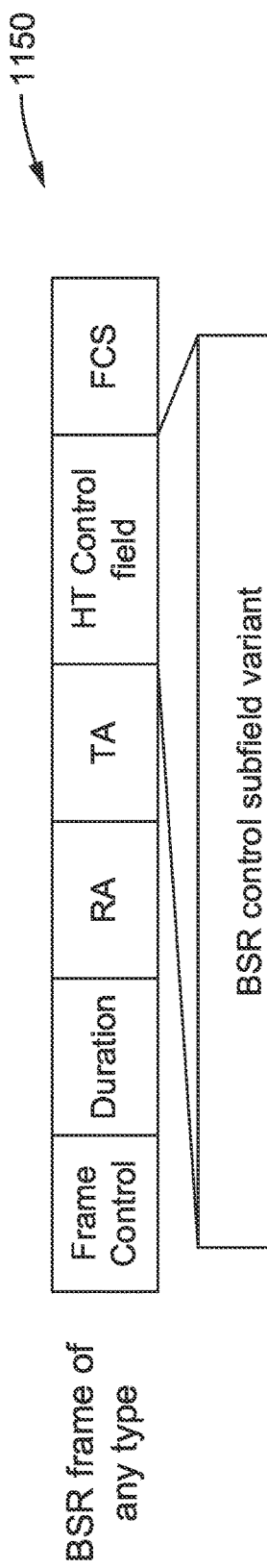
FIG. 49 is a data field diagram of a BSR frame format of any type according to at least one embodiment of the present disclosure.
Figure 55:
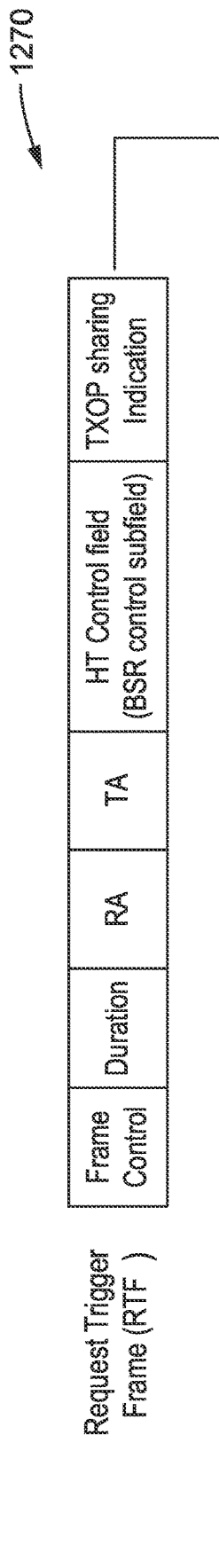
FIG. 55 is a data field diagram of an RTF frame format according to at least one embodiment of the present disclosure.

The non-AP STA first performs 74 a clear channel assessment (CCA) to gain channel access. Then, it sends 76 a frame containing TXOP sharing information to its associated AP to indicate TXOP sharing. The frame can comprise any of different types of frames which are configured for also containing the sharing information, such as for example a Request-To-Send (RTS) or Clear-To-Send (CTS) or a Buffer-Status-Report (BSR) frame; while it is also possible to use newly defined frames, such as a Request-Trigger-Frame (RTF) frame as illustrated in FIG. 55, new types of BSR frames are illustrated in FIG. 49. It should be noted that it is possible for the RTS frame to be a MU-RTS frame. When those frames are transmitted, the receiver address of the frames can be a negotiated address between the AP and STA to indicate the frame is for launching TXOP sharing. Alternatively, it is also possible that the AP and non-AP STAs schedule a period of time during which those frames are transmitted to launch TXOP sharing by default. That is, during the scheduled period of time, when the AP receives those frames from non-AP STAs, it knows (recognizes) they are for launching TXOP sharing.

A check 78 determines if a non-AP STA receives feedback from its associated AP before timeout. If the feedback is received, then the TXOP sharing launched by the non-AP STA succeeds 80. The feedback from the AP for example may comprise a CTS or a trigger frame if the RTS is sent by non-AP STA, or may comprise a trigger frame if other frames are sent by the non-AP STA to indicate TXOP sharing. Then in block 82 the non-AP STA follows the schedule as determined by the AP to transmit during the TXOP.

Otherwise, if at block 78 it was found that the non-AP STA didn't receive feedback from its associated AP before timeout, then TXOP sharing launched by the non-AP STA fails 84.

Figure 22:
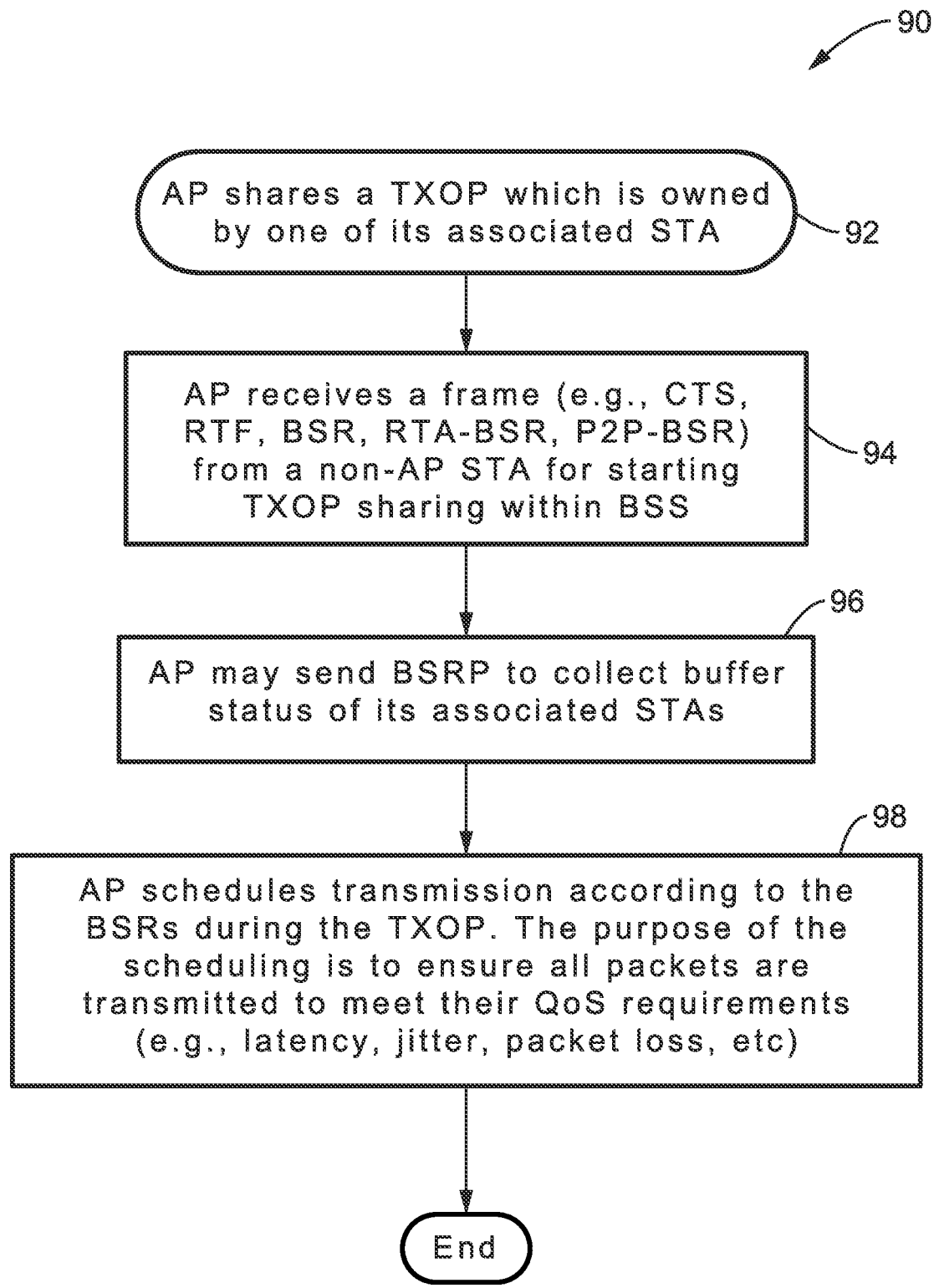
FIG. 22 is a flow diagram of an AP receiving a frame from a non-AP STA for starting TXOP sharing as performed according to at least one embodiment of the present disclosure.

FIG. 22 illustrates an example embodiment 90 of how an AP starts a TXOP sharing 92 within its associated BSS when the TXOP is owned by one of its associated STAs.

The AP receives a frame 94 from a non-AP STA for starting TXOP sharing within BSS. The AP may optionally send 96 a BSRP trigger frame to collect the buffer status of its associated STAs. For example, it may send a BSRP if it receives a CTS frame or RTF whose trigger type information is set to BSRP. The procedure of AP collecting the buffer status including the QoS requirements of its associated STAs is explained in FIG. 25. According to the buffer status of the associated STAs, the AP schedules transmissions 98 during the TXOP. The purpose of the scheduling is to perform a best effort toward satisfying the QoS requirements, such as latency, jitter and packet loss, for all the packets of the associated STAs.

4.4. Requested Trigger Frame Launched by Non-AP STA

This disclosed technology is capable of allowing a non-AP STA to request its associated AP to send a trigger frame.

Figure 23:
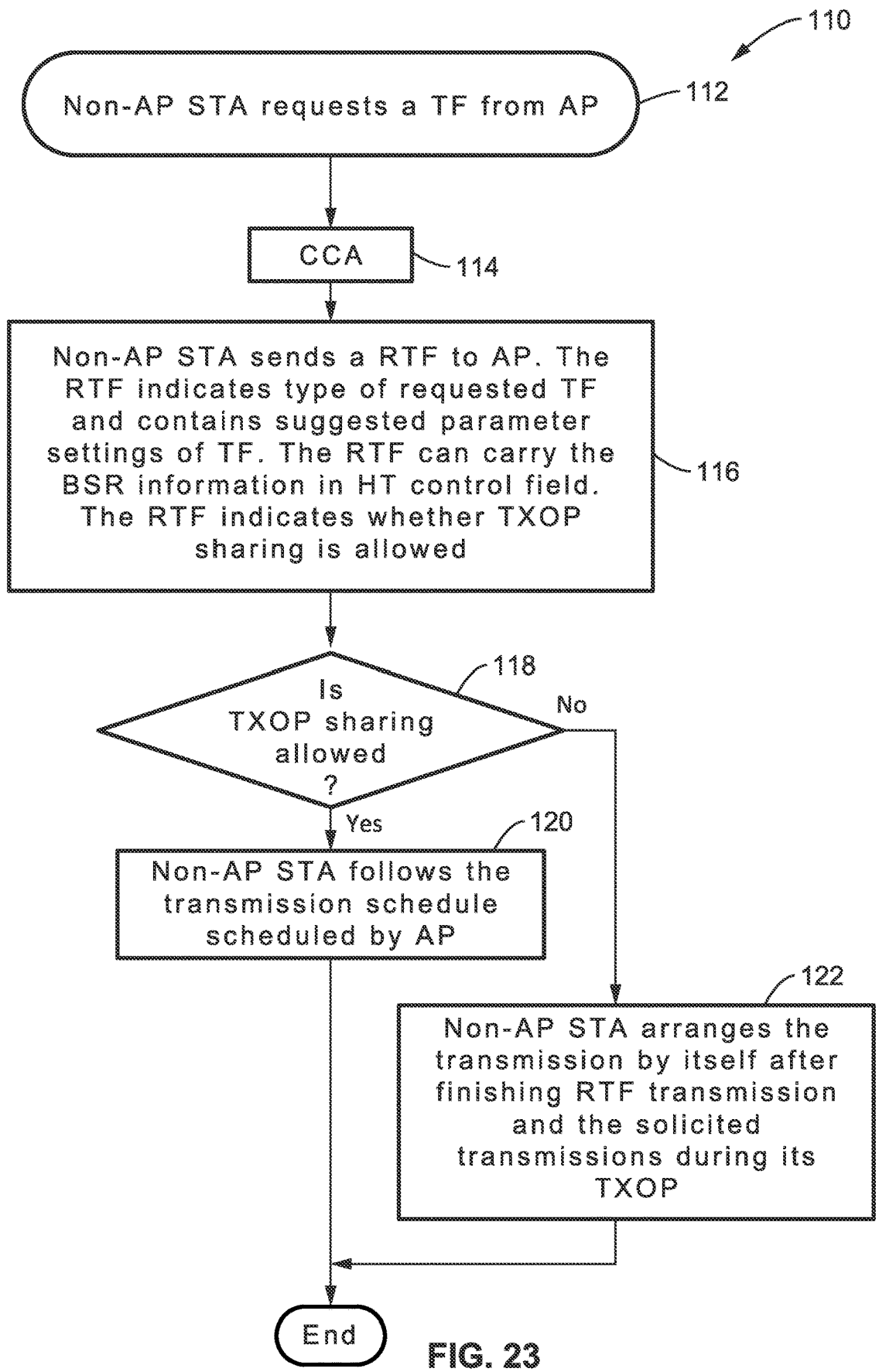
FIG. 23 is a flow diagram of a non-AP STA sending an RTF according to at least one embodiment of the present disclosure.

FIG. 23 illustrates an example embodiment 110 of how a non-AP STA requests a TF from its associated AP. When a non-AP STA requests a TF from AP 112, it first performs a clear channel assessment (CCA) 114 in preparation for obtaining channel access. Then the non-AP STA sends 116 a RTF to the AP. The RTF indicates the type of requested TF and contains the suggested parameter settings of the TF. The RTF can carry Buffer Status Report (BSR) information in the High Throughput (HT) control field. The RTF indicates whether TXOP sharing is allowed.

A check 118 determines if TXOP sharing is allowed. If sharing is allowed, then at block 120 the non-AP STA follows the trigger-based transmissions scheduled by AP 120. Otherwise, if the sharing it not allowed, then at block 122 the non-AP STA arranges the transmission by itself after finishing RTF transmission and its solicited transmissions during its TXOP.

It should be appreciated that the TXOP sharing indication field and TXOP sharing duration field in the RTF can be optional. If those two fields are not included in the RTF or there is no other field in the RTF to indicate TXOP sharing, then TXOP sharing is not allowed by default.

It is possible that the TXOP sharing indication field in RTF can be replaced by setting the Receiver Address (RA) field to a special address which is negotiated with the AP to indicate that TXOP sharing is allowed.

It is possible that the TXOP sharing time field in the RTF can be replaced by setting frame duration of the RTF.

Figure 24:
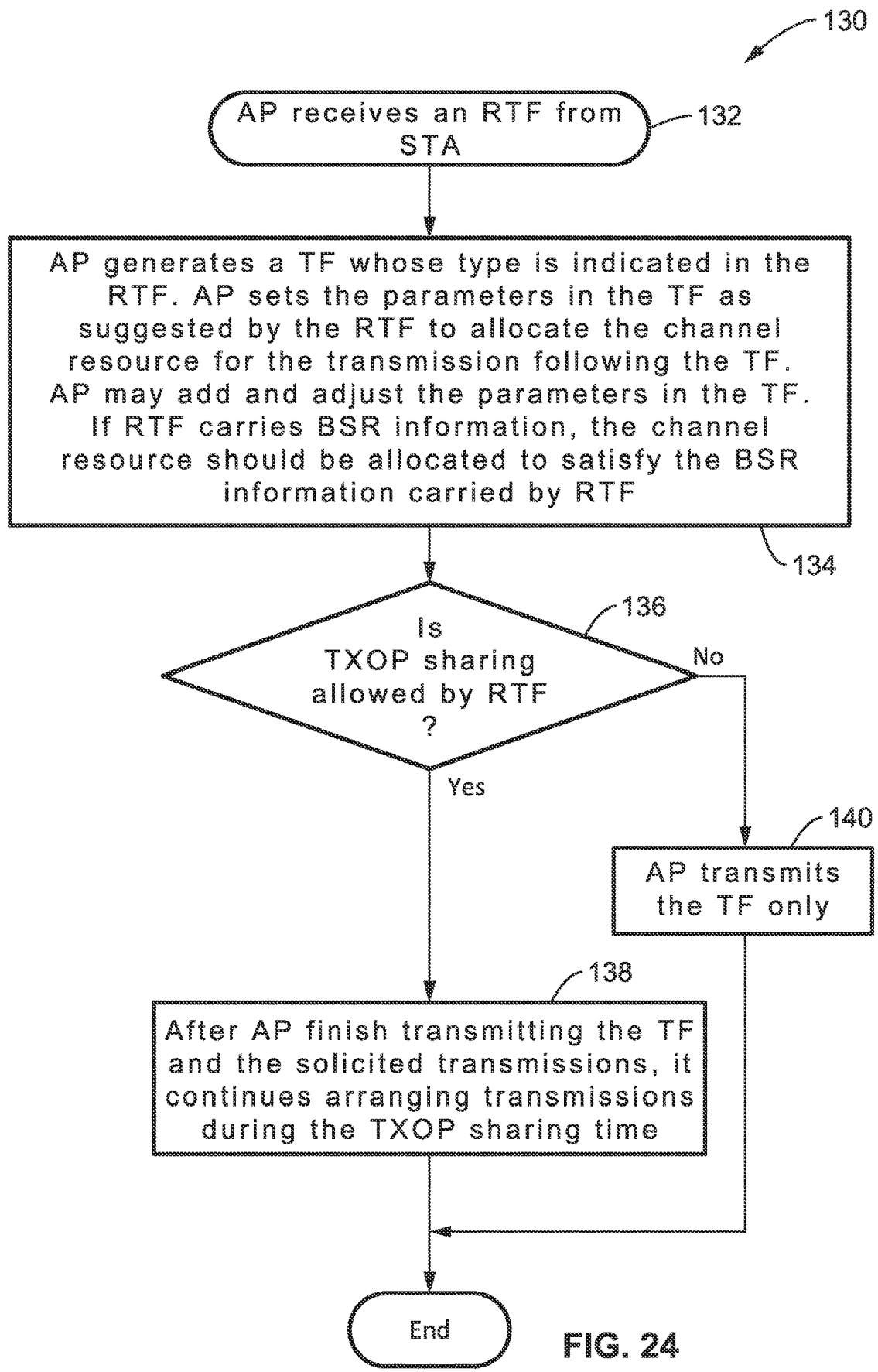
FIG. 24 is a flow diagram of an AP receiving an RTF according to at least one embodiment of the present disclosure.

FIG. 24 illustrates an example embodiment 130 of the reaction of an AP when it receives 132 an RTF from its associated non-AP STA.

When the AP STA receives an RTF from its associated STA 132, it generates 134 a TF whose type is indicated in the RTF. The AP sets the parameters in the TF as suggested by the RTF to allocate the channel resource for the transmission following the TF. The AP may add and adjust the parameters in the TF. If the RTF carries BSR information, then the channel resource should be allocated to satisfy the BSR information carried by RTF 134.

A check is performed 136 to determine if TXOP sharing is allowed by the RTF, i.e., the TXOP sharing indication field of RTF is set to "1", and then TXOP sharing is allowed. After the AP finishes transmitting the TF and the solicited transmissions, then if the condition is met with sharing allowed, then it continues arranging transmissions 138 during the TXOP sharing time which is indicated in the RTF. Otherwise, if sharing is not allowed then the AP transmits the TF only 140.

It should be appreciated that the TXOP sharing indication field and TXOP sharing duration field in the RTF can be optional. If those two fields are not included in the RTF, or there is no other field in the RTF to indicate TXOP sharing, then TXOP sharing is not allowed by default.

In at least one embodiment the TXOP sharing indication field in the RTF can be replaced by setting the RA field to a special address which is negotiated with the AP to indicate that TXOP sharing is allowed. In at least one embodiment the TXOP sharing time field in RTF can be replaced by setting the frame duration of RTF.

4.5. Buffer Status Collection

This section explains how an AP collects buffer status for its associated STAs. During the TXOP sharing time, as described in a previous section, it is important for the AP to collect buffer status including the QoS requirements on its associated STAs. According to the buffer status of its associated STAs, the AP can schedule the transmissions during the TXOP sharing time to satisfy the QoS requirements of all the packets of the STAs.

Let us assume all the packets have an expiration time and that the packets should be transmitted before their respective expiration time. The RTA packets may have short expiration times, while non-RTA packets typically have longer expiration times. Each STA knows the expiration time of each packet in its buffer. It should be appreciated that this buffer status collection procedure can be utilized for transmission scheduling during the TXOP time owned by the AP.

Figure 25:
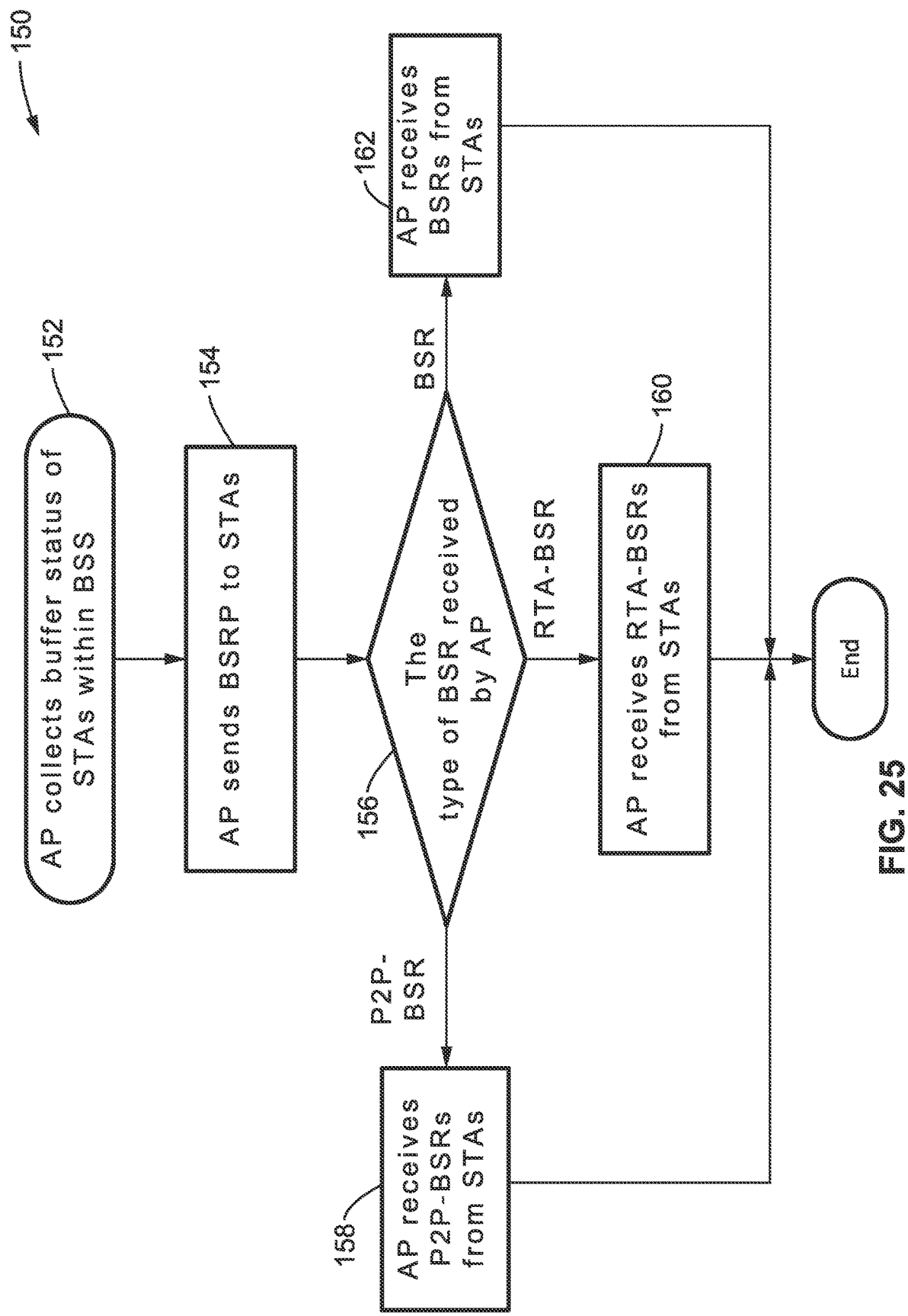
FIG. 25 is a flow diagram of an AP collecting buffer status of STAs within its BSS according to at least one embodiment of the present disclosure.

FIG. 25 illustrates an example embodiment 150 of how an AP collects the buffer status of its associated STAs. When the AP collects buffer status of its associated STAs 152, it sends 154 a BSRP frame to those STAs. Then it can receive different types of buffer status reports from those STAs. At block 156 a check is made for the type of buffer status report.

It should be appreciated that besides the BSR frame defined in IEEE 802.11ax, the disclosed technology also defines another two types of BSR frames, i.e., P2P-BSR frame and RTA-BSR frame. The P2P-BSR frame is used to report the buffer that is for peer to peer transmission. The RTA-BSR frame is used to report the buffer status of the RTA packets which has low latency requirement. The RTA-BSR frame includes the expiration time of the buffer which means the packets in the reported buffer must be transmitted before their respective expiration times to meet latency requirements. The details of the P2P-BSR frame and RTA-BSR frame are explained later in Section 4.7. Due to the use of different types of BSR, the AP can receive P2P-BSR frames from some STAs 158, receive RTA-BSR frames from some STAs 160, and BSR frames as defined in IEEE 802.11ax from other STAs 162.

Figure 26:
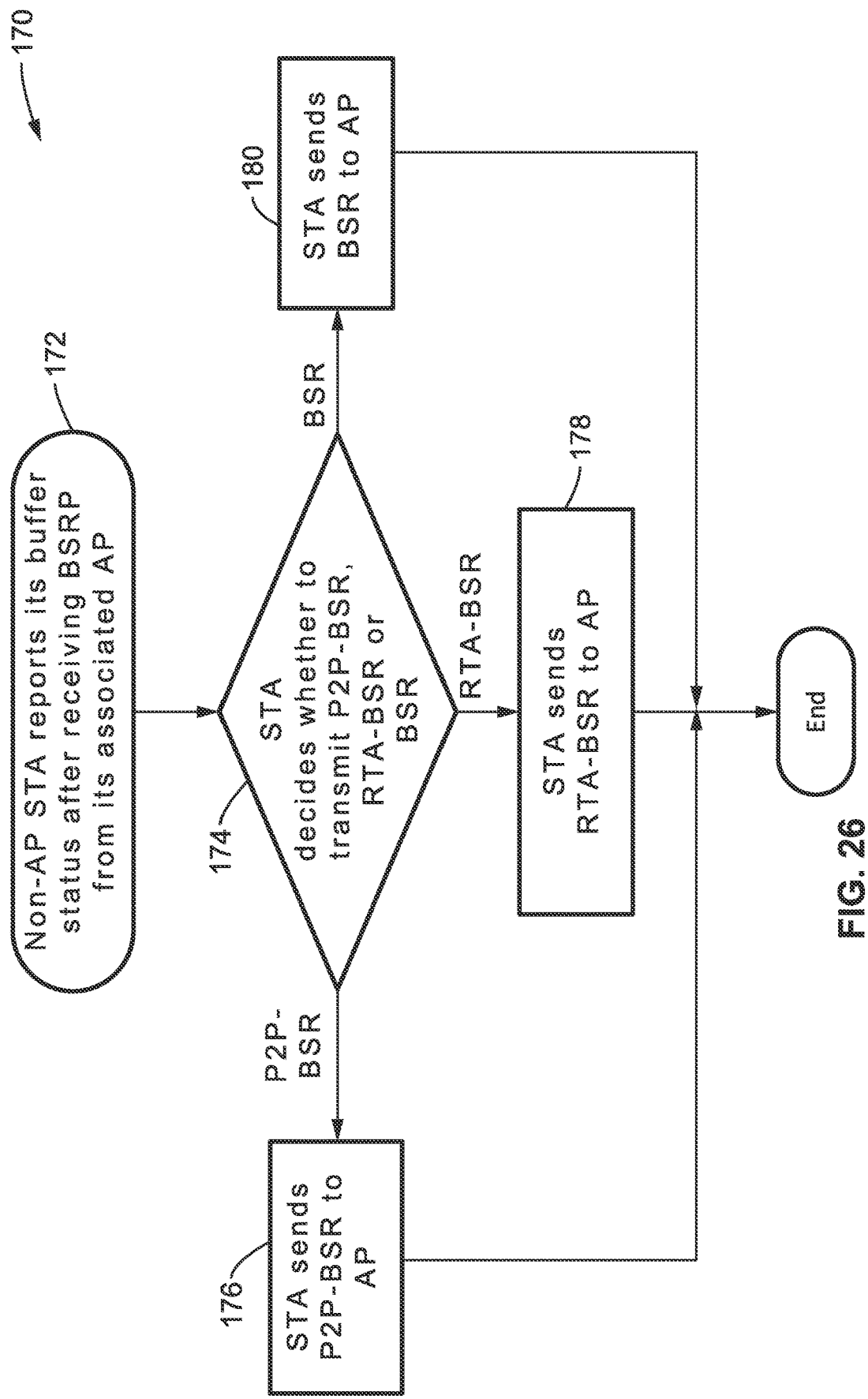
FIG. 26 is a flow diagram of a non-AP STA reporting its buffer status to its associated AP according to at least one embodiment of the present disclosure.

FIG. 26 illustrates an example embodiment 170 of how a STA reports its buffer status to the AP. When a non-AP STA receives BSRP from its associated AP, it needs to report its buffer status 172. The STA first can decide 174 which type of BSR to report to the AP. The STA can decide to send a P2P-BSR frame 176, which indicates that there is a buffer for P2P transmissions. A STA can decide to send RTA-BSR frame 178 which indicates that there is buffer for RTA packets that require to be transmitted before their expiration time. The STA can decide to send a BSR frame 180 as defined in IEEE 802.11ax, which indicates the general buffer status of the STA.

4.6. Examples

4.6.1. Request Trigger Frame by Non-AP STA

This section provides several examples to explain how a non-AP STA requests a trigger frame from its associated AP. The network topology of these examples is shown in FIG. 20, however in this example, only transmissions on Link1 are considered. This section assumes that the RTF does not have the TXOP sharing indication field and TXOP sharing time field.

Figure 27:
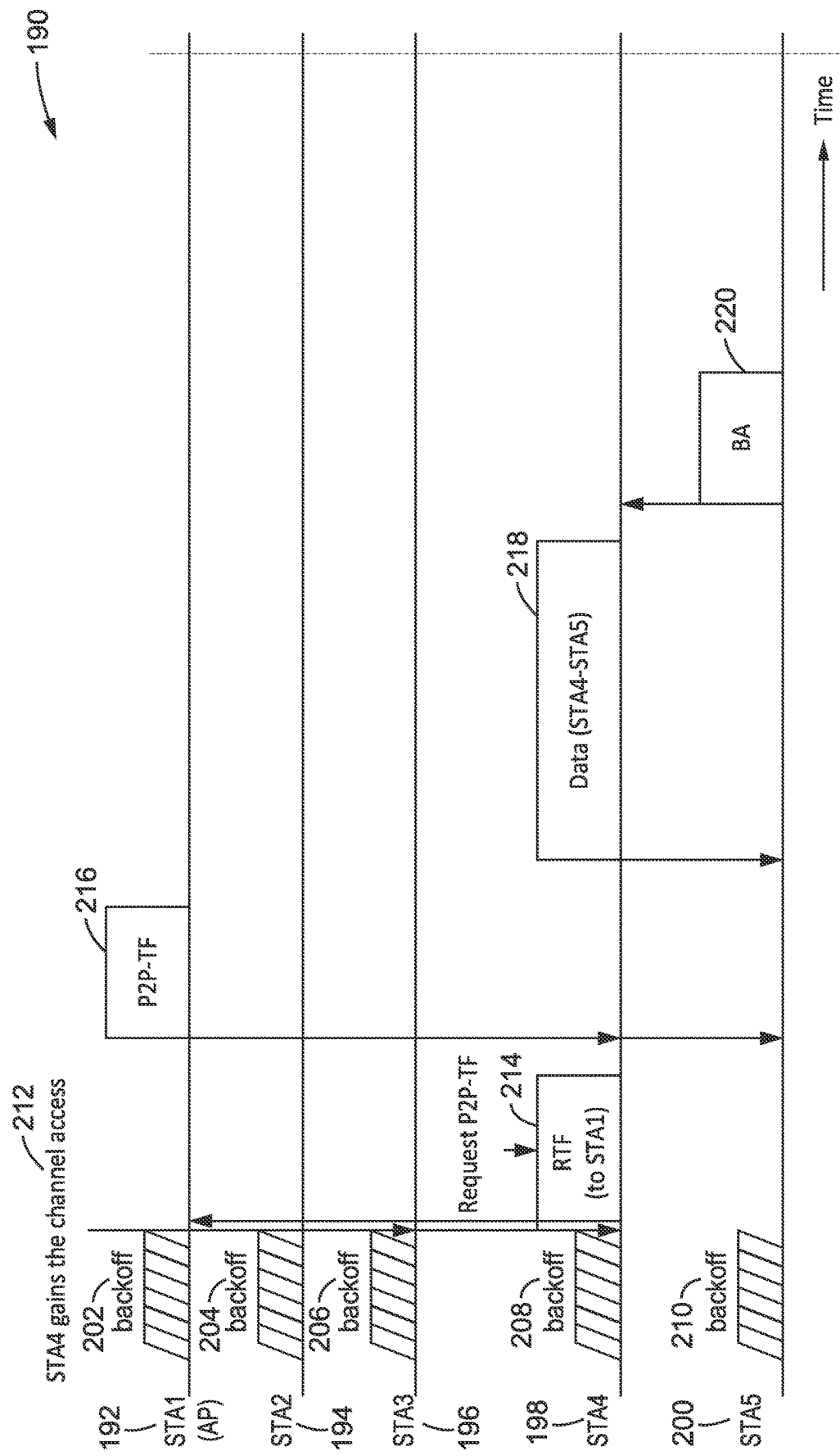
FIG. 27 is a communications sequence diagram with an example of a non-AP STA requesting a P2P trigger frame from the AP according to at least one embodiment of the present disclosure.

FIG. 27 illustrates an example embodiment 190 of a non-AP STA requesting a P2P trigger frame by sending an RTF frame to the AP. As shown in the figure, all the STAs (STA1 192, STA2 194, STA3 196, STA4 198 and STA5 200), are contending for the channel together with backoffs 202, 204, 206, 208 and 210, with STA4 obtaining channel access 212. It should be appreciated that this is just an example for illustrating operations and it will be appreciated that in this and the following examples any number of stations may be contending for the channel.

Then STA4 sends an RTF frame 214 to the AP to request a P2P trigger frame to launch the P2P transmission from STA4 to STA5. This procedure is explained in 116 of FIG. 23. The format of RTF frame is explained in FIG. 55. In response to this the AP sends a P2P trigger frame 216 to its associated STA4 to launch a P2P transmission from STA4 to STA5 as requested by the RTF. Since the RTF indicates to use the whole channel for P2P transmission, the AP allocates the whole channel to this P2P transmission. STA4 is seen transmitting data 218 after which STA5 responds with a block acknowledgment (BA) 220.

Figure 28:
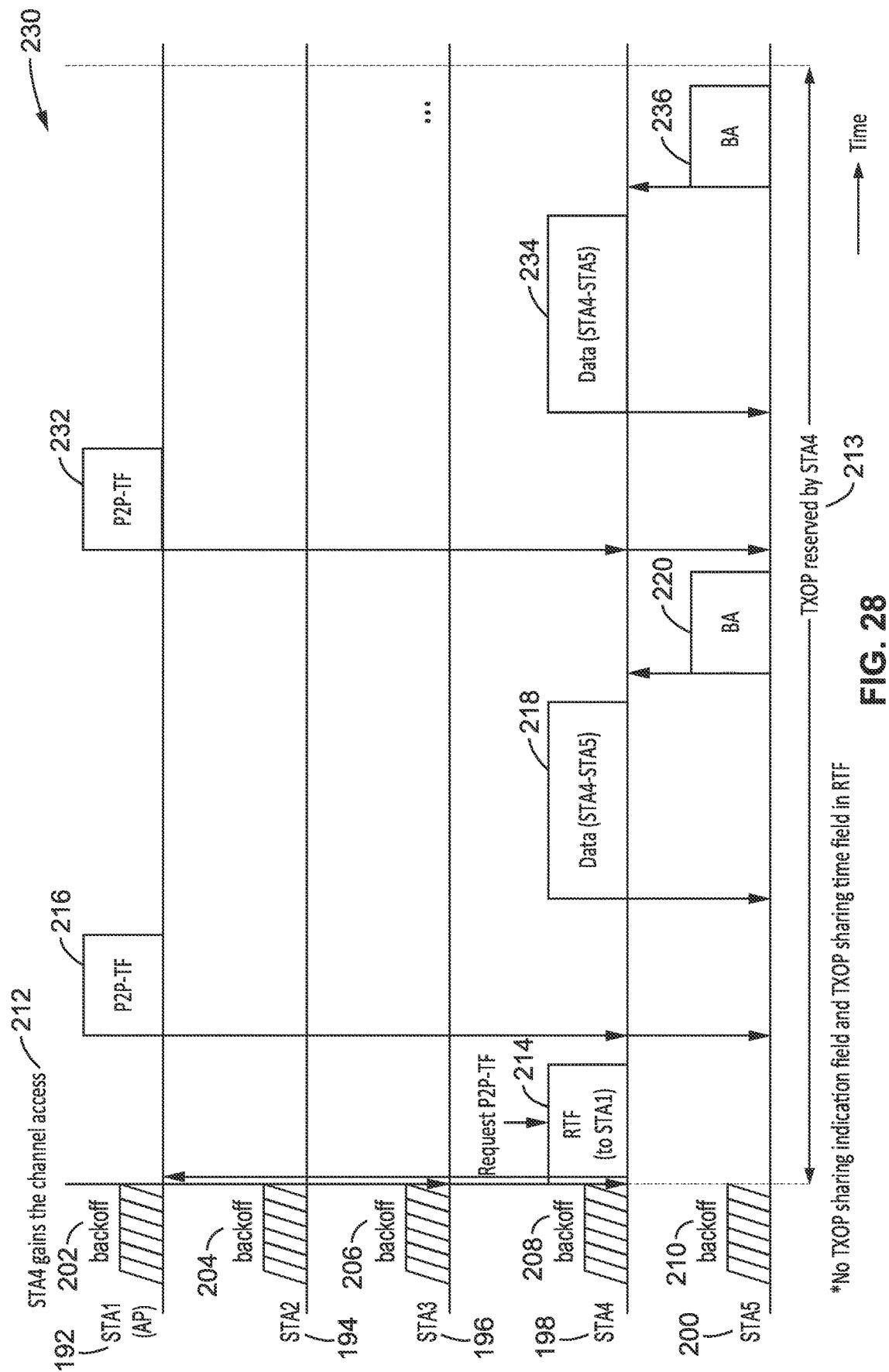
FIG. 28 is a communications sequence diagram with an example of a non-AP STA requesting a P2P trigger frame from the AP and the AP sending multiple P2P-TFs according to at least one embodiment of the present disclosure.

FIG. 28 illustrates an example embodiment 230 of a non-AP STA requesting a P2P trigger frame from the AP and the AP then sending multiple P2P-TFs.

As was shown in the previous figure, all the STAs (STA1 192, STA2 194, STA3 196, STA4 198 and STA5 200), are contending for the channel together with backoffs 202, 204, 206, 208 and 210, with STA4 obtaining channel access 212, reserving TXOP 213, sending an RTF 214, receiving a P2P-TF 216 from the AP, transmitting data 218 to STA5, and receiving an acknowledgement via a Block Acknowledgement (BA) 220.

Upon the completion of the data PPDU after the trigger frame, if the AP sends additional P2P-TFs 232, then the STA can continue transmitting more PPDUs 234, to which STA5 responds with BA 236. The AP can trigger as many data PPDUs up to the duration of the TXOP being reserved (in this cases STA4 reserved a TXOP). Thus, in the figure after the AP sends the first P2P-TF and STA4 finishes the P2P transmission, the AP can send another P2P-TF to launch another P2P transmission of STA4 and so forth during the TXOP duration 213 reserved by STA4.

Figure 29:
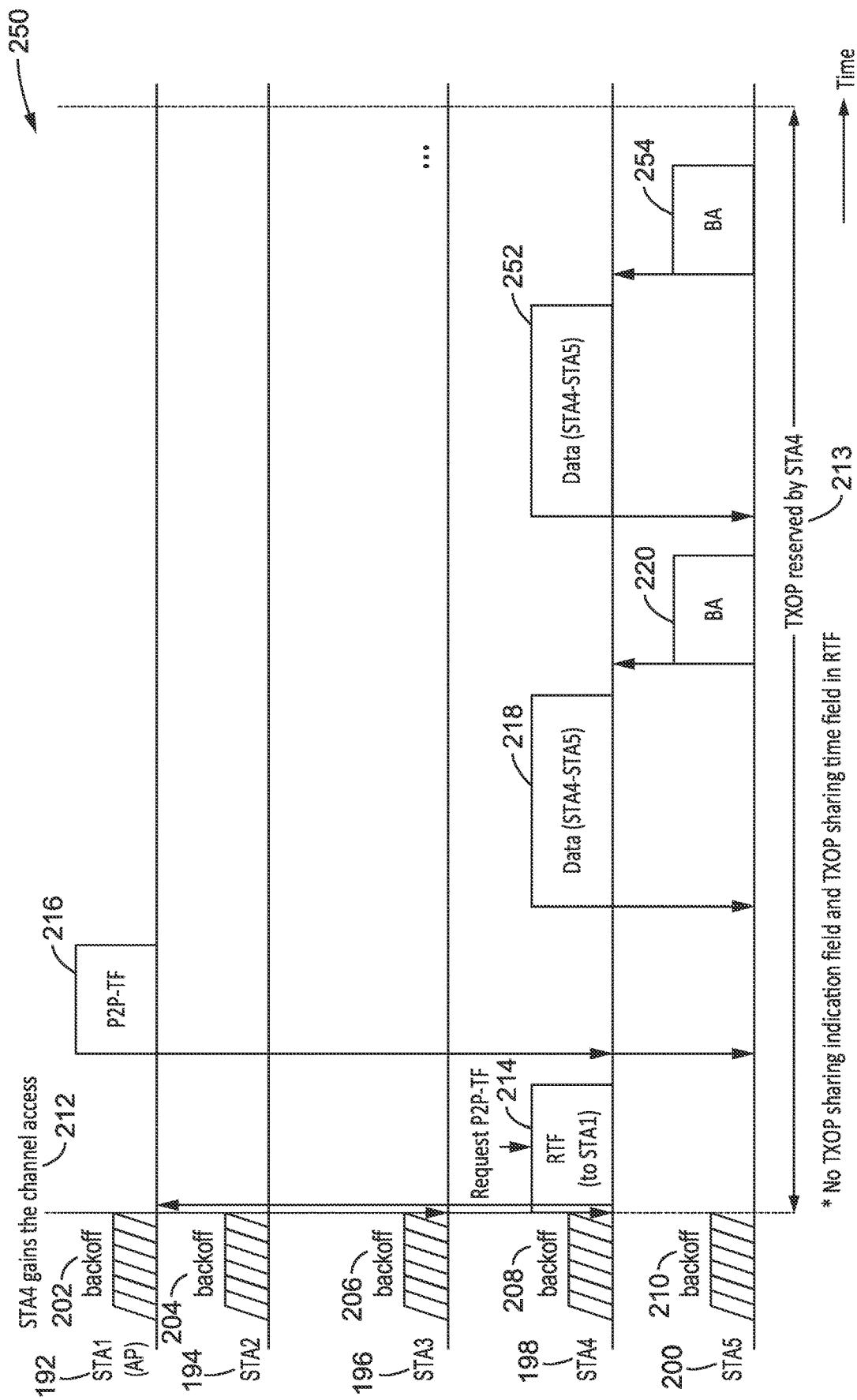
FIG. 29 is a communications sequence diagram with an example of a non-AP STA requesting a P2P trigger frame from the AP and the AP sending one P2P-TF for multiple P2P transmissions according to at least one embodiment of the present disclosure.

FIG. 29 illustrates an example embodiment 250 in which the P2P-TF assigns the resources (all or some of the available BW) given to the P2P data transmission for a specific period of time.

As was also shown in previous figures, all the STAs (STA1 192, STA2 194, STA3 196, STA4 198 and STA5 200), are contending for the channel together using backoffs 202, 204, 206, 208 and 210, with STA4 obtaining channel access 212, reserving TXOP 213, sending an RTF 214, receiving a P2P-TF 216 from the AP, and transmitting data 218 to STA5, followed by a receiving a BA 220.

In this example STA 4 can use these RUs for the time indicated in the P2P-TF. After the AP sends the P2P-TF, STA4 can use the resource assigned by the P2P-TF to transmit multiple P2P packets to STA5 during its TXOP, and is shown here also transmitting data 252, and receiving BA 254.

Figure 30:
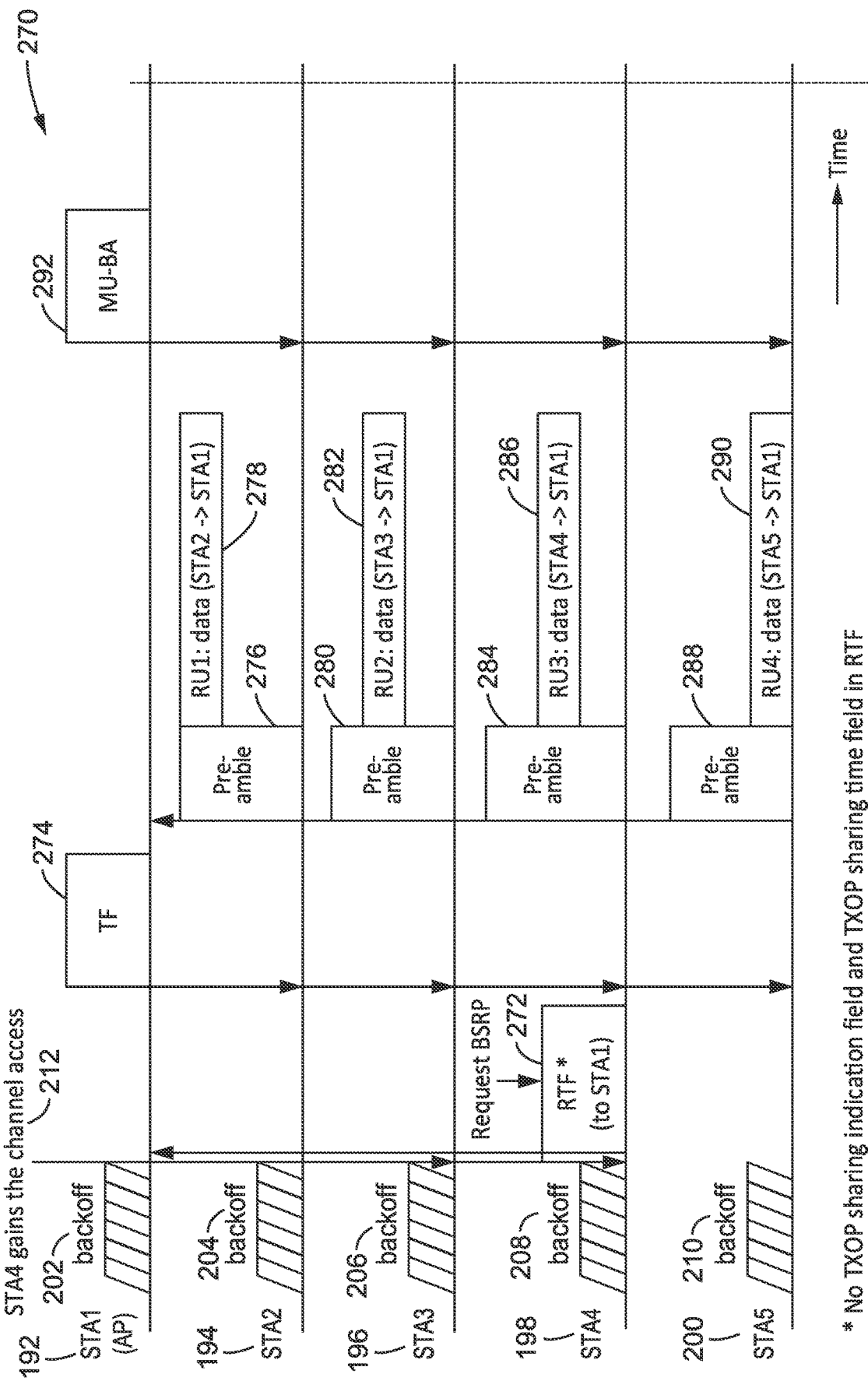
FIG. 30 is a communications sequence diagram with an example of a non-AP STA requesting a basic trigger frame from the AP according to at least one embodiment of the present disclosure.

FIG. 30 illustrates an example embodiment 270 of a non-AP STA requesting a (basic) trigger frame by sending an RTF frame to AP.

As was also shown in previous figures, all the STAs (STA1 192, STA2 194, STA3 196, STA4 198 and STA5

200), are contending for the channel together using backoffs 202, 204, 206, 208 and 210, with STA4 obtaining channel access 212.

Then in this example STA4 sends an RTF frame 272 to the AP to request a trigger frame to launch the trigger based UL transmission. The RTF can also carry the BSR information from STA4. This procedure is explained in block 116 of FIG. 23. The format of the RTF frame is describes later in relation to FIG. 55. Then, the AP sends a trigger frame 274 to its associated STA4 to launch a UL transmission for the data reported by BSR of STA4. STA4 indicates in the RTF that it only requests RU3 for UL transmission, with the remaining RUs, such as RU1, RU2, and RU4 can be utilized for UL transmissions by other STAs. In the example shown STA4 is seen sending preamble 284 followed by data on RU3 286 in transmitting to STA1. The other stations are seen using their assigned RUs, STA2 sending preamble 276 followed by data 278 on RU1, STA3 sending preamble 280 followed by data 282 on RU2, and STA5 sending preamble 288 followed by data 290 on RU4. After these transmissions a multi-user (MU) block acknowledgement (BA) 292 is shown being sent from the AP to each of the participating stations.

Figure 31:
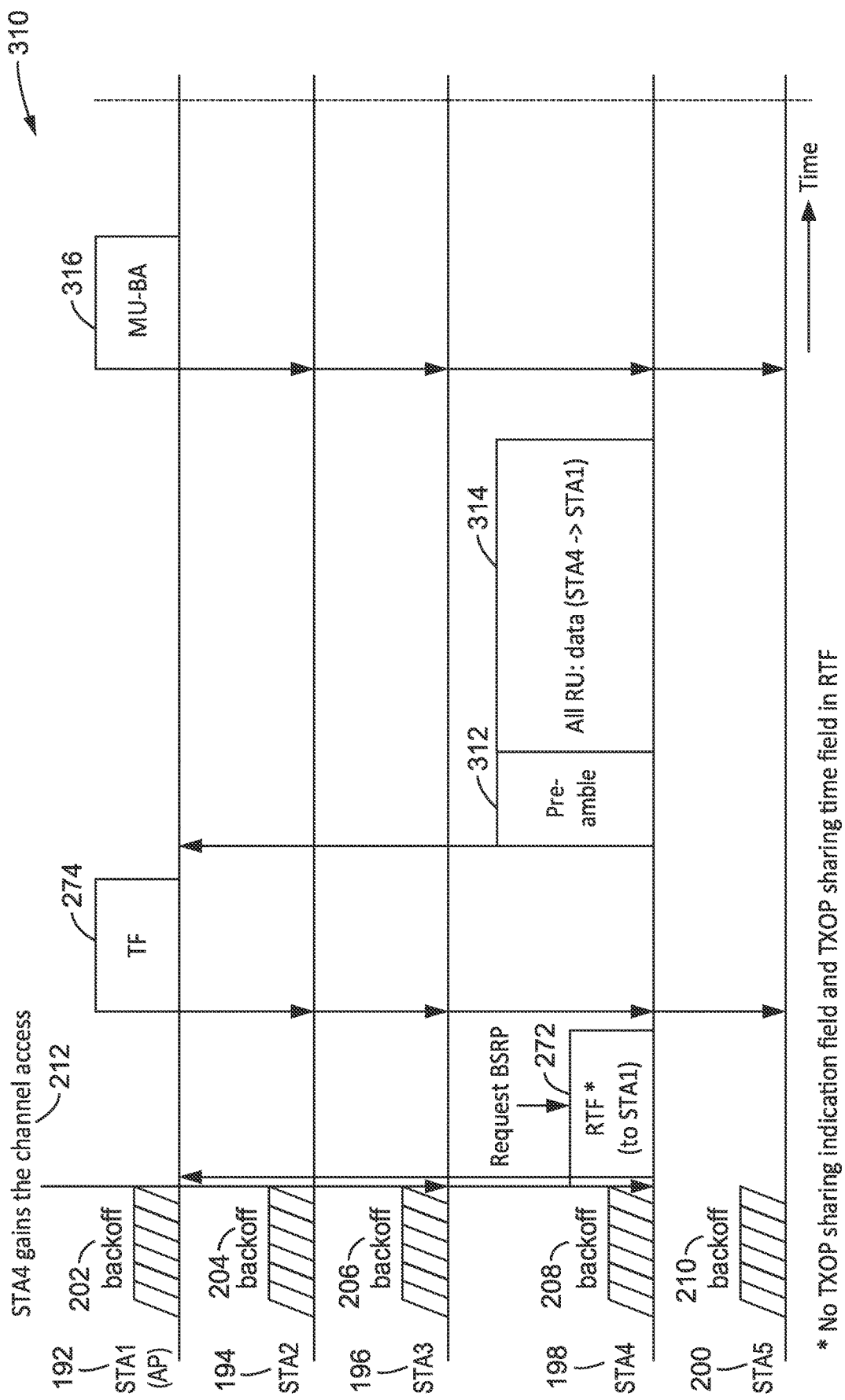
FIG. 31 is a communications sequence diagram with an example of a non-AP STA requesting a basic trigger frame from the AP to use all RUs as performed according to at least one embodiment of the present disclosure.

FIG. 31 illustrates an example embodiment 310 of non-AP STA requesting a basic trigger frame from the AP to use all RUs. So instead of the previous example of sharing the TXOP, in this case STA4 has decided to request in its trigger frame to use all of the channels; in response to which the AP sends a trigger frame 274 assigning all the RUs to STA 4 (SU-MIMO cases for example).

As was shown in previous figures, all the STAs (STA1 192, STA2 194, STA3 196, STA4 198 and STA5 200), are contending for the channel together using backoffs 202, 204, 206, 208 and 210, with STA4 obtaining channel access 212, sending an RTF 272 with BSRP.

Exemplified in this figure is a case in which in response to a request by the STA, the AP sends a TF 274 to assign all the RUs to that STA. In this case STA4 requested a (basic) trigger frame by sending an RTF frame 272 to the AP, and the AP responds by sending a TF 274 and allocating all the RUs to STA4 for uplink transmission. STA4 is seen transmitting a preamble 312 and data 314 across all the RUs which were assigned to it, after which the AP generates an MU-BA (e.g., this frame could also be an ACK or BA frame) 316.

Figure 32:
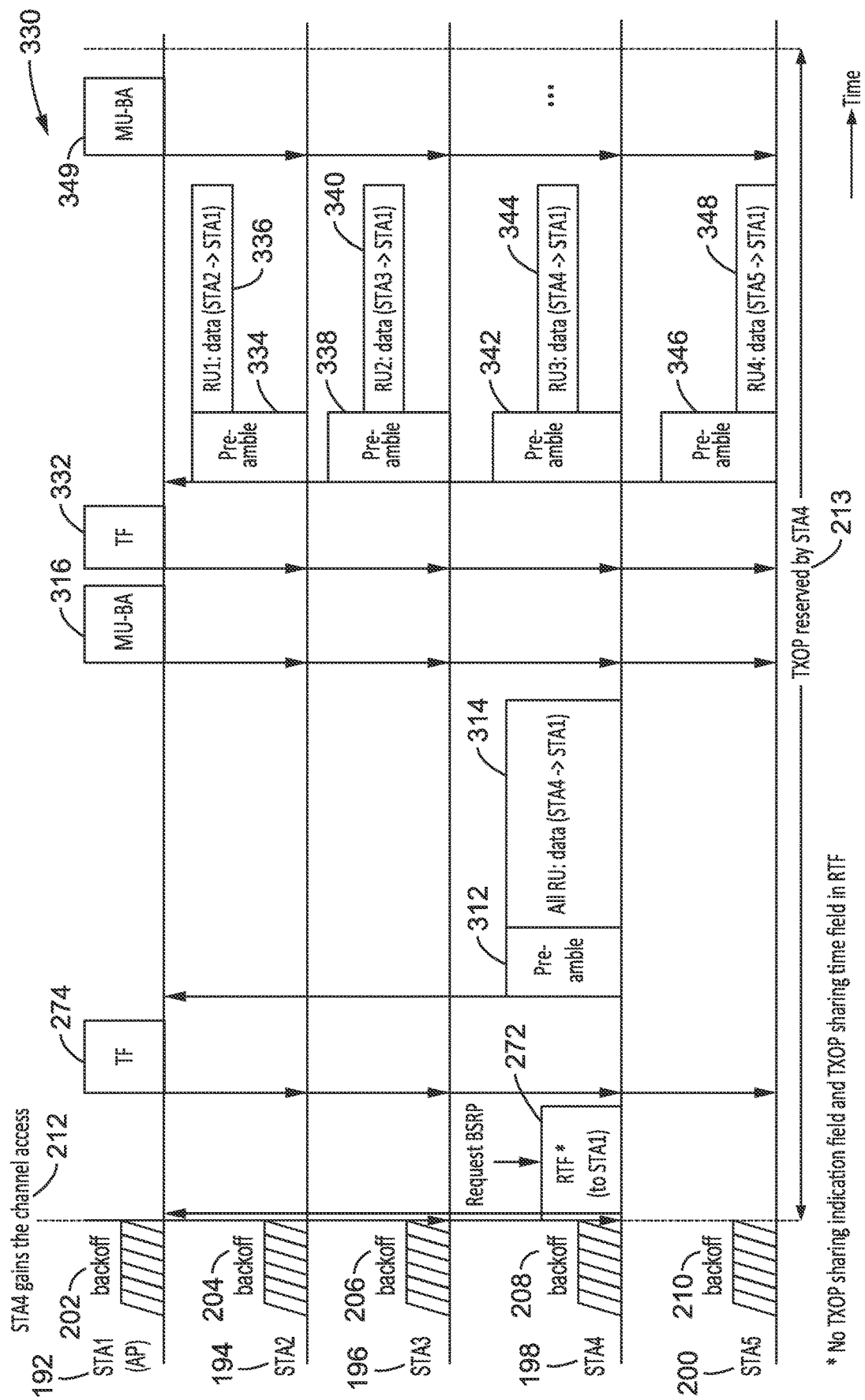
FIG. 32 is a communications sequence diagram with an example of a non-AP STA requesting a basic trigger frame from the AP and the AP sending one TF for multiple uplink transmissions according to at least one embodiment of the present disclosure.

FIG. 32 illustrates an example embodiment 330 of a non-AP STA requesting basic trigger frame from the AP and the AP responding by sending one TF for multiple uplink transmissions.

As was also shown in previous figures, all the STAs (STA1 192, STA2 194, STA3 196, STA4 198 and STA5 200), are contending for the channel together using backoffs 202, 204, 206, 208 and 210, with STA4 obtaining channel access 212, reserving TXOP 213, sending an RTF 272 for using all RUs, receiving a P2P-TF 274 from the AP, and transmitting preamble 312, and data 314 using all the RUs, followed by receiving an MU-BA 316.

In this example, upon the completion of the data PPDU after the trigger frame, the STA can continue transmitting more PPDUs if the AP sends additional TFs. The AP can trigger as many data PPDUs within the confines of the duration of the TXOP reserved by the STA (in this case STA4). In this specific example the AP sends another TF 332 and has assigned RUs to different STAs which each send preambles 334, 338, 342 and 346, followed by data 336, 340, 344 and 348 in the assigned RU, with the AP responding afterward with a MU-BA 349.

Figure 33:
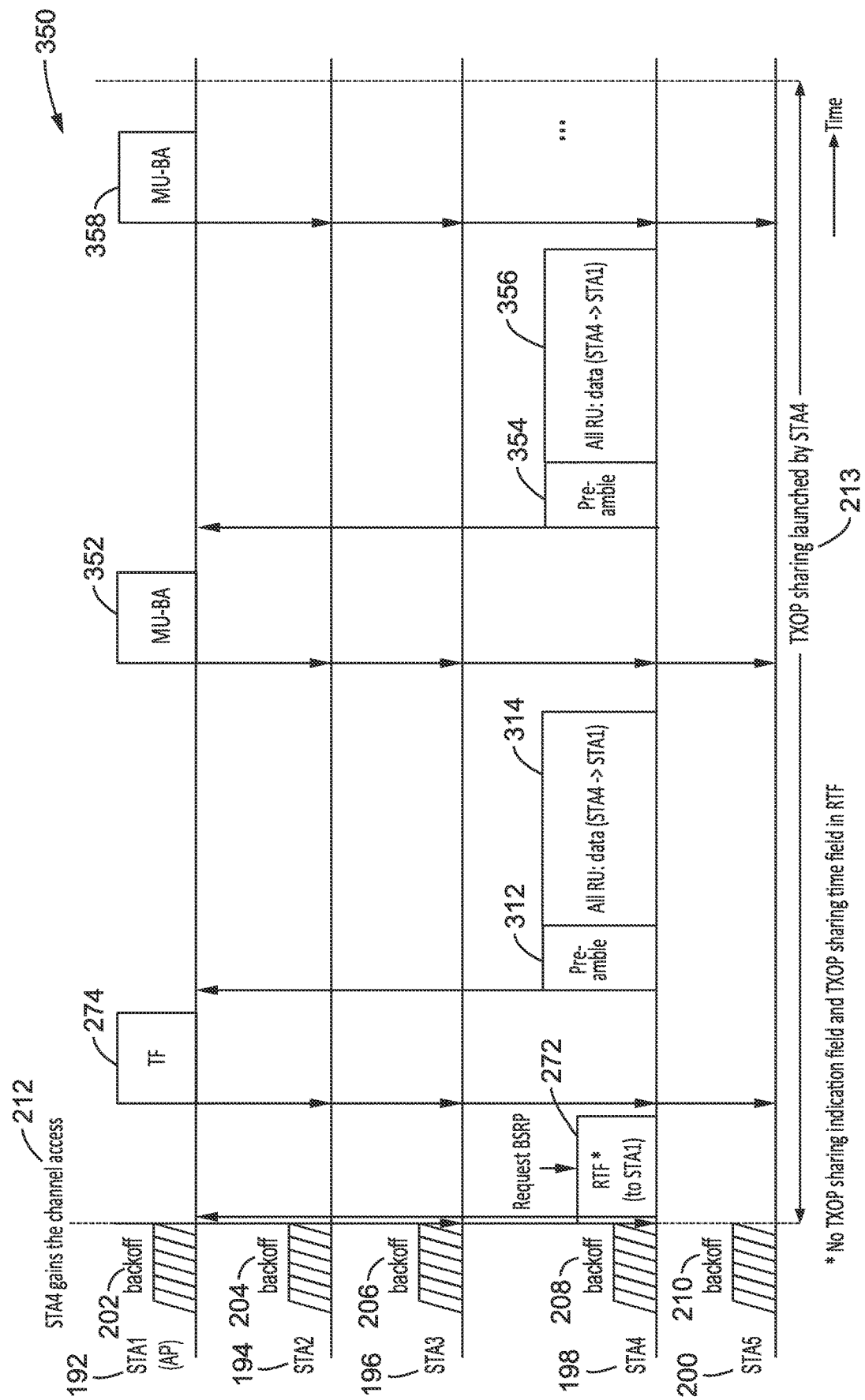
FIG. 33 is a communications sequence diagram with an example of a non-AP STA requesting a basic trigger frame from the AP and the AP sending multiple TFs according to at least one embodiment of the present disclosure.

FIG. 33 illustrates an example embodiment 350 of a non-AP STA requesting a basic trigger frame from the AP and the AP sending one TF for multiple UL transmissions, and the TF sets the RU allocation for all the UL transmissions. The TF can also be such that it assigns the resources (all or some of the available BW) is given to the STA4 UL data transmission for a specific period. STA4 can use these RUs for the time indicated in the TF. The figure is shown by way of example and not limitation.

As was also shown in previous figures, all the STAs (STA1 192, STA2 194, STA3 196, STA4 198 and STA5 200), are assumed to be contending for the channel together using backoffs 202, 204, 206, 208 and 210, with STA4 obtaining channel access 212, reserving TXOP 213, sending an RTF 272 for using all RU, receiving a TF 274 from the AP, and transmitting preamble 312, and data 314 using all the RU, followed by receiving an MU-BA 352. Then STA4 is seen sending additional data, exemplified as preamble 354 and data 356, exemplified as being across all RUs, and then receiving an MU-BA 358.

4.6.2. TXOP Sharing Launched by Non-AP STA

This section provides several examples to explain how a non-AP STA gains channel access and shares its TXOP within its BSS. The network topology of the examples is shown in FIG. 20, although in this case only the transmissions on Link1 are considered.

Figure 34:
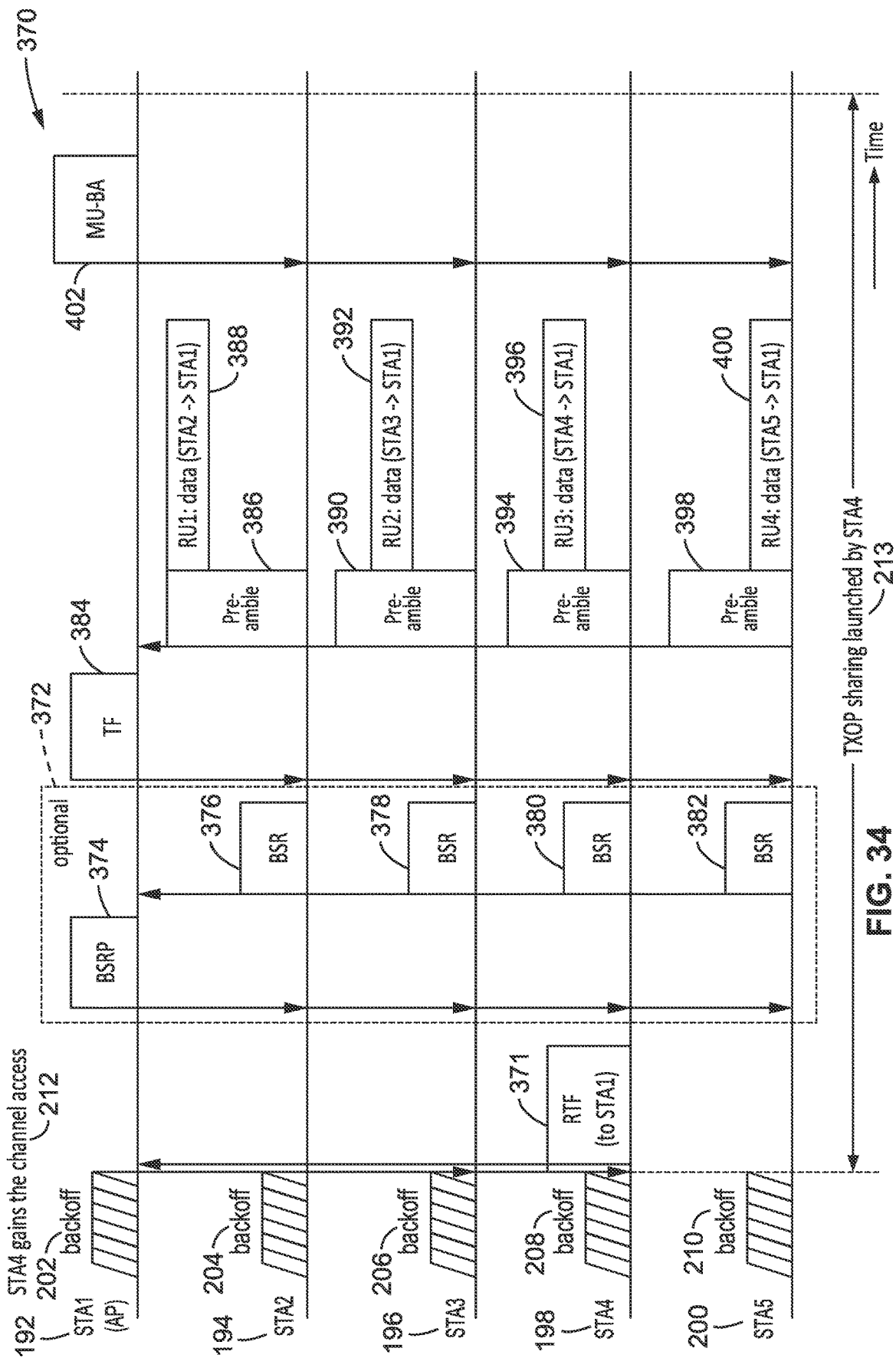
FIG. 34 is a communications sequence diagram with an example of a non-AP STA sharing a TXOP by sending an RTF frame to the AP according to at least one embodiment of the present disclosure.

FIG. 34 illustrates an example embodiment 370 of a non-AP STA sharing its TXOP within its associated BSS by sending an RTF frame to the AP.

As was also shown in previous figures, all the STAs (STA1 192, STA2 194, STA3 196, STA4 198 and STA5 200), are exemplified as contending for the channel using backoffs 202, 204, 206, 208 and 210, with STA4 obtaining channel access 212, and reserving TXOP 213.

STA4 sends an RTF frame 371 to the AP to launch TXOP sharing. This procedure is explained in block 76 of FIG. 21. The format of the RTF frame is described later in relation to FIG. 55. Then the AP may perform an optional information collection step 372 in which it sends a BSRP trigger frame 374 to its associated STAs, e.g., STA2 through STA5, to collect their buffer status 376, 378, 380 and 382, as explained in blocks 94 and 96 in FIG. 22. According to the buffer status of the STAs, the AP schedules the transmissions during the TXOP as explained in 98 in FIG. 21. In this example, the AP sends a trigger frame (TF) 384 to launch a multi-user uplink transmission. STA2 through STA5 transmit their packets after they receive a TF from AP. This procedure is explained in 82 in FIG. 21. The figure depicts sending preambles 386, 390, 394 and 398 then data 388, 392, 396 and 400, in their respective RUs. The AP responds at the end of these transmissions with a MU-BA 402. It should be appreciated that if the AP has already obtained a recent buffer status for the STAs, then it does not have to transmit a BSRP to collect buffer status of the STAs.

Figure 35:
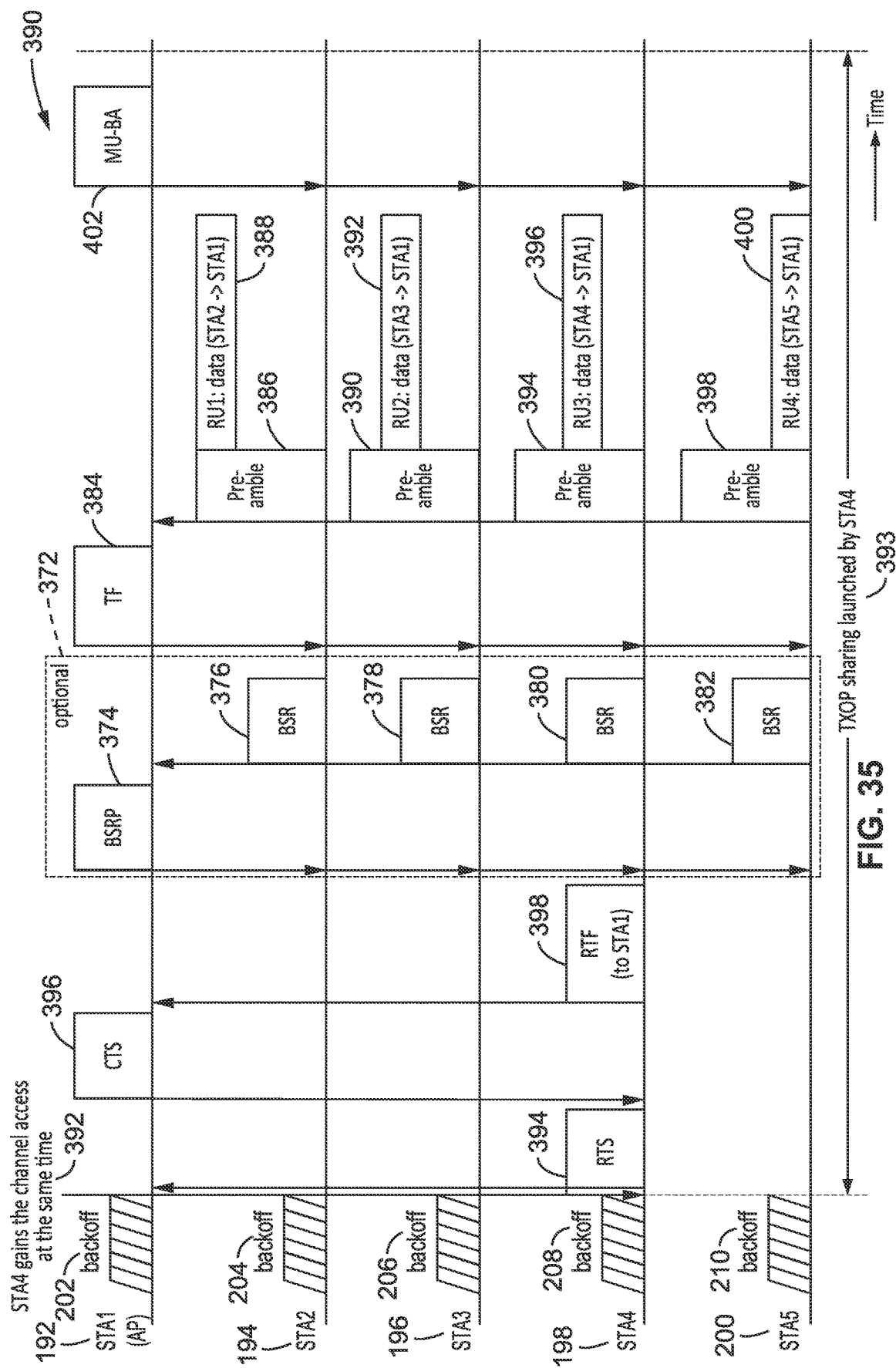
FIG. 35 is a communications sequence diagram with an example of a non-AP STA sharing a TXOP by sending an RTS frame to the AP according to at least one embodiment of the present disclosure.

FIG. 35 illustrates an example embodiment 390 of a non-AP STA sending RTS/CTS to reserve a TXOP first then shares it's TXOP within its associated BSS.

As was also shown in previous figures, all the STAs (STA1 192, STA2 194, STA3 196, STA4 198 and STA5 200), are exemplified as contending for the channel together using backoffs 202, 204, 206, 208 and 210.

STA4 gains channel access 392 and obtains the TXOP 393. Then, STA4 sends an RTS frame 394 to the AP and in response receives a CTS frame 396 from the AP to reserve a TXOP duration 393. After the TXOP is reserved, STA4 can send a frame, such as RTF 398 as shown in the figure, to share its TXOP within the BSS. Then the AP arranges the transmissions during the shared TXOP as explained in FIG. 34. It should be noted that if the AP already has the buffer status of the STAs, then it does not have to transmit a BSRP to collect buffer status of the STAs.

The remainder of the figure depicts the same collection of buffer status and launching multi-user uplink transmissions as was shown in the prior figure.

Figure 36:
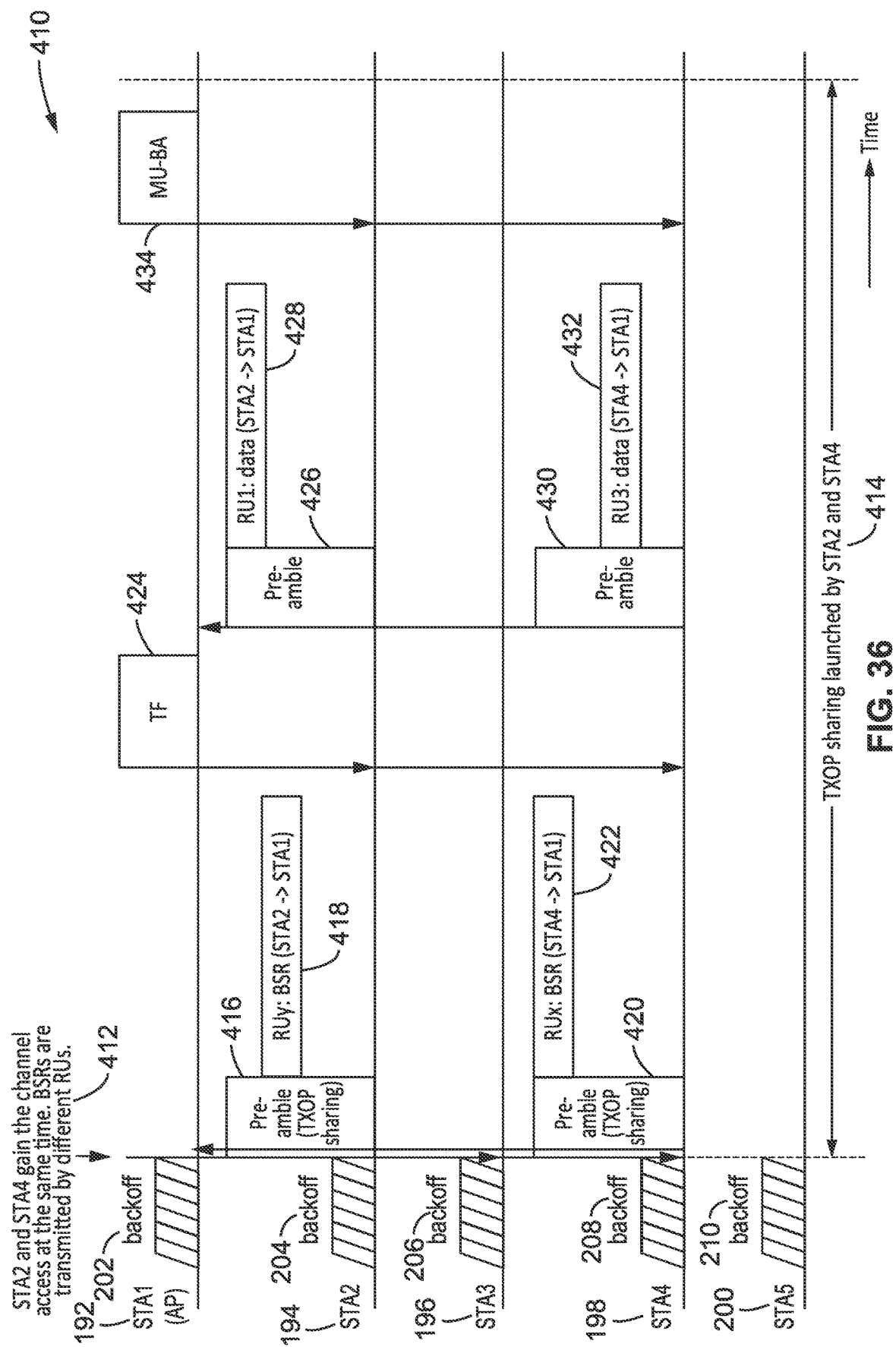
FIG. 36 is a communications sequence diagram with an example of a non-AP STA sharing a TXOP by sending an MU-BSR frame to the AP when two STAs use different RUs to carry buffer status reports in MU-BSR as performed according to at least one embodiment of the present disclosure.

FIG. 36 illustrates an example embodiment 410 of a non-AP STA sharing its TXOP within its associated BSS by sending a MU-BSR frame to AP.

As was also shown in previous figures, all the STAs (STA1 192, STA2 194, STA3 196, STA4 198 and STA5 200), are contending for the channel together using backoffs 202, 204, 206, 208 and 210.

STA2 and STA4 gain channel access 412 at the same time for sharing TXOP 414. STA2 and STA4 each send MU-BSR packets within the preambles 416 and 420 to the AP to launch TXOP sharing. This procedure is explained in block 76 of FIG. 21, with the preamble of MU-BSR explained in FIG. 58. There is a TXOP sharing indication in the preamble, such as a one-bit sharing field, to indicate this MU-BSR is for launching TXOP sharing.

The RU allocation in MU-BSR for carrying BSR frame could be prefixed by the negotiation between AP and STAs. Therefore, it is not necessary to indicate the RU allocation of BSR frames in the preamble. For example, a MU-BSR for launching TXOP sharing that is transmitted over 20 MHz band could use a random 26-tone resource unit (RU) to carry BSR frame. As shown in the example, STA2 uses RUy 418 and STA4 uses RUx 422 to carry their respective BSR frames to AP STA1.

The benefit of using MU-BSR is that when multiple STAs, e.g., STA2 and STA4 shown in the figure, gain channel access at the same time, their MU-BSR packets can be received by the AP without errors. This is because the content of their preambles is prefixed with the same (duplicate) information. Also, the BSR frames are carried by different RUs, wherein the AP can thus decode all the possible RUs, e.g., RUx and RUy, to receive the BSR frames. It is possible that the BSR frames shall be carried in the same PPDU format with the same packet length, with the same bit rate (e.g., 6 Mb/s rate) and with the TXVECTOR parameter SCRAMBLER_INITIAL_VALUE set to the same value.

If the non-AP STA receives a trigger frame (TF) from the AP before timeout, then the TXOP sharing succeeds as explained in blocks 78 and 80 in FIG. 21. In this example, AP sends a trigger frame (TF) 424 to launch a multi-user uplink transmission according to the buffer status of STA2 and STA4. STA2 and STA4 transmit their preambles 426 and 430, and packets 428 and 432 after they receive the TF from the AP. This procedure is explained in block 82 in FIG. 21. After packet transmission the AP sends a MU-BA 434 to acknowledge packet receipt.

It will be noted that FIG. 36 only shows an example that multiple STAs gains the channel access at the same time; although it is possible that only one STA gains channel access and sends the MU-BSR frame.

Figure 37:
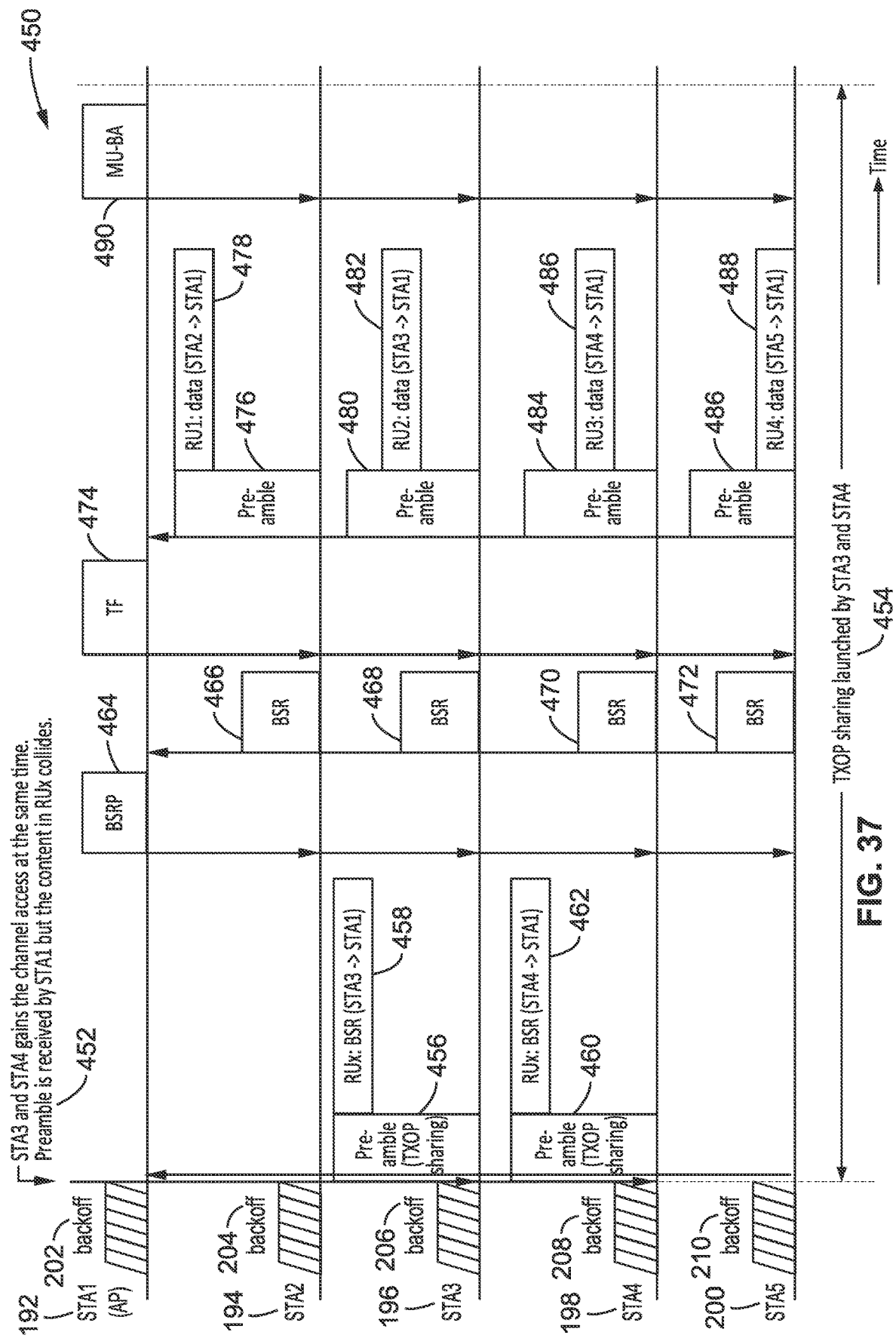
FIG. 37 is a communications sequence diagram with an example of a non-AP STA sharing the TXOP by sending a MU-BSR frame to the AP when two STAs use the same RU to carry buffer status reports in MU-BSR as performed according to at least one embodiment of the present disclosure.

FIG. 37 illustrates an example embodiment 450 of a non-AP STA sharing its TXOP within its associated BSS by sending a MU-BSR packet to the AP.

As was also shown in previous figures, all the STAs (STA1 192, STA2 194, STA3 196, STA4 198 and STA5 200), are contending for the channel together using backoffs 202, 204, 206, 208 and 210.

Again in this example STA2 and STA4 gain channel access at the same time 452 for sharing TXOP 454, and send their preambles 456 and 460 to the AP STA1. However, in this example the two STAs use the same RU to carry the BSR frames 458 and 462 in a MU-BSR packet to the AP to launch TXOP sharing. This procedure is explained in 76 of FIG. 21, with the preamble of MU-BSR explained in FIG. 58. There is one-bit TXOP sharing indication in the preamble to indicate this MU-BSR is for launching TXOP sharing.

The RU allocation in MU-BSR for carrying BSR frame could be prefixed by the negotiation between AP and STAs. Therefore, it is not necessary to indicate the resource unit (RU) allocation of the BSR frame in the preamble. For example, a MU-BSR for launching TXOP sharing that is transmitted over 20 MHz band can use a random 26-tone RU as defined in IEEE 802.11ax to carry a BSR frame. As shown in the example, both STAs use RUx to carry their BSR frame. It is possible that the BSR frames shall be carried in the same PPDU format with the same packet length, with the same bit rate (e.g., 6 Mb/s rate) and with the TXVECTOR parameter SCRAMBLER_INITIAL_VALUE set to the same value as they are set in the negotiation.

The benefit of using MU-BSR is that when multiple STAs, e.g., STA3 and STA4 shown in the figure, gain channel access at the same time, the preamble of their MU-BSR packets can be received by the AP without errors. This is because the content of their preambles provides a prefixed set of duplicate information. So although the BSR frames of STA2 and STA4 collide because they are carried by the same RU (i.e., RUx) the AP can still decode the preamble successfully and determine the start of TXOP sharing. Then, the AP is shown sending a BSRP 464 to collect the BSRs 466, 468, 470 and 472, from the STAs by sending the BSRP trigger frame and arranging the transmission during the TXOP.

In this example, after collecting the buffer status information, the AP sends a TF 474 to launch a multi-user UL transmission after collecting the BSRs from the STAs. The STAs are seen transmitting their preambles 476, 480, 484 and 486, followed by data 478, 482, 486 and 488 over different RUs to AP STA1, after which the AP responds with a MU-BA 490.

Thus it is seen that FIG. 37 primarily shows that multiple STAs gain channel access at the same time; while it is possible that only one STA gains channel access and sends MU-BSR.

Figure 38:
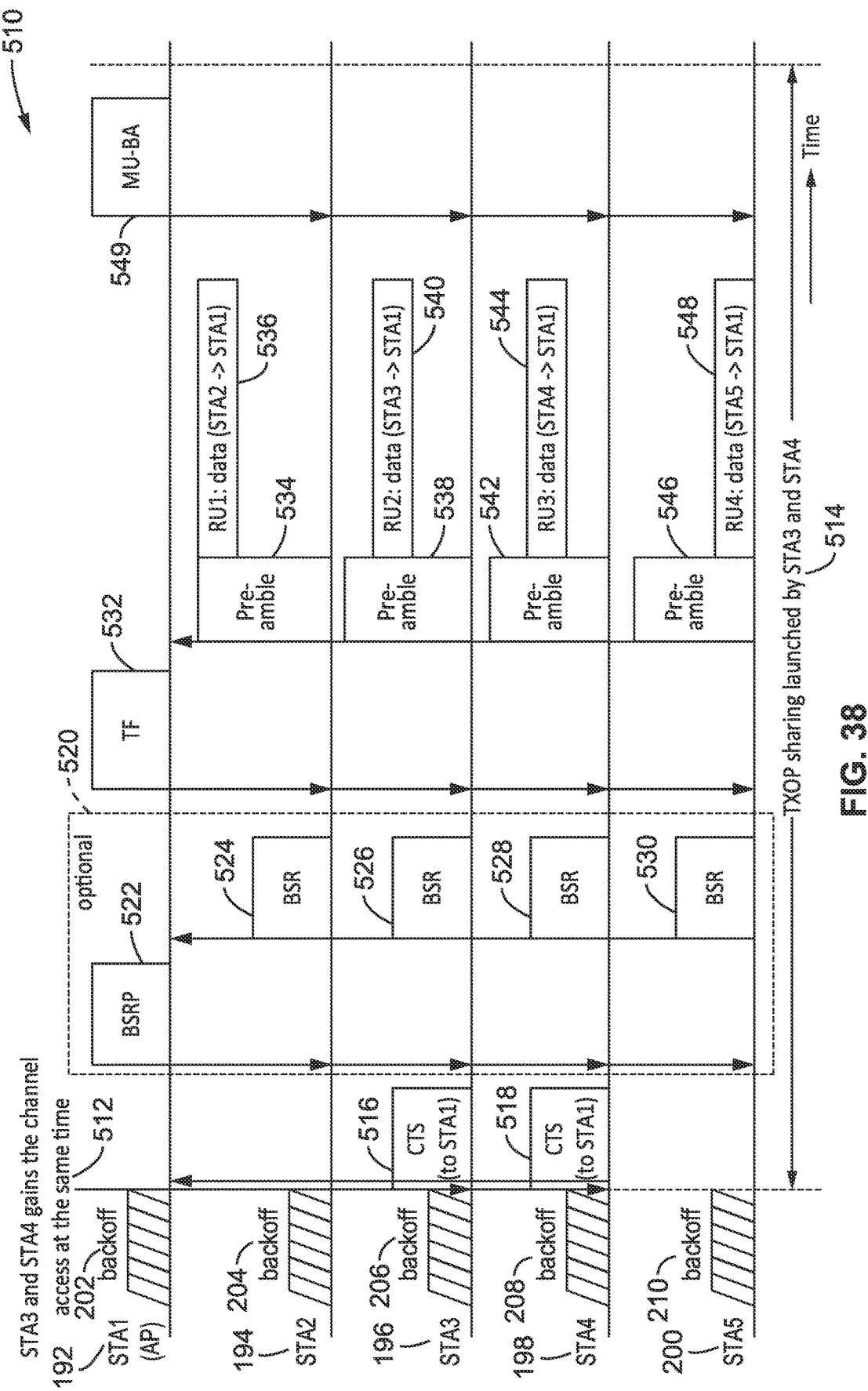
FIG. 38 is a communications sequence diagram with an example of a non-AP STA sharing a TXOP by sending a CTS frame to the AP according to at least one embodiment of the present disclosure.

FIG. 38 illustrates an example embodiment 510 of a non-AP STA sharing its TXOP within its associated BSS by sending a CTS frame to the AP.

As was shown in previous figures, all the STAs (STA1 192, STA2 194, STA3 196, STA4 198 and STA5 200), are contending for the channel together using backoffs 202, 204, 206, 208 and 210.

STA3 and STA4 gain channel access 512 at the same time for TXOP 514, and both send CTS frames 516 and 518 to the AP to launch sharing of TXOP 514. This procedure was described earlier for block 76 of FIG. 21. When STAs transmit a CTS frame, they can set the RA field of the CTS frame to the same specific address which is prefixed with duplicate information and negotiated with the AP to indicate the start of TXOP sharing. It is also possible that those CTS frames shall be carried in the same PPDU format (e.g., non-HT or non-HT duplicate PPDU) with a fixed rate (e.g., 6 Mb/s rate) and with the TXVECTOR parameter SCRAMBLER_INITIAL_VALUE set to the same value.

The benefit of using a CTS frame is that when multiple STAs, e.g., STA3 and STA4 shown in the figure, gain channel access at the same time, the CTS frames can be received by the AP without errors since the content of the CTS frames are the same. This is because the content of their preambles is prefixed to contain duplicate information as included in the CTS frame.

When the AP receives a CTS to indicate the start of TXOP sharing, it can determine that one STA obtains the TXOP and shares the TXOP within the BSS. The AP is exemplified as optionally collecting buffer status 520 by sending a BSRP trigger frame 522 and collecting BSRs 524, 526, 528 and 530, and the AP arranges the transmissions during the TXOP. Here in this example, after collecting buffer information the AP sends a TF 532 to launch a multi-user UL transmission seen with the STAs sending preambles 534, 538, 542 and 546 followed by data 536, 540, 544 and 548 on different RUs to AP STA1 which receives the data and transmits a MU-BA 549 to acknowledge these transmissions.

It should be noted that FIG. 38 only depicted an example in which multiple STAs obtained channel access at the same time; however, it is possible that only one STA gains channel access and sends the CTS frame.

Figure 39:
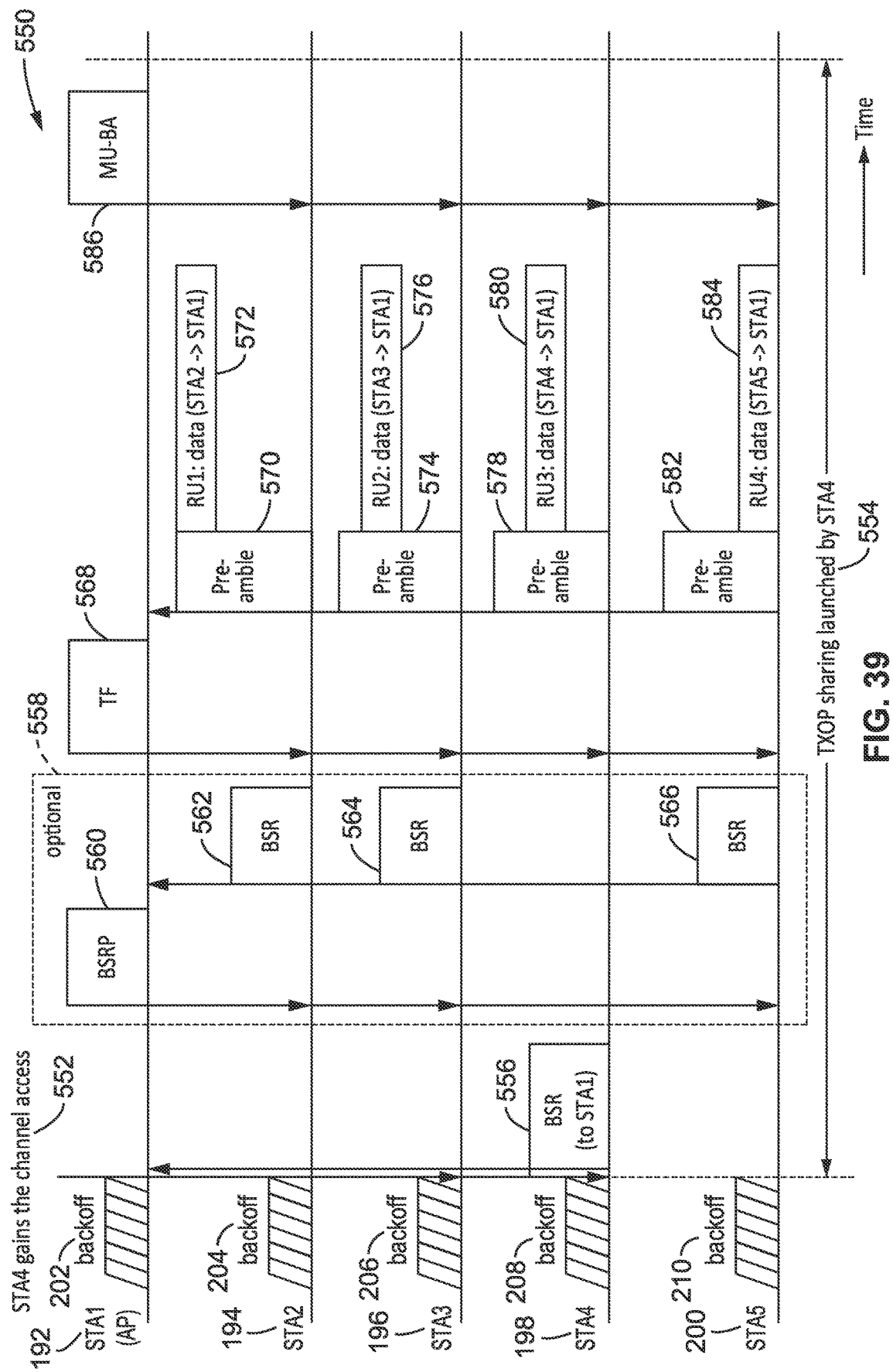
FIG. 39 is a communications sequence diagram with an example of a non-AP STA sharing a TXOP by sending a BSR frame to the AP according to at least one embodiment of the present disclosure.

FIG. 39 illustrates an example embodiment 550 of a non-AP STA sharing its TXOP within its associated BSS by sending a BSR frame to the AP.

As was depicted in previous figures, all the STAs (STA1 192, STA2 194, STA3 196, STA4 198 and STA5 200), are contending for the channel together using backoffs 202, 204, 206, 208 and 210.

STA4 gains channel access 552 and sends a BSR frame 556 to the AP to launch sharing of TXOP 554. This procedure was previously explained for block 76 of FIG. 21. When a STA transmits a BSR frame, it can set the RA field of the BSR frame to a specific address which is prefixed and negotiated with the AP to indicate the start of TXOP sharing. When the AP receives this BSR frame from STA4 indicating the start of TXOP sharing, the AP can determine which STA is to obtain and share the TXOP within the BSS.

The AP is seen here optionally collecting buffer status information 558 from the other STAs. The AP sends a BSRP trigger frame 560 to STA2, STA3 and STA5, and these STAs responds with BSRs 562, 564 and 566. Then, the AP can optionally collect the BSRs from other STAs by sending the BSRP trigger frame and arrange the transmission during the TXOP.

After collecting the BSRs from the STAs, the AP sends TF 568 to launch multi-user UL transmissions shown with preambles 570, 574, 578 and 582, followed by data 572, 576, 580 and 584 being sent to AP STA 1, which upon receiving the data acknowledges the transmissions with a MU-BA 586. Thus, the STAs transmit their packets through the RUs assigned by the P2P TF. As shown in the figure, the UL OFDMA transmissions of STA2 572 and STA3 576 are transmitted over RU1 and RU2, respectively, while the P2P transmission of STA4 is transmitted 578 over RU3 to STA1.

4.6.3. Enabling P2P Transmission

This section provides several examples to explain how a non-AP STA shares its TXOP within its BSS and launches a peer-to-peer (P2P) transmission during a shared TXOP. The network topology of these examples is shown in FIG. 20, although in this example only transmissions on Link1 are considered.

Figure 40:
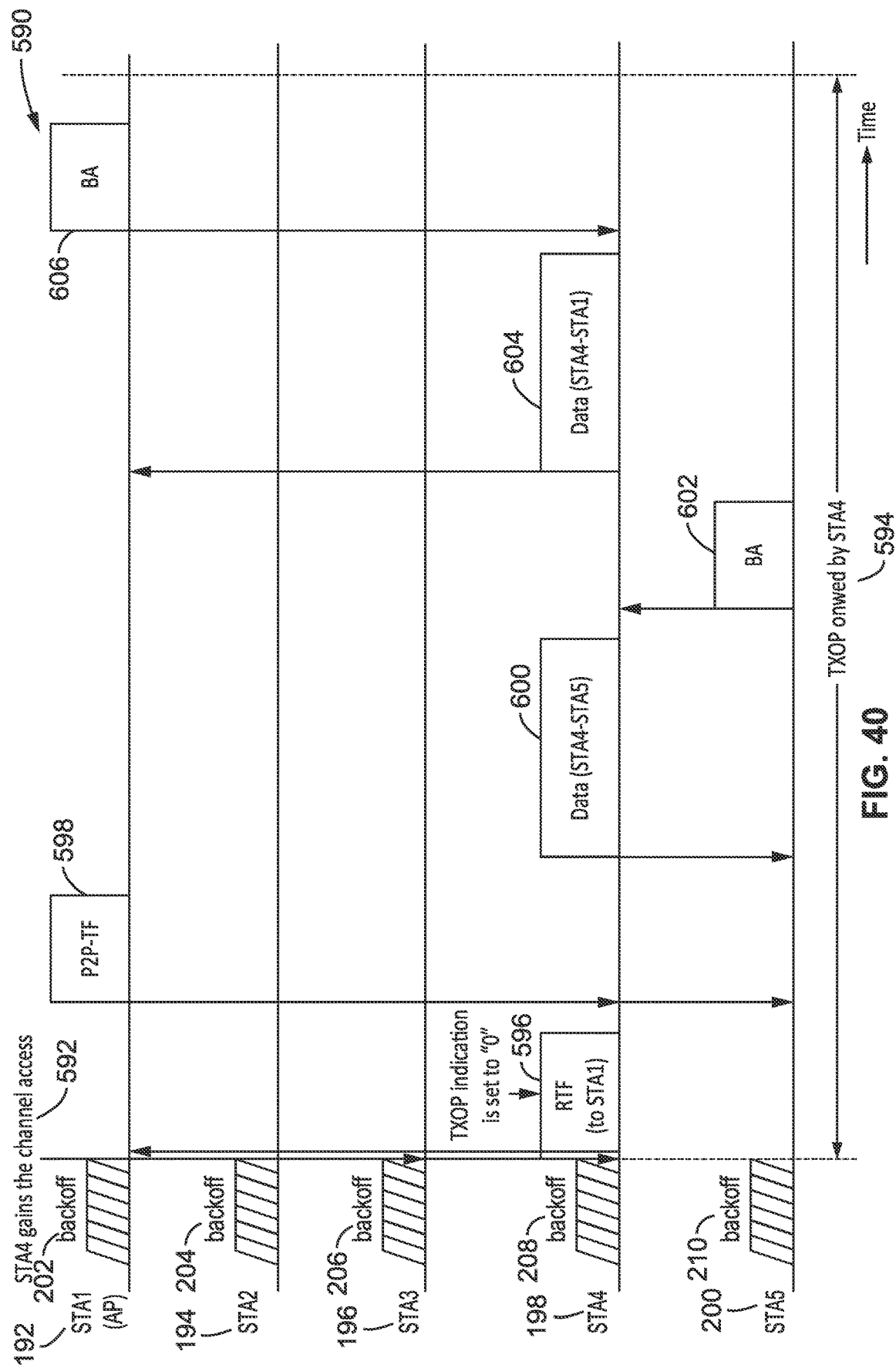
FIG. 40 is a communications sequence diagram with an example of a non-AP STA launching a P2P transmission by sending an RTF frame to the AP without sharing TXOP according to at least one embodiment of the present disclosure.

FIG. 40 illustrates an example embodiment 590 of a non-AP STA launching a P2P transmission by sending an RTF frame.

As was exemplified in previous figures, all the STAs (STA1 192, STA2 194, STA3 196, STA4 198 and STA5 200), are contending for the channel together using backoffs 202, 204, 206, 208 and 210, with STA4 obtaining channel access 592 for TXOP 594.

When STA4 gains channel access, it sends an RTF frame 596 to request a P2P trigger frame from the AP. Then, the AP sends the P2P trigger frame 598 to launch the P2P transmission 600 from STA4 to STA5.

In this example, the TXOP sharing indication contained in RTF 596 is set to a first state (e.g., "0"), indicating that STA4 does not want to share the TXOP within the BSS. After the P2P transmission ends, with STA5 acknowledging the transmission with a BA 602, then STA4 arranges transmissions by itself, and is shown transmitting another data frame 604, which in this example is sent to the to AP, and which the AP acknowledges with BA 606.

Figure 41:
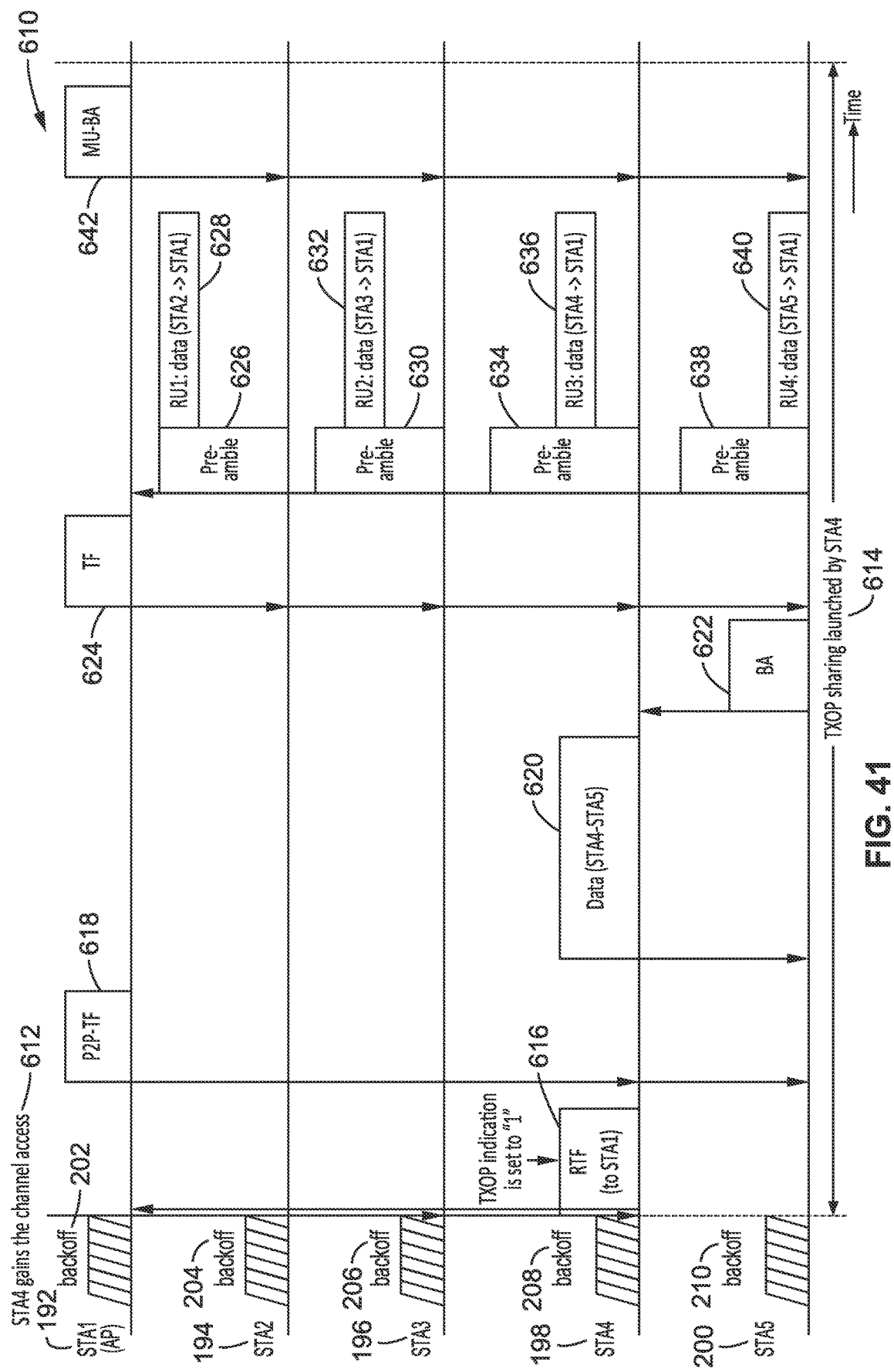
FIG. 41 is a communications sequence diagram with an example of a non-AP STA launching a P2P transmission by sending an RTF frame to the AP with TXOP sharing according to at least one embodiment of the present disclosure.

FIG. 41 illustrates an example embodiment 610 of a non-AP STA launching a P2P transmission by sending an RTF frame.

As was depicted in previous figures, all the STAs (STA1 192, STA2 194, STA3 196, STA4 198 and STA5 200), are contending for the channel using backoffs 202, 204, 206, 208 and 210, with STA4 obtaining channel access 612.

When STA4 obtains channel access 612 for TXOP 614, it sends an RTF frame 616 to request a P2P trigger frame from the AP. In response to this RTF, the AP sends a P2P trigger frame 618 to launch the P2P transmission 620 from STA4 to STA5, which is acknowledged by STA5 with BA 622. In this example, the TXOP sharing indication in RTF is set to a second state (e.g., "1") indicating that STA4 is sharing the TXOP within the BSS After the P2P transmission ends, then the AP continues arranging transmissions during the TXOP, depicted by the AP sending a TF 624 to launch a multi-user uplink transmission by other stations shown with preambles 626, 630, 634 and 638 followed by data 628, 632, 636 and 640 on different RUs to STA1, which after receiving the transmissions the AP issues an acknowledgement with BA 642.

Figure 42:
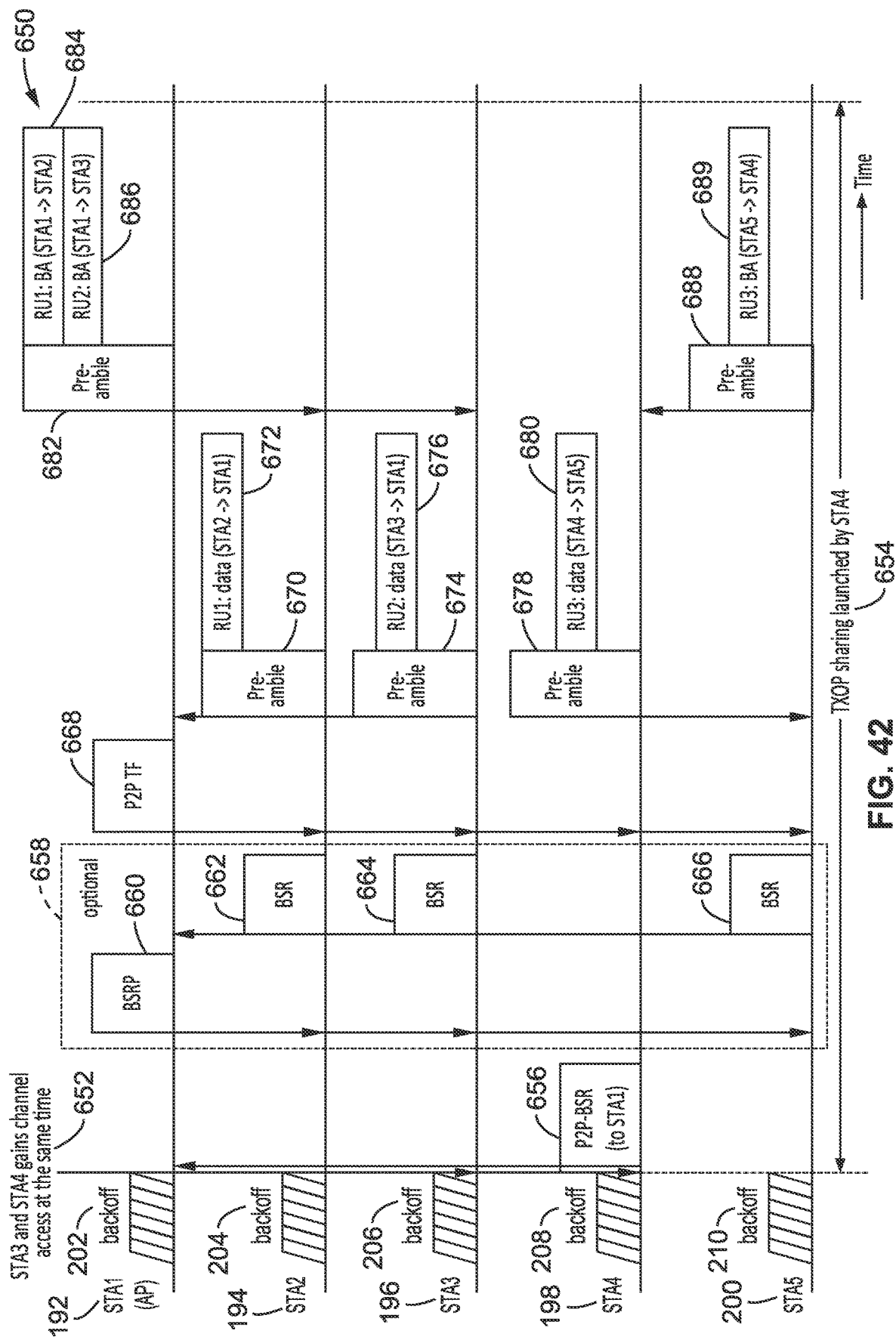
FIG. 42 is a communications sequence diagram with an example of enabling P2P transmission when the non-AP STA shares a TXOP by sending a P2P-BSR frame to the AP according to at least one embodiment of the present disclosure.

FIG. 42 illustrates an example embodiment 650 of a non-AP STA sharing its TXOP within its associated BSS and requests a P2P transmission during the shared TXOP by sending a P2P-BSR frame.

As was seen in previous figures, all the STAs (STA1 192, STA2 194, STA3 196, STA4 198 and STA5 200), are contending for the channel together using backoffs 202, 204, 206, 208 and 210.

STA4 gains channel access 652 and sends a P2P-BSR frame 656 to the AP to launch sharing of TXOP 654. The format of a P2P-BSR frame is described later for FIG. 49, and this P2P-BSR procedure is explained for block 76 of FIG. 21. When a STA transmits a P2P-BSR frame, it can set the RA field of the frame to a specific address which is prefixed and negotiated with the AP to indicate the start of TXOP sharing.

When the AP receives a P2P-BSR frame to indicate the start of TXOP sharing, it determines from it the TXOP sharing. In this example the STA requests to share its TXOP within the BSS and requests a P2P transmission during the shared TXOP. Then in this example the AP optionally collects buffer status information 658 from other STAs by sending a BSRP trigger frame 660 and collecting BSRs 662, 664 and 666, whereupon the AP arranges (orders/schedules) transmissions during the TXOP. As shown in the example, after collecting the BSRs from the STAs, the AP sends a P2P TF 668 to launch multi-user UL transmissions 670, 672, 674, 676 of STA2 and STA3 and a P2P transmission 678, 680 between STA4 and STA5.

The STAs transmit their packets through the RUs assigned by the P2P TF. As shown in the figure, the UL OFDMA transmissions of STA2 and STA3 are transmitted over RU1 and RU2, respectively. The P2P transmission of STA4 is transmitted over RU3 to STA5. Then the AP is seen sending a preamble 682 with BAs 684 and 686, while STA5 is seen sending a preamble 688 and BA 689.

Figure 43:
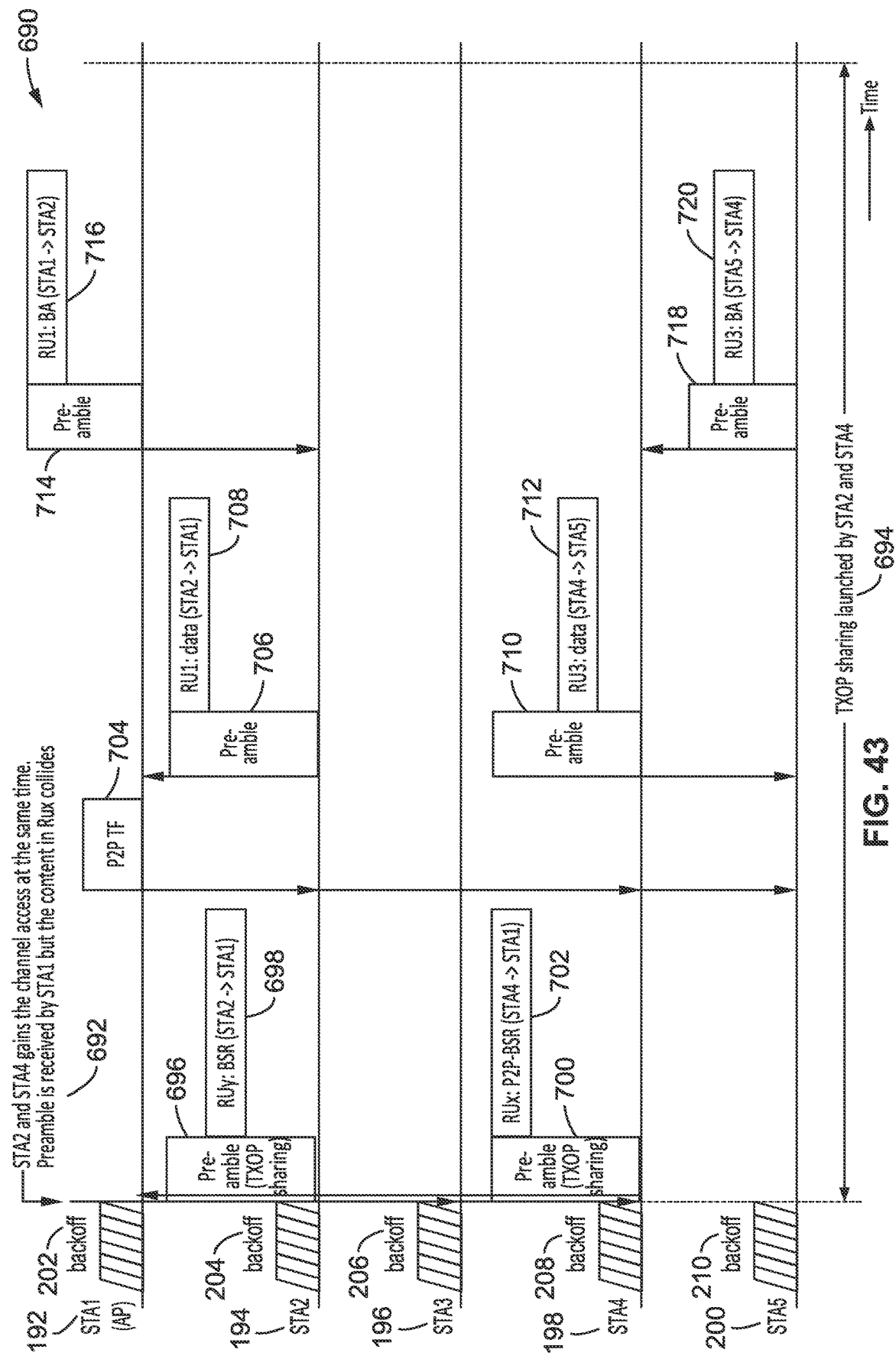
FIG. 43 is a communications sequence diagram with an example of enabling P2P transmission when a non-AP STA shares its TXOP by sending an MU-BSR frame to the AP when two STAs use different RUs to carry BSR in the MU-BSR according to at least one embodiment of the present disclosure.

FIG. 43 illustrates an example embodiment 690 of a non-AP STA sharing its TXOP within its associated BSS and requesting a P2P transmission during the shared TXOP by sending a MU-BSR packet.

As was also shown in previous figures, all the STAs (STA1 192, STA2 194, STA3 196, STA4 198 and STA5 200), are contending for the channel together using backoffs 202, 204, 206, 208 and 210.

In this example, STA2 and STA4 gain channel access 692 at the same time. Then both STA2 and STA4 begin using TXOP 694 by sending preambles 696 and 700 with MU-BSR packets 698 and 702, to the AP to launch TXOP sharing. This procedure is explained in 76 of FIG. 21. The preamble of the MU-BSR is explained in FIG. 58. There is a TXOP sharing indication (e.g., one-bit) in the preamble to indicate this MU-BSR is for launching TXOP sharing.

The RU allocation in MU-BSR for carrying the BSR frame can be prefixed by the negotiation between AP and STAs. Therefore, it is not necessary to indicate the RU allocation of BSRs in the preamble. For example, a MU-BSR for launching TXOP sharing that is transmitted over 20 MHz band could use a random 26-tone resource unite (RU) to carry BSR frame. As shown in the example, STA2 uses RUy to carry its BSR frame to the AP, while STA4 uses RUx to carry its P2P-BSR frame to peer station of STA5.

The benefit of using MU-BSR is that when multiple STAs, e.g., STA2 and STA4 shown in the figure, gain channel access at the same time, their MU-BSR packets can be received by the AP without errors. This is because the content of their preambles is prefixed and contains the same sharing information. Also, the BSR frames are carried on different RUs.

The type of BSR frame carried by the RU can be decided by the STA. As shown in the figure, STA2 transmits a BSR frame defined in IEEE 802.11ax through RUy and STA4 transmits a P2P BSR frame through RUx. AP is able to decode the different type of BSR frames over different prefixed RUs.

If a non-AP STA receives a trigger frame from the AP before timeout, then the TXOP sharing succeeds as explained in 78 and 80 of FIG. 21. In this example, the AP sends a P2P TF 704 to launch an uplink OFDMA transmissions 706 and 708 over RU1 according to the buffer status of STA2 and a P2P transmission 710, 712 over RU3 between STA4 and STA5 according to the buffer status of STA4. STA2 and STA4 transmit their packets after they receive the P2P-TF from the AP. This procedure is explained in block 82 of FIG. 21. After which the AP is seen sending a BA transmission 716 with preamble 714 to STA2 over RU1, and STA5 is seen sending a BA transmission 720 with preamble 718 to STA4.

Figure 44:
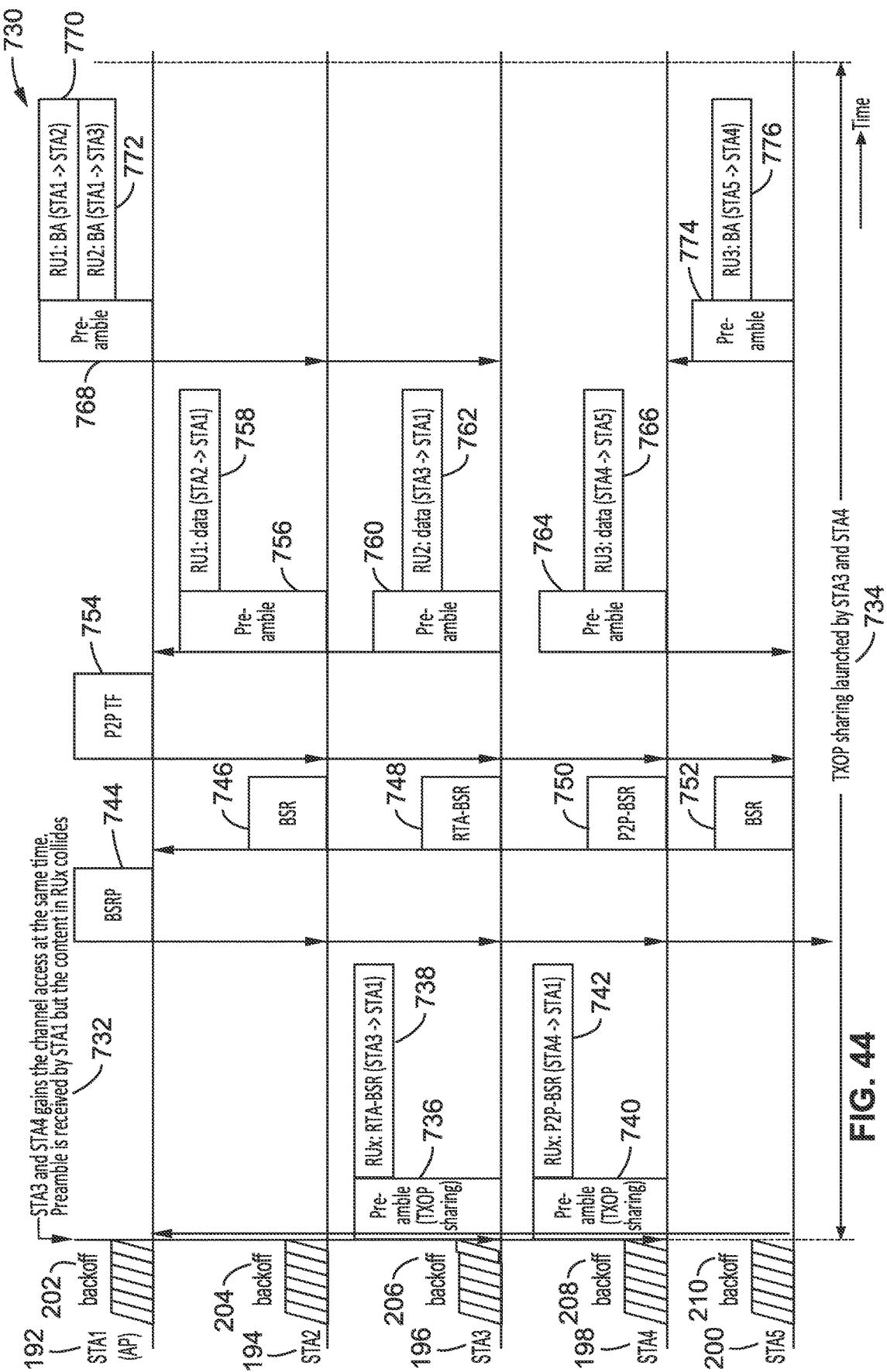
FIG. 44 is a communications sequence diagram with an example of enabling P2P transmission when a non-AP STA shares its TXOP by sending an MU-BSR frame to the AP when two STAs use the same RU to carry BSR in the MU-BSR according to at least one embodiment of the present disclosure.

FIG. 44 illustrates an example embodiment 730 of a non-AP STA sharing its TXOP within its associated BSS and requests a P2P transmission during the shared TXOP by sending a MU-BSR packet.

As was depicted in previous figures, all the STAs (STA1 192, STA2 194, STA3 196, STA4 198 and STA5 200), are exemplified as contending for the channel together using backoffs 202, 204, 206, 208 and 210.

In this example, STA3 and STA4 gain channel access 732 at the same time. Then, STA3 and STA4 send MU-BSR packets 738 and 742, with preambles 736 and 740, to the AP to launch sharing of TXOP 734. This procedure is explained in 76 of FIG. 21. The preambles as used in 736 and 740 of MU-BSR are explained in FIG. 58. There is a one-bit TXOP sharing indication in the preamble to indicate this MU-BSR is for launching TXOP sharing.

The RU allocation in MU-BSR for carrying BSR frame can be prefixed by negotiation between the AP and STAs. Therefore, it is not necessary to indicate the Resource Unit (RU) allocation of BSRs in the preamble. For example, a MU-BSR for launching TXOP sharing that is transmitted over the 20 MHz band could use a random 26-tone RU as defined in IEEE 802.11ax to carry BSR frame. As shown in the example, STA3 and STA4 use RUx 738 and 742 to carry the BSR frame.

The benefit of using MU-BSR is that when multiple STAs, e.g., STA3 and STA4 shown in the figure, gain channel access at the same time, the preambles 736 and 740 of their MU-BSR packets can be received by AP without errors. This is because the content of their preambles provides a prefix with the same information. Although the BSR frames of STA2 and STA4 collide because they are carried by the same RU, i.e., RUx, the AP can nonetheless still decode the preamble successfully and thus is made aware of the start of TXOP sharing.

Then, in this example the AP is shown collecting BSRs from the STAs by sending the BSRP trigger frame 744 and arranging the transmission during the TXOP. As explained in FIG. 26, STAs can decide which type of BSR frames to send back. In the example shown, STA2 and STA5 send BSR frames 746 and 752 as defined in IEEE 802.11ax; STA3 sends an RTA-BSR frame 748; and STA4 sends a P2P BSR frame 750. The formats of the RTA-BSR frame and P2P-BSR frame are shown in FIG. 49.

As explained in FIG. 25, the AP collects the buffer status from STAs though the types of BSR frames can be different. According to the BSRs, the AP sends a P2P TF frame 754 to launch a multi-user transmission which includes UL transmissions 756, 758, 760 and 762 for STA2 and STA3, and P2P transmissions 764, 766, 774, 776 between STA4 and STA5. The RU allocation is indicated by the P2P TF. The UL transmissions are transmitted using RU1 and RU2 and the P2P transmission is transmitted through RU3. The AP is also seen transmitting block acknowledgements (BAs) 770 and 772 with preamble 768 to STA2 and STA3, respectively; and STA5 sends a BA 776 with preamble 774 to STA4.

FIG. 45 illustrates an example embodiment 790 of a non-AP STA sharing its TXOP within its associated BSS and requests a P2P transmission during the shared TXOP by sending a CTS frame.

As was shown in previous figures, the STAs (STA1 192, STA2 194, STA3 196, STA4 198 and STA5 200), are contending for the channel using backoffs 202, 204, 206, 208 and 210.

STA3 and STA4 gain channel access 792 at the same time. Then, STA3 and STA4 send CTS frames 796 and 798 to the AP to launch sharing of TXOP 794. This procedure is explained in block 76 of FIG. 21. The CTS can still be decoded by the AP successfully since the content of the CTS frames is the same.

Then, the AP can collect BSRs from the STAs by sending a BSRP trigger frame 800 and collect BSRs 802, 804, 806 and 808, then arrange the transmissions for the TXOP. As explained in FIG. 26, STAs can decide which type of BSR frames to send back. Here, as shown in the example, STA2 and STA5 send the BSR frames 802 and 808 as defined in IEEE 802.11ax. STA3 sends an RTA-BSR frame 804 and STA4 sends a P2P BSR frame 806. The formats of the RTA-BSR frame and P2P-BSR frame are shown in FIG. 49.

As explained in FIG. 25 the AP collects the buffer status from STAs although the types of the BSR frames are different. According to the BSRs, the AP arranges the transmission in the shared TXOP. The AP sends a P2P TF frame 810 to launch a multi-user transmission which includes UL transmissions 814, 818 with preambles 812, 816 for STA2 and STA3 and a P2P transmission 822 with preamble 820 from STA4 to STA5. The RU allocation is indicated by the P2P TF. The UL transmissions are transmitted using RU1 and RU2 and the P2P transmission is transmitted through RU3. Then block acknowledgements 826, 828 are sent after preamble 824 from the AP to STA2 and STA3, respectively, while STA5 sends a BA 832 after its preamble 830 to STA4.

Figure 46A:
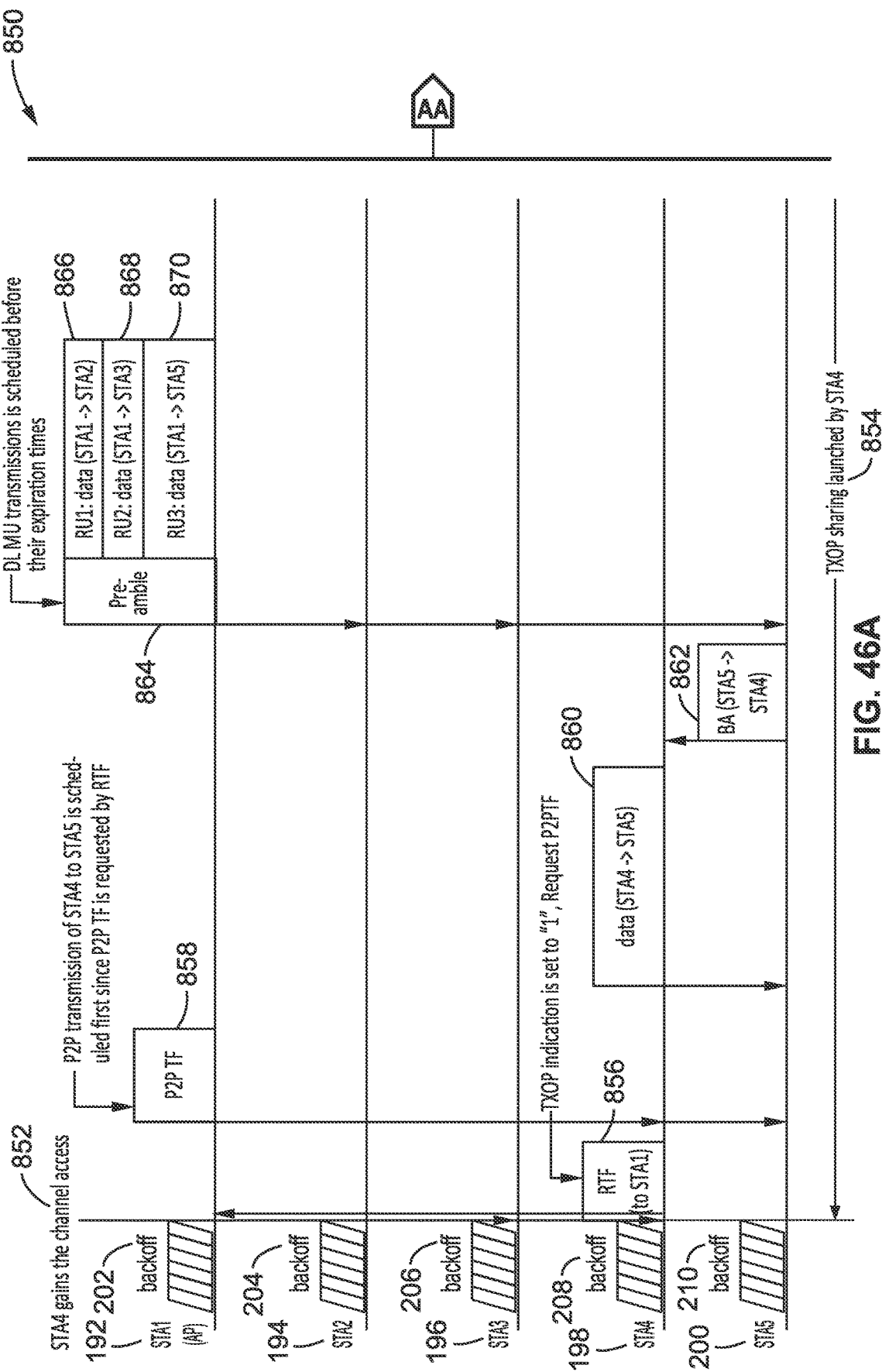
FIG. 46A and FIG. 46B are a communications sequence diagram with an example of enabling P2P transmission when a non-AP STA shares its TXOP according to at least one embodiment of the present disclosure.
Figure 46B:
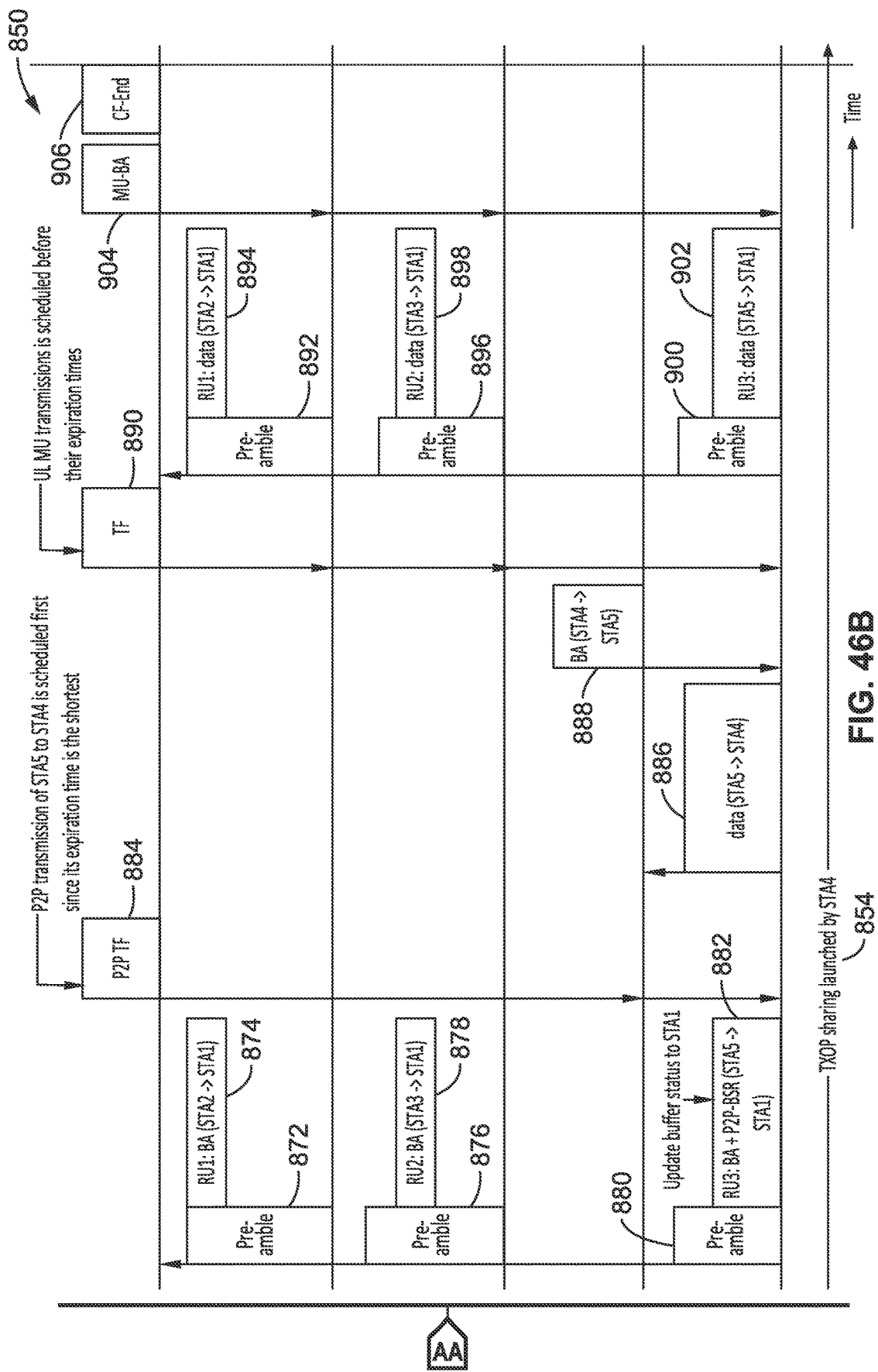

FIG. 46A-FIG. 46B illustrate an example embodiment 850 of a non-AP STA sharing its TXOP within its associated BSS and requesting a P2P transmission during the shared TXOP by sending a CTS frame. This example explains how an AP can arrange the transmission during the shared TXOP.

As was seen in previous figures, STAs (STA1 192, STA2 194, STA3 196, STA4 198 and STA5 200), are contending for the channel using backoffs 202, 204, 206, 208 and 210.

In FIG. 46A STA4 is seen obtaining channel access 852 and sending an RTF frame 856 to the AP to request a P2P trigger frame and launch sharing TXOP 854. This procedure is explained in block 116 of FIG. 23.

The AP sends a P2P TF frame 858 to launch a P2P transmission 860 from STA4 to STA5, to which STA5 responds with a BA 862 as explained in block 134 of FIG. 24.

Since the TXOP is shared by STA4, as explained in block 138 of FIG. 24, the AP launches a downlink multi-user transmission 866, 868 and 870 following preamble 864 for STA2, STA3 and STA5 after the P2P transmission ends. This may arise for different reasons, such as because the downlink transmission has an expiration time that is shorter than the UL transmission of RTA packets requested by the STAs.

In FIG. 46B is depicted at least one embodiment in which buffer status is embedded in the BA frames. STA2 and STA3 are seen sending BA frames 874, 878 after preambles 872, 876, to the AP. The figure shows an example that the P2P-BSR is embedded in the BA frame 882 after preamble 880. The format of BA+P2P-BSR frame is explained in FIG. 50. In at least one embodiment P2P-BSR in the BA+P2P-BSR frame is replaced by any type of BSR frame, such as RTA-BSR and the BSR defined in IEEE 802.11ax.

According to the latest buffer status update from STA5, the AP schedules another P2P transmission between STA4 and STA5 since the expiration time of the P2P transmission is the shortest. After the P2P transmission of STA5 and STA4 finishes, the AP sends a TF frame 884 to launch an uplink multi-user transmission 886 for the buffer reported by the RTA-BSR frames of STA2, STA3 and STA5. After which STA4 responds with a BA 888. Before the TXOP ends, the AP sends a TF 890, and STA2, STA3 and STA5 are seen uploading data 894, 898 and 902, after preambles 892, 896 and 900. Then the AP responds with a MU-BA 904. The AP is able to send a CF-End frame 906 as defined in IEEE 802.11 to end the current TXOP.

4.6.4. Example of AP Sharing TXOP

This section provides an example to show that the AP is also able to collect buffer status information as explained in FIG. 25 to arrange the transmission in its owned TXOP. The network topology of these examples is shown in FIG. 20, although in this instance only the transmissions on Link1 are considered.

Figure 47A:
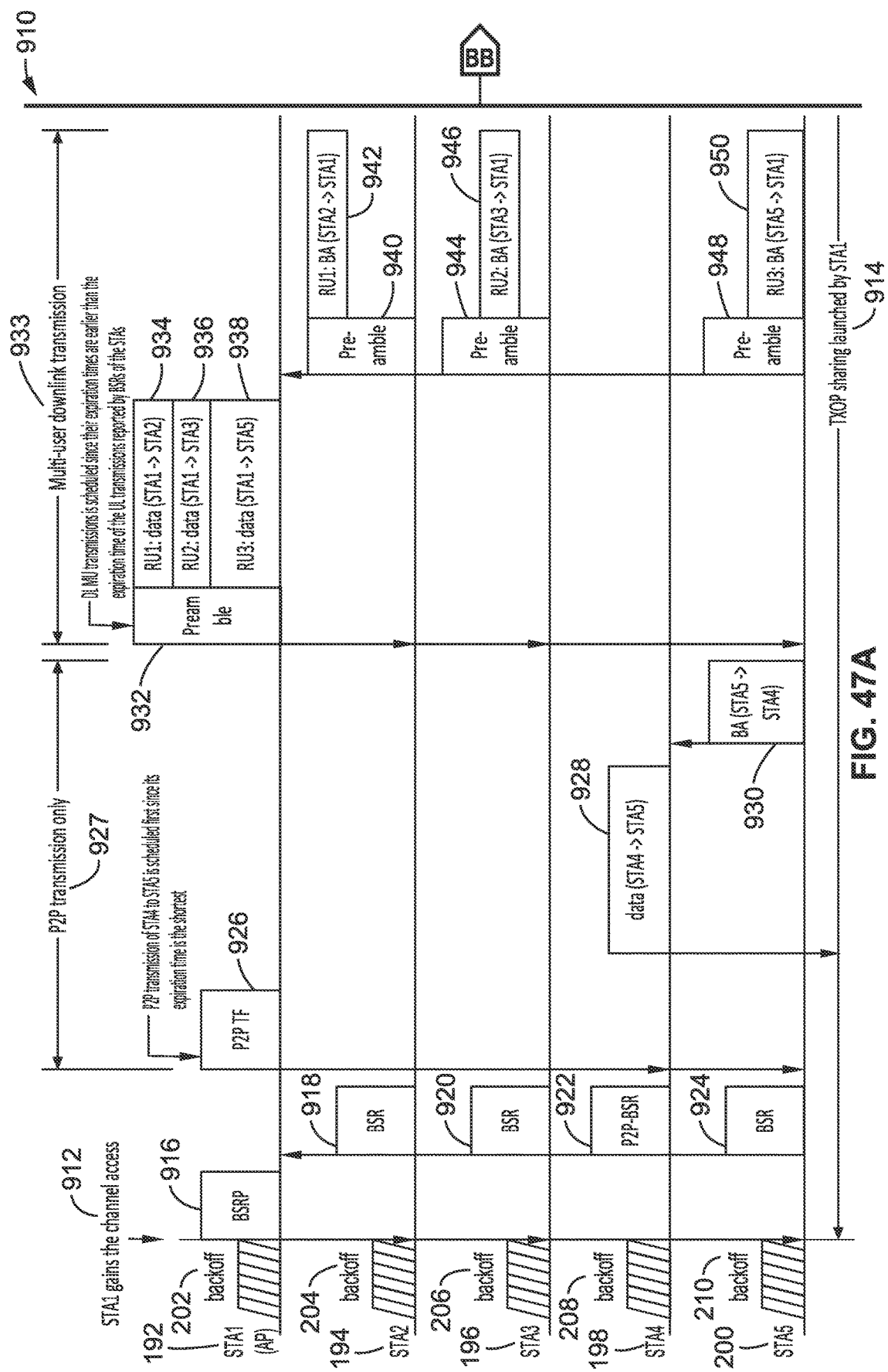
FIG. 47A through FIG. 47C are a communications sequence diagram with an example of an AP arranging transmission in the TXOP according to at least one embodiment of the present disclosure.
Figure 47B:
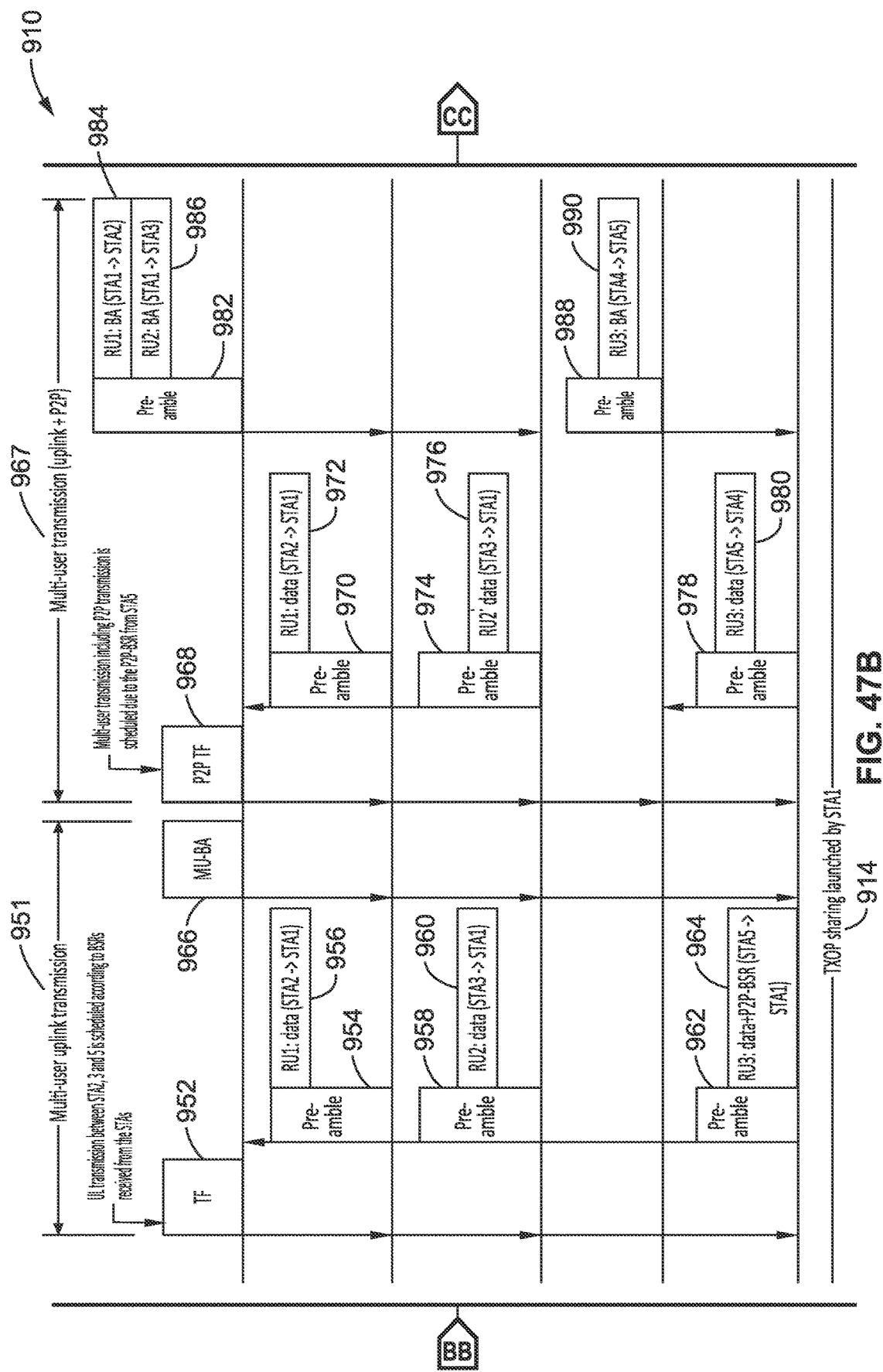
Figure 47C:
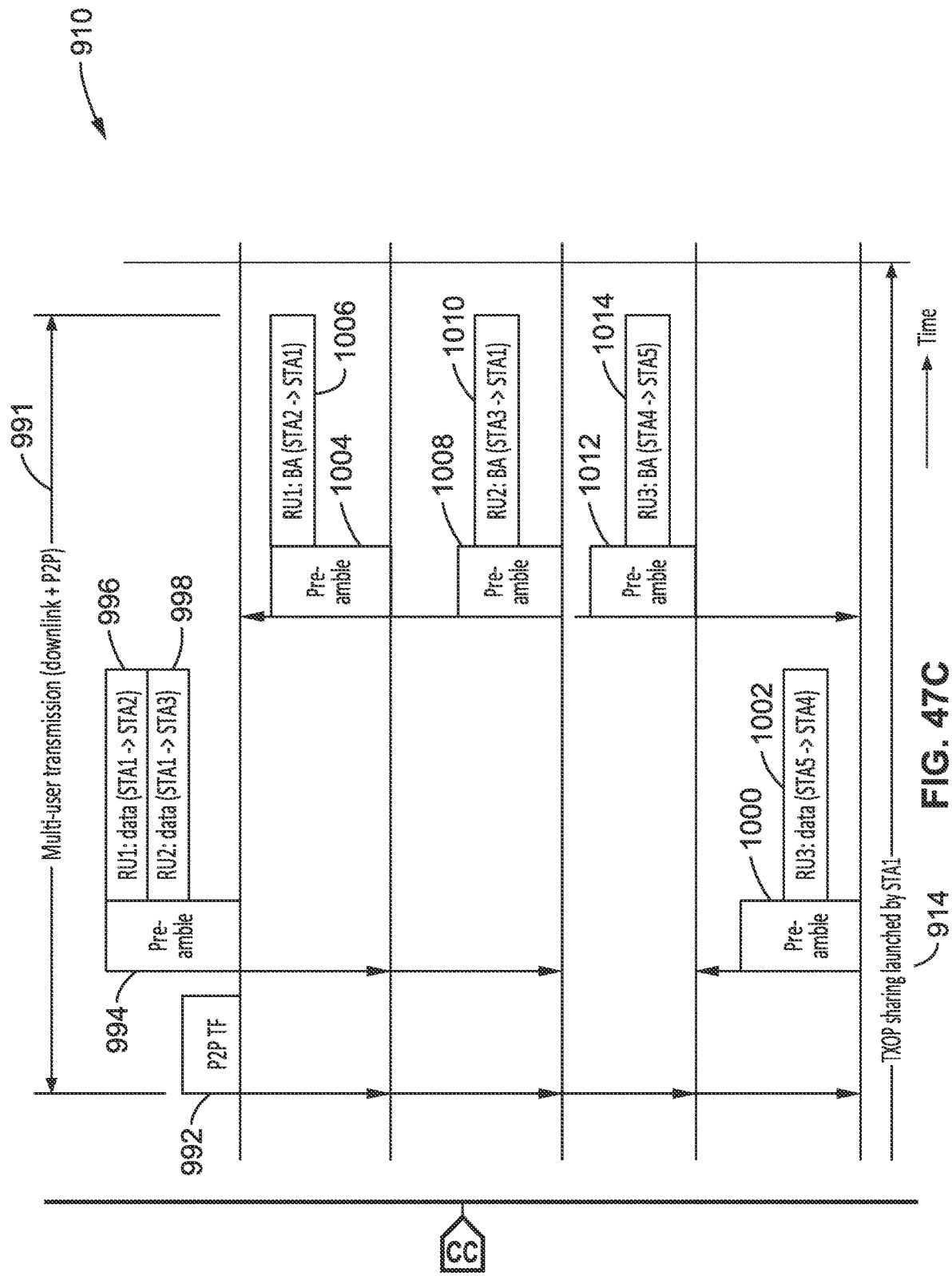

FIG. 47A through FIG. 47C illustrates an example embodiment 910 of an AP arranging the transmission during its owned TXOP according to the buffer status collected from the STAs.

As was shown in previous figures, the STAs (STA1 192, STA2 194, STA3 196, STA4 198 and STA5 200), are contending for the channel together using backoffs 202, 204, 206, 208 and 210.

As shown in the figure, the AP gains channel access 912 for TXOP 914 and sends BSRP 916 to collect the BSRs from the STAs. As explained in FIG. 26 the STAs can decide which type of BSR frames to send back. Here, as shown in the example, STA2, STA3 and STA5 send the BSR frames 918, 920 and 924, and STA4 sends a P2P BSR frame 922.

As explained in FIG. 25 the AP collects the buffer status from STAs although the types of BSR frames are different. According to the BSRs, the AP arranges the transmissions in the TXOP. A P2P transmission 927 is performed in which the AP sends a P2P TF frame 926 to first launch a P2P transmission 928 from STA4 to STA5, to which STA5 responds with a BA 930. The P2P transmission is preferably performed first as the expiration time of a P2P transmission is the shortest according to the BSRs from STAs. Then, the AP launches an MU DL 933 with transmissions 934, 936 and 938 for STA2, STA3 and STA5, after preamble 932. This could be because the expiration time of the downlink transmission is shorter than the UL transmission of RTA packets is requested by the STAs. Then these stations respond with BAs 942, 946 and 950 following associated preambles 940, 944 and 948.

Turning to FIG. 47B, after the multi-user downlink transmission finishes, the AP sends a TF frame 952 to launch an uplink multi-user transmission 951 for the buffer reported by the BSR frames of STA2, STA3, and STA5. In at least one embodiment buffer status is embedded in the data frames. Data uploads 956, 960 and 964, and preceding preambles 954, 958 and 962, are seen from STA2, STA3 and STA5 to the AP. The figure also shows an example that a P2P-BSR 964 is embedded in the data frame of STA5 and transmitted through RU3. The format of data+P2P-BSR frame is explained in FIG. 51. In at least one embodiment P2P-BSR in the BA+P2P-BSR frame is replaced by any type of BSR frame, such as RTA-BSR and the BSR defined in IEEE 802.11ax. The AP responds to receipt of these by transmitting MU BA 966.

According to the latest buffer status update from STA5, the AP schedules a multi-user transmission (uplink+P2P) 967, which includes a P2P transmission 980 with preamble 978 from STA5 to STA4 since the expiration time of that P2P transmission is the shortest. In this case the AP sends a P2P TF 968 to arrange a multi-use transmission for both uplink transmission and P2P transmission. The uplink transmissions 972 and 976 of STA2 and STA3 use RU1 and RU2, and are seen with preambles 970 and 974. The P2P transmission 980 of STA5 to STA4 uses RU3, and is preceded by preamble 978. In response to STA2 and STA3, the AP sends BAs 984 and 986 following preamble 982. STA4 is also seen sending a BA 990, after preamble 988, to STA5.

Moving on to FIG. 47C, it is seen that the AP sends another P2P TF 992 to arrange another multi-user transmission 991 for both downlink and P2P transmission.

STA5 is seen transmitting a preamble 1000 and data 1002 over RU3 to STA4.

The AP is seen transmitting a preamble 994 and data over RU1 and RU2 for downlink transmissions 996 and 998 from the AP to STA2 and STA3, respectively. RU3 is used for the P2P transmission. It should be appreciated that the AP could have an AID to point to itself. Then, the AP can use that AID to set the AID12 field to indicate that the AP is going to use the channel resource indicated in the corresponding user info field of the P2P trigger frame for downlink transmission. The P2P receiver ID in that user info field indicates the receiver of the downlink transmission. when the Multi-user downlink transmission and P2P transmission coexists, each STA could only assume one of the following roles: (a) transmitter of P2P transmission; (b) Receiver of P2P transmission; (c) receiver of downlink transmission; or (c) AP is able to send a CF-End frame as defined in IEEE 802.11 to end the current TXOP. The figure ends with block acknowledgements (BAs) 1004, 1006, 1008 and 1010 being sent from STA2 and STA3 to the AP, and 1012 and 1014 from STA4 to STA5.

It should be appreciated that the transmission arrangement shown in the example could also be used during the TXOP shared by non-AP STAs. The number and the order of the different transmissions (e.g., P2P transmission only, multi-user downlink transmission, multi-user uplink transmission, multi-user transmission (uplink+P2P), and multi-user transmission (downlink+P2P)) can be determined by the AP.

4.6.5. Example of Non-AP MLD Sharing TXOP in Multi-Link Scenario

This section provides an example to show (a) how a non-AP MLD shares the TXOP within the BSS on one link, and (b) how an AP MLD collects buffer status as explained in FIG. 25 on one link to arrange the transmission on multiple links. The network topology of these examples was shown in FIG. 20. The TXOP sharing on Link1 and the packet transmission arranged by the STA1 (AP) during the shared TXOP on Link1 could be the similar as shown in FIG. 46A and FIG. 46B.

Figure 48A:
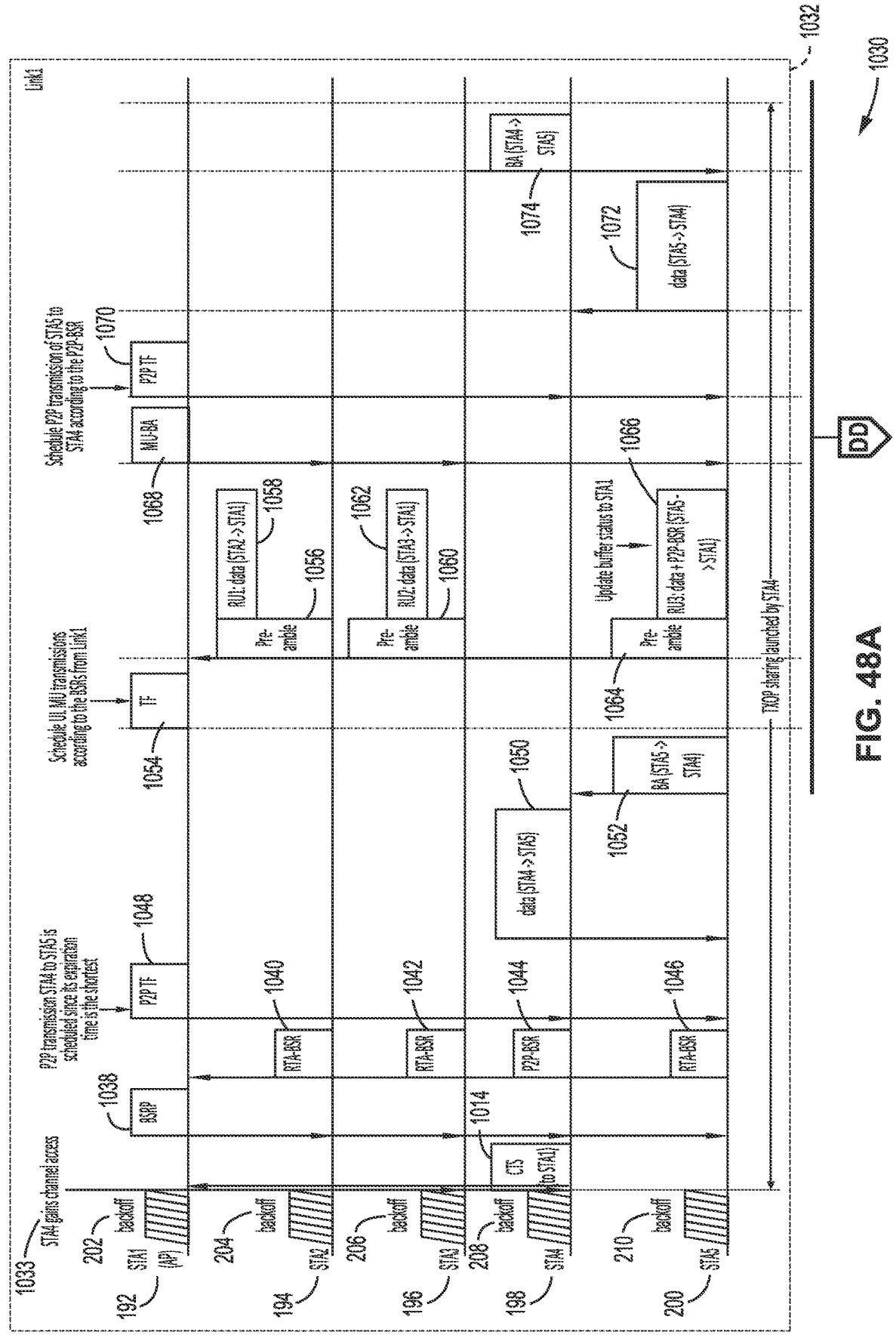
FIG. 48A and FIG. 48B are a communications sequence diagram with an example of a non-AP MLD sharing its TXOP in a multi-link scenario when the non-AP MLD is not capable of STR as performed according to at least one embodiment of the present disclosure.
Figure 48B:
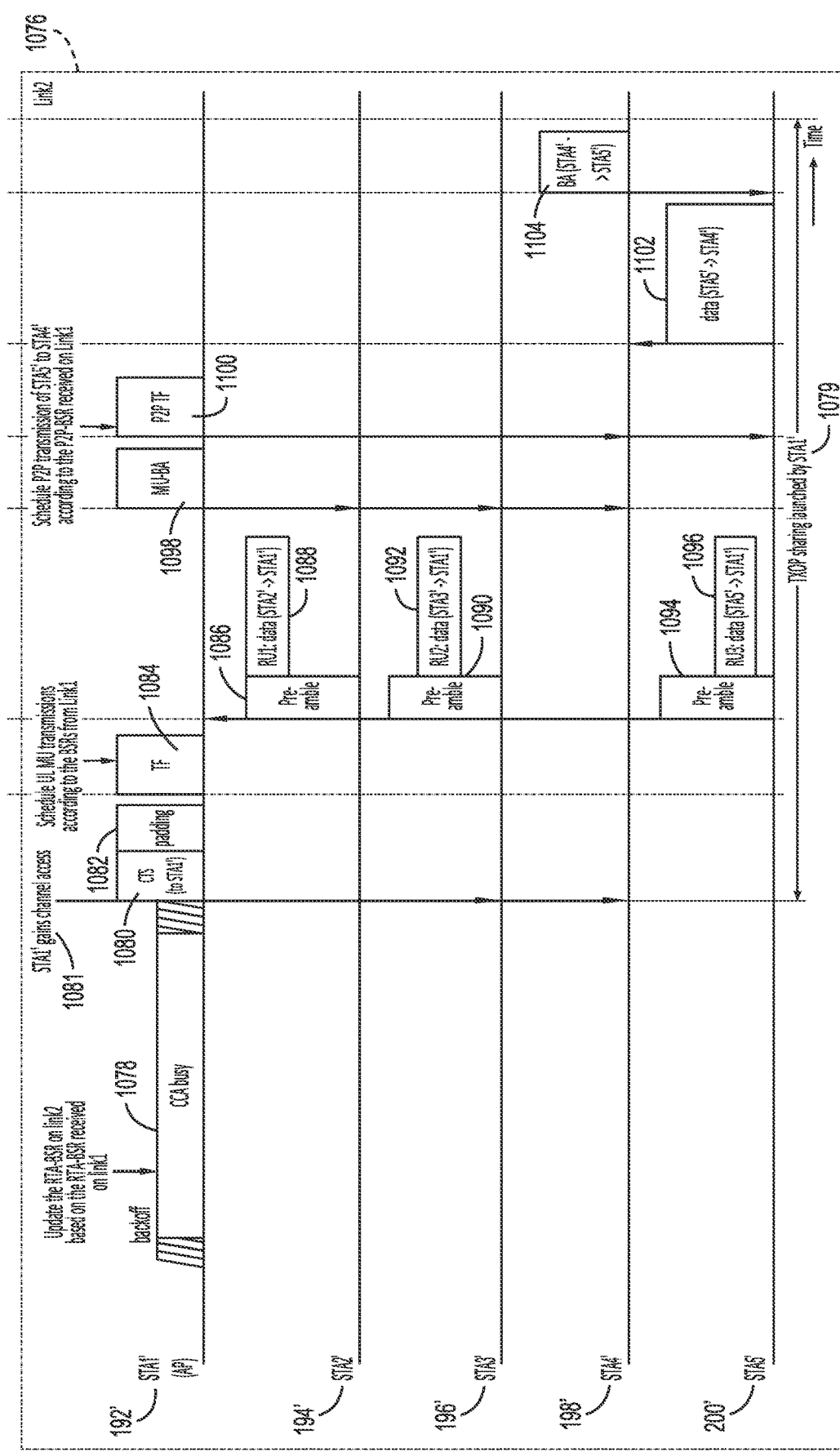

FIG. 48A—FIG. 48B illustrates an example embodiment 1030 of a AP MLD that is capable of Simultaneous Transmit and Receive (STR), communicating with non-AP MLDs that may be non-STR. It should be noted that the communications shown in marked portion of FIG. 48B occur in parallel to those shown in the marked portion of FIG. 48A (as opposed to sequentially). The marked portions being those associated with the connective structure "DD" depicted in the figure.

As was also shown in previous figures area 1032 of FIG. 48A depicts all the STAs (STA1 192, STA2 194, STA3 196, STA4 198 and STA5 200), are contending for the channel together using backoffs 202, 204, 206, 208 and 210. In area 1076 of FIG. 48B we see corresponding communications lines 192', 194', 196' 198' and 200' for STAs STA1' through STA5'.

STA4 obtains channel access 1033 and sends a CTS 1036 to the AP for a TXOP 1034.

STA1 collects buffer status on Link1 by sending a BSRP 1038 and receives various BSR responses 1040, 1042, 1044 and 1046. This buffer status information can also be used for arranging the transmissions on Link2, which we will get to below.

The AP sends a P2P TF 1048 and a P2P transmission 1050 from STA4 to STA5 is performed with corresponding BA 1052.

Now referring to the parallel portions of FIG. 48A and FIG. 48B, when STA1 receives the RTA-BSRs 1040, 1042 1046, and P2P-BSR 1044 after sending BSRP trigger frame on Link1, it can also inform STA1' (refer to topology in FIG. 20) on Link2 to update the buffer status of the associated STAs.

Since the non-AP MLDs are non-STR, their STAs, such as STA2' through STA5', as seen in FIG. 48B may not be able to sense and contend for the channel on Link2 during the TXOP duration on Link1. So STA1' is seen starting a backoff 1078 which is interrupted by CCA busy.

However, STA1' then gains channel access 1081 on Link2. When STA1' gains channel access on Link2, it can send a CTS frame 1080 to obtain and reserve the TXOP 1079 on Link2. The padding field 1082 can be added in the CTS frame to align the PPDU transmissions (e.g., TF, multi-user UL transmission, MU-BA, P2P TF and P2P transmission) on Link1 and Link2. That is, the PPDU transmissions on both links are either downlink, uplink, or P2P transmission.

As shown in the figure, after STA1' reserves the TXOP on Link2 using CTS+padding frame, both STA1 and STA1' send TF frames 1054, 1084 on both links to launch multi-user uplink transmissions 1056, 1058, 1060, 1062, 1064, 1066, 1086, 1088, 1090, 1092, 1094 and 1096.

In at least one embodiment a multi-user uplink data packet could include BSR. For example, as shown in the figure, STA5 embeds a P2P-BSR 1066 in its multi-user uplink data packet. The new buffer status of STA5 is reported to STA1 and STA1 shares this information with STA1'. Then STA1 and STA1' acknowledge the transmissions with MU BAs 1068 and 1098. After this, both STA1 and STA1' are seen scheduling a P2P transmission on both links simultaneously by sending P2P TFs 1070 and 1100, with associated transmissions from STA5 to STA4, and from STA5' to STA4', with associated BAs 1074 and 1104.

It should be appreciated that the PPDU alignment is optional. In particular, it should be noted that when the non-AP MLDs are STR, the PPDU alignment is not necessary.

4.7. Frame Format

FIG. 49 illustrates an example embodiment 1150 of a BSR frame of any type, including the BSR frame defined in IEEE 802.11ax, P2P-BSR, and RTA-BSR.

A Frame Control field indicates the type of frame. A Duration field contains NAV information used for CSMA/CA channel access. A RA field contains an address for the recipient of the frame. When the BSR frame is used to indicate the start of a TXOP sharing, the non-AP STA (transmitter) can set the RA to a special address that is prefixed and negotiated with the AP. The special address can be recognized by the AP (receiver) that this frame is for TXOP sharing. A TA field contains the address of the STA that transmitted the frame.

An HT Control field indicates the BSR control subfield variant. The format of the BSR control subfield variant is explained in FIG. 52. The non-AP STA (transmitter) sets this field to indicate the type of BSR and the corresponding buffer status of the non-AP STA. The AP receiving this frame thus can determine current buffer status of the non-AP STA and the QoS requirement of the buffer. The AP then can schedule the transmissions to satisfy the QoS requirement of the buffer. A Frame Check Sequence (FCS) is seen here, and in some of the other data formats, as an error-detecting code added to a frame in a communications protocol.

Figure 50:
FIG. 50 is a data field diagram of a BA+BSR frame format according to at least one embodiment of the present disclosure.

FIG. 50 illustrates an example embodiment 1170 of a format for a BA+BSR frame. The BSR can be any type, including the BSR frame defined in IEEE 802.11ax, P2P-BSR, and RTA-BSR.

A Frame Control field indicates the type of frame. A Duration field contains NAV information used for CSMA/CA channel access. A RA field contains an address for the recipient of the frame. When the BSR frame is used to indicate the start of TXOP sharing, the non-AP STA (transmitter) can set the RA to a special address that is prefixed and negotiated with the AP. The special address can be recognized by the AP (receiver) that this frame is for TXOP sharing. A TA field contains the address of the STA that transmitted the frame.

An HT Control field indicates the BSR control subfield variant. The format of the BSR control subfield variant is explained in FIG. 52. The non-AP STA (transmitter) sets this field to indicate the type of BSR and the corresponding buffer status of the non-AP STA. The AP which receives this frame thus obtains information on current buffer status of the non-AP STA and the QoS requirement of the buffer. The AP then can schedule the transmissions for satisfying QoS requirements of the buffer. A BA Control field indicates the policy of the block ACK. A BA info field contains feedback for the transmission.

Figure 51:
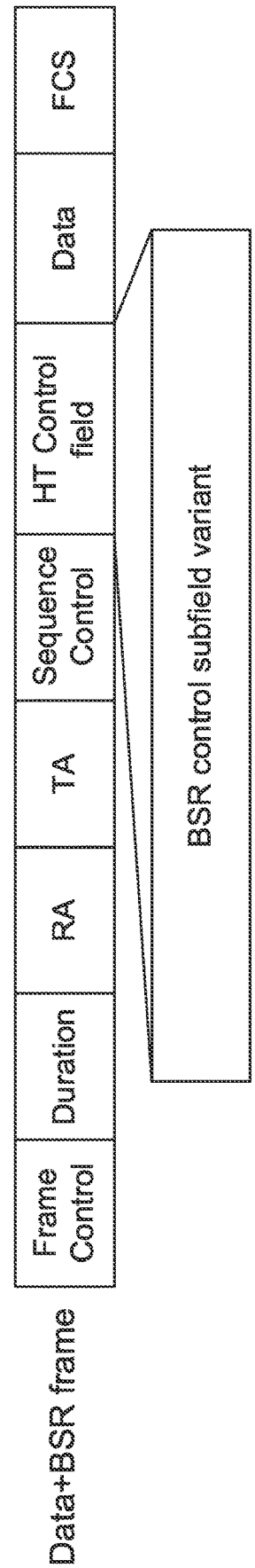
FIG. 51 is a data field diagram of a data+BSR frame format according to at least one embodiment of the present disclosure.

FIG. 51 illustrates an example embodiment 1190 of a format for a data+BSR frame. The BSR could be any type, including the BSR frame defined in IEEE 802.11ax, P2P-BSR, and RTA-BSR.

A Frame Control field indicates the type of frame. A Duration field contains NAV information used for CSMA/CA channel access. A RA field contains an address for the recipient of the frame. When the BSR frame is used to indicate the start of a TXOP sharing, the non-AP STA (transmitter) can set the RA to a special address that is prefixed and negotiated with the AP. The special address can be recognized by the AP (receiver) that this frame is for TXOP sharing. A TA field contains the address of the STA that transmitted the frame. A Sequence control field contains the fragment number and the sequence number of packet.

An HT Control field indicates the BSR control subfield variant. The format of the BSR control subfield variant is explained in FIG. 52. The non-AP STA (transmitter) sets this field to indicate the type of BSR and the corresponding buffer status of the non-AP STA. The AP receiving this frame thus has obtained information on the current buffer status of the non-AP STA and the QoS requirement of the buffer. The AP then can schedule the transmissions to satisfy the QoS requirements for the buffer.

A Data Field Carries the Payload of the Data Frame.

Figures 52, 53, 54:
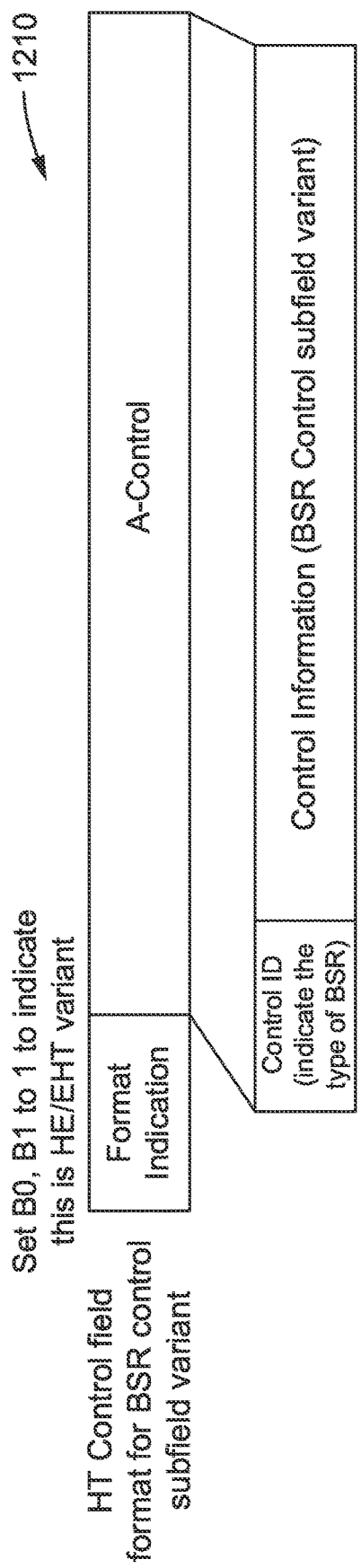
FIG. 52 is a data field diagram of an HT control field format for BSR control subfield variant according to at least one embodiment of the present disclosure.
FIG. 53 is a data field diagram of an RTA-BSR control subfield as A-Control subfield according to at least one embodiment of the present disclosure.
FIG. 54 is a data field diagram of a P2P-BSR control subfield as A-Control subfield according to at least one embodiment of the present disclosure.

FIG. 52 illustrates an example embodiment 1210 of a format of BSR control subfield variant. A Format indication field is used for indicating the format of the HT control field. When bits B0 and B1 are set to a first state (e.g., 1), then it indicates the HT control field uses HE/EHT format. There is an A-Control field followed by this field, which is used for carrying the buffer status report of different types.

Control ID is a field which indicates the type of BSR carried in the control information field. A Control Information field carries the BSR control subfield variant, such as the BSR control subfield as defined in IEEE 802.11ax, the RTA-BSR as shown in FIG. 53, and the P2P-BSR as shown in FIG. 54. The transmitter sets this field to report the buffer status and the QoS requirement of the buffer to the receiver. The receiver may schedule the transmissions according to the BSRs and satisfies their QoS requirements.

FIG. 53 illustrates an example embodiment 1230 of a format for the RTA-BSR Control subfield in A-Control subfield. An RTA ID field indicates the identification of the RTA buffer reported in this BSR. The receiver can use the RTA ID to identify the RTA traffic so that it knows the QoS requirement of the RTA traffic. By way of example and not limitation, let us assume that both the AP and STA have a list of traffic specification (e.g., AC, TID, priority, traffic rate, and so on) and QoS requirements (latency, jitter, packet loss, and so on) of RTA traffic. Each QoS requirement of RTA traffic under the same traffic specification is linked to an RTA ID.

A Scaling Factor field indicates the unit of the Expiration Queue Size and the RTA Queue Size. The encoding of this field can be the same as in IEEE 802.11ax. An Expiration Queue Size field indicates the amount of buffered RTA traffic, in units of Scaling Factor that will expire at the Expiration Time. An Expiration Time field indicates the expiration time of the buffered RTA traffic indicated in Expiring Queue Size. An RTA Queue Size field indicates the total amount of buffered RTA traffic in units of Scaling Factor.

When the AP receives this control subfield, in order to satisfy the QoS requirement of the buffered traffic indicated in the control subfield, it should finish the transmission of the buffered RTA traffic indicated in the Expiring Queue Size before the Expiration Time. The AP may also take care of the buffered RTA traffic indicated in the RTA Queue Size.

It should be appreciated that the number of bits below each field as shown in FIG. 53 represents an example of the length of each field. In at least one embodiment the length of each field is different than that shown in the figure.

FIG. 54 illustrates an example embodiment 1250 of a format for a P2P-BSR Control subfield in an A-Control subfield. An ACI P2P field indicates the access category of the P2P buffer reported in this BSR. A Scaling Factor field indicates the unit of the Queue Size P2P, and the encoding of this field can be the same as in IEEE 802.11ax. A Queue Size P2P field indicates the amount of buffered P2P traffic, in units of Scaling Factor, that will expire at the Expiration Time. An Expiration Time field indicates the expiration time of the buffered P2P traffic indicated in the Queue Size P2P. A P2P receiver ID field indicates the receiver of the P2P traffic indicated in Queue Size P2P. When the AP receives this field, it then knows the receiver of the P2P traffic. When it schedules a multi-user transmission as shown in the examples in Section 4.6.3, the receiver of the P2P traffic should not be the transmitter of UL transmission or the receiver of DL transmission at the same time. When the AP receives this control subfield, in order to satisfy the QoS requirement of the buffered traffic indicated in the control subfield, it should schedule the transmission for the buffered P2P traffic indicated in the Queue Size P2P before the Expiration Time.

It should be appreciated that the number of bits exemplified below each field as shown in FIG. 54 represents an example of the length of each field; however, in at least one embodiment the length of one or more of these fields may be different than that shown in the figure.

FIG. 55 illustrates an example embodiment 1270 of a format for an RTF frame. A Frame Control field indicates the type of frame. A Duration field contains NAV information used for CSMA/CA channel access. A RA field contains an address for the recipient of the frame. When the BSR frame is used to indicate the start of a TXOP sharing, the non-AP STA (transmitter) can set the RA to a special address that is prefixed and negotiated with AP. The special address can be recognized by the AP (receiver) that this frame is for TXOP sharing. A TA field contains the address for the STA that transmitted the frame.

An HT Control field indicates the BSR control subfield variant. The format of the BSR control subfield variant is explained in FIG. 52. The non-AP STA (transmitter) sets this field to indicate the type of BSR and the corresponding buffer status of the non-AP STA. The AP receiving this frame thus knows the current buffer status of the non-AP STA and the QoS requirement of the buffer. The AP then can schedule the transmissions to satisfy the QoS requirement of the buffer. In at least one embodiment the HT control field carries other subfield variants as defined in IEEE 802.11 which can be used by the receiver.

A TXOP sharing Indication field indicates whether the RTF frame is used for launching a TXOP sharing. This field can be implemented as a one-bit indication. When the transmitter sets this bit to a first state (e.g., "1"), then the RTF frame indicates the start of TXOP sharing. The receiver will transmit the trigger frame as requested in the Trigger Type field to start TXOP sharing. The receiver may arrange the following transmissions in the shared TXOP. If the transmitter is set to a second state (e.g., "0"), then this frame is only for a trigger frame request. The receiver only needs to send the trigger frame as requested by the transmitter.

A TXOP sharing duration indicates the time for TXOP sharing. When the TXOP sharing indication is set to a first state (e.g., "1"), then the receiver is able to arrange the transmissions during the TXOP sharing duration. When the TXOP sharing indication is set to a second state (e.g., "0"), then this field is reserved.

A Trigger Type field indicates the type of trigger frame the transmitter requests the receiver to send. The receiver will send the trigger frame whose type is indicated in the Trigger Type field. For example, if this field is set to indicate the P2P trigger frame, the receiver will send a P2P trigger frame.

A Common Info field indicates the suggested parameter settings in the requested trigger frame. The format of the common Info field is shown in FIG. 9. The receiver can use the suggested parameters in this field to set the common info field of the corresponding TF. It should be appreciated that the receiver may not use the same parameter setting in the common info field.

A User info field indicates the suggested parameter settings in the requested trigger frame. The format of the user info field is seen in FIG. 10. The receiver can use the suggested parameters in this field to set one of the user info fields of the corresponding TF. In at least one embodiment a rule can be made that the receiver must use the suggested parameters in this field to set one of the user info fields of the corresponding TF. In at least one embodiment a rule can be made that the receiver may not use the same parameter setting in the use info field of the corresponding TF.

A Requested time field indicates the time requested by the STA to access the channel upon receiving the TF from the AP. The STA calculates this time to satisfy its data transmission to the AP. The AP upon receiving this field sends a TF and assigns the resources to this STA for the requested amount of time. If this field is available (not reserved) it assumes that the user will use frequency resource defined in the user field or the requested frequency resources field if is used (not reserved)

A Requested frequency resources field (if not reserved) indicates the amount of frequency resources (RUs or Channels) requested by the STA to use after receiving the TF. The STA calculates the amount of resources to satisfy its data transmission to the AP. The AP upon receiving this field sends a TF and assigns the requested frequency resources to this STA. If this field is available it overrides the info in the user field. This field is optional and is enabled by the Requested frequency resources field.

A Requested frequency resources indication is preferably a one bit to indicate if the user field is used to define the requested frequency resources or the Requested frequency resources field. The STA sets this field to a first state (e.g., "1") if it is requesting the resources through setting the Requested frequency resources field and sets it to zero if the STA is requesting resources through the user field. The AP upon receiving this field reads the requested resources from the STA from either the Requested frequency resources field or the User Field. The AP should assign resources to the STA in the TF according to the requested frequency resources.

Figure 56:
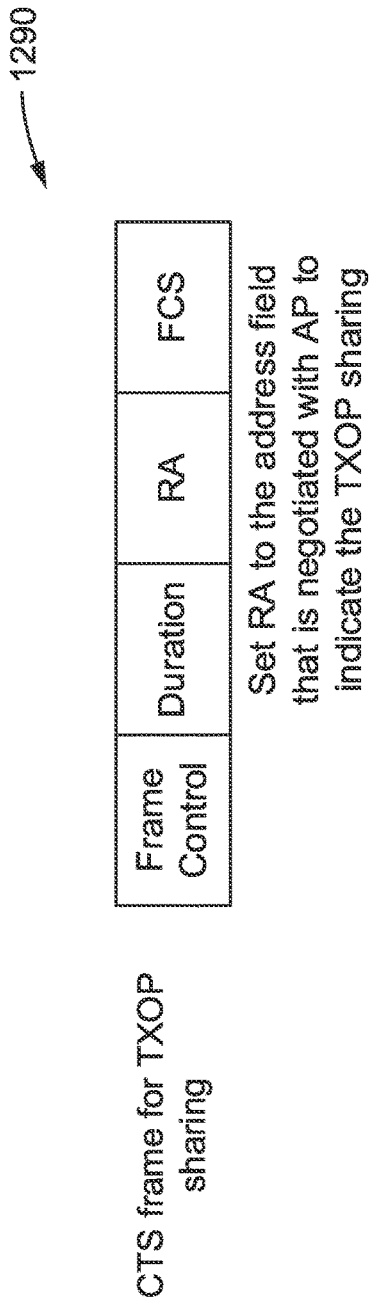
FIG. 56 is a data field diagram of a CTS frame format for TXOP sharing according to at least one embodiment of the present disclosure.

FIG. 56 illustrates an example embodiment 1290 of a format of CTS frame for TXOP sharing. The Frame Control field indicates the type of frame. A Duration field contains NAV information used for CSMA/CA channel access. A RA field contains an address for the recipient of the frame. When the BSR frame is used to indicate the start of a TXOP sharing, the non-AP STA (transmitter) can set the RA to a special address that is prefixed and negotiated with the AP. The special address can be recognized by the AP (receiver) that this frame is for TXOP sharing.

Figure 57:
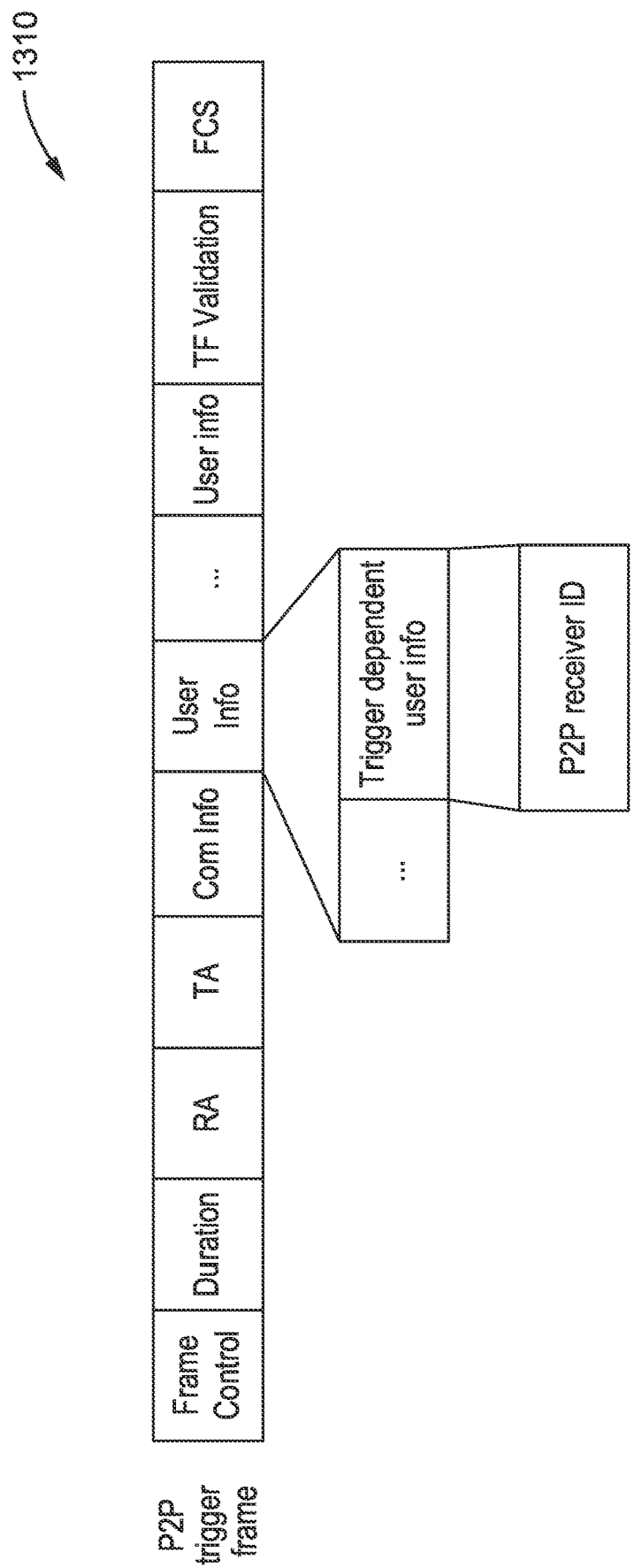
FIG. 57 is a data field diagram of a P2P trigger frame format and its dependent user info field according to at least one embodiment of the present disclosure.

FIG. 57 illustrates an example embodiment 1310 of the content in a P2P trigger frame, having the following fields. A Frame Control field indicates the type of frame. A Duration field contains NAV information used for CSMA/CA channel access. A RA field contains an address for the recipient of the frame. A TA field contains the address of the STA that transmitted the frame. A Common Info field includes the information for all allocated STAs, which is shown in FIG. 9.

A User Info field includes the information for each STA, which is shown in FIG. 10. Especially, the Trigger dependent Common Info field in the User Info field carries the P2P receiver ID. The transmitter of the P2P-TF sets this field to indicate the receiver of the P2P transmission that will be triggered by the P2P trigger frame.

If the receiver of the user info field is non-AP and P2P receiver ID represents a non-AP, then the receiver of the user info field transmits a packet to the receiver indicated by the P2P receiver ID.

If the receiver of the user info field is AP and P2P receiver ID represents a non-AP, then the AP transmits a downlink packet to the receiver indicated by the P2P receiver ID.

If the receiver of the user info field is non-AP and P2P receiver ID represents an AP, then the receiver of the user info field transmits an uplink packet to the AP.

A TF Validation field is set to indicate the time during which multiple PPDUs can be triggered by the TF using the channel resource allocated in the TF. The receiver receiving this field is triggered to send multiple PPDUs using the channel resource allocated in the TF. That is, one TF triggers multiple transmissions during TF Validation time. In at least one embodiment this field is set to indicate the number of the PPDUs that could be triggered by this TF. The receiver receiving this field is triggered to send multiple PPDUs whose number is indicated in the field. Those PPDUs follows the channel resource allocated in the TF. It should be appreciated that this field could be used by any type of TF; examples of which are provided in FIG. 29 and FIG. 57.

The Common Info field and the User Info field provide the separate resource block allocation information to each user.

It should be appreciated that the TF Validation field could be subfields in the common info field.

Figure 58:
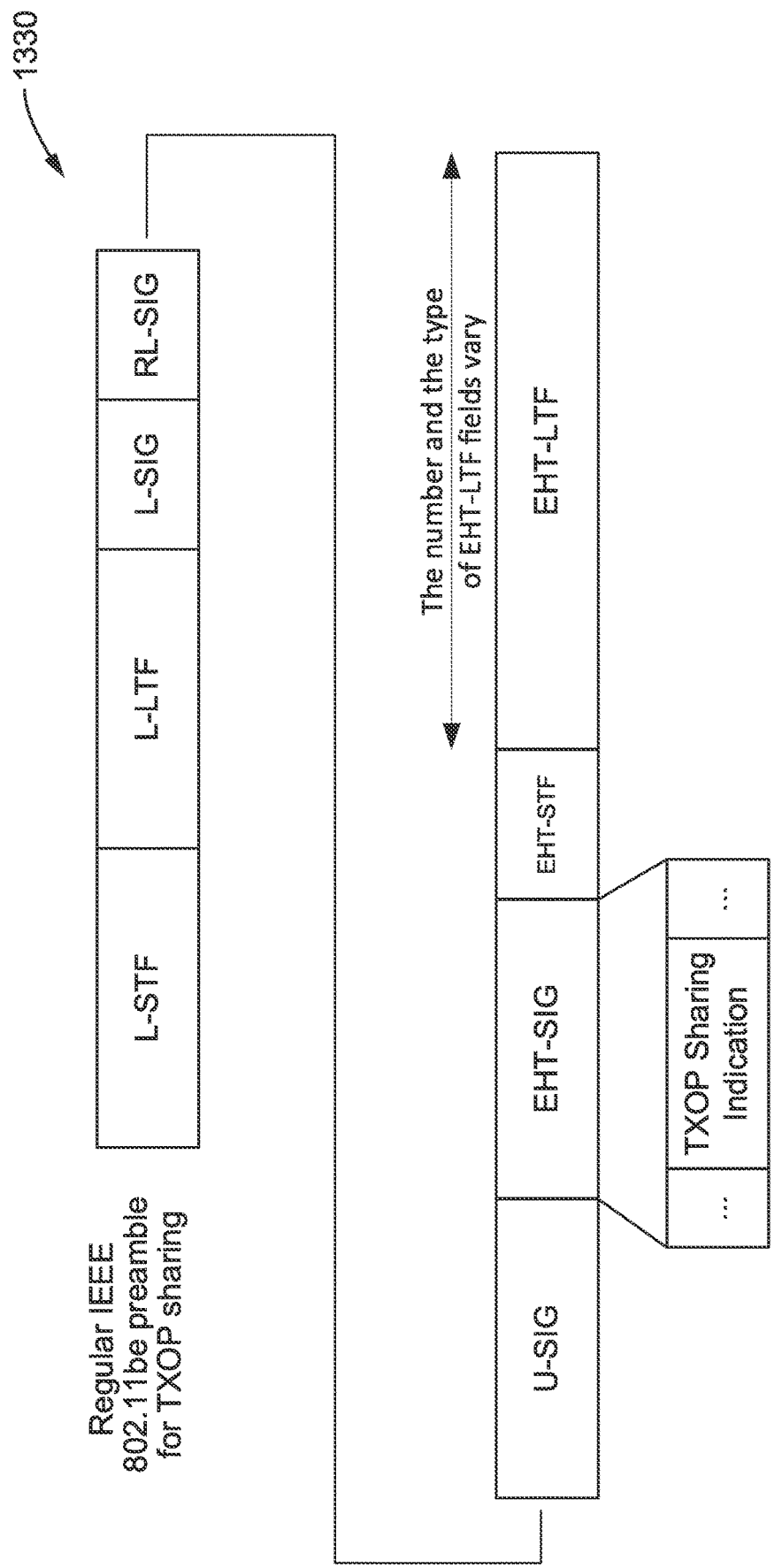
FIG. 58 is a data field diagram of a format for the preamble when indicating TXOP sharing according to at least one embodiment of the present disclosure.

FIG. 58 illustrates an example embodiment 1330 of the regular IEEE 802.11be preamble format that can be used according to the present disclosure for MU-BSR to indicate TXOP sharing, and has the following fields. An L-STF field indicates the non-HT short training field. An L-LTF field indicates the non-HT long training field. An L-SIG field indicates the non-HT SIGNAL field. An RL-SIG field indicates the repeated non-HT SIGNAL field. A U-SIG field indicates the EHT universal field. An EHT-SIG field indicates the EHT SIGNAL field.

In the EHT-SIG field, there can be a TXOP sharing Indication field. TXOP sharing Indication field indicates whether the preamble is used for launching a TXOP sharing. This field may comprise a one-bit indication. For example, when the transmitter sets this bit to a first state (e.g., "1"), then the preamble indicate the start of TXOP sharing, wherein the receiver will start TXOP sharing. The receiver may arrange the transmissions in the shared TXOP. If the transmitter is set to a second state (e.g., "0"), then this preamble is not for TXOP sharing.

An EHT-STF field indicates the EHT short training field. An EHT-LTF filed indicates EHT long training field.

5. General Scope of Embodiments

The enhancements described in the presented technology can be readily implemented within various wireless network communication stations. It should also be appreciated that wireless network communication stations are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

It will also be appreciated that the computer readable media (memory storing instructions) in these computations systems is "non-transitory", which comprises any and all forms of computer-readable media, with the sole exception being a transitory, propagating signal. Accordingly, the disclosed technology may comprise any form of computer-readable media, including those which are random access (e.g., RAM), require periodic refreshing (e.g., DRAM), those that degrade over time (e.g., EEPROMS, disk media), or that store data for only short periods of time and/or only in the presence of power, with the only limitation being that the term "computer readable media" is not applicable to an electronic signal which is transitory.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely, such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations which include, but are not limited to, the following:

An apparatus for wireless communication in a network, comprising: (a) a wireless communication circuit configured as a station for wirelessly communicating with at least one other station on a network using Carrier-Sense Multiple- Access Collision Avoidance (CSMA/CA); (b) a processor coupled to said station; and (c) a non-transitory memory storing instructions executable by the processor; (d) wherein said instructions, when executed by the processor, perform a communications protocol for said station and other stations on the network operating as either an Access Point (AP) station or non-AP stations, and wherein a transmit opportunity (TXOP) obtained by a non-Access Point (non-AP) station is shared with other stations through using an Access Point (AP) station of a basic-service-set (BSS), by performing steps comprising: (d)(i) receiving messaging at the station operating as an access point (AP) from a non-AP station that has obtained the TXOP, with said messaging informing the AP station on sharing the TXOP within the BSS; (d)(ii) obtaining buffer status and Quality-of-Service (QoS) requirements, by the station operating as an AP, of buffers associated with said at least one other station; and (d)(iii) wherein the station operating an as AP performs as TXOP holder instead of the non-AP station that has obtained the TXOP during the shared TXOP, to satisfy the QoS requirements of the buffer reported by the at least one other station.

An apparatus for wireless communication in a network, comprising: (a) a wireless communication circuit configured as a station for wirelessly communicating packets with at least one other station on a network using Carrier-Sense Multiple-Access Collision Avoidance (CSMA/CA); (b) a processor coupled to said station; and (c) a non-transitory memory storing instructions executable by the processor; (d) wherein said instructions, when executed by the processor, perform a communications protocol for said station and other stations on the network operating as either an Access Point (AP) station or non-AP stations, and wherein a transmit opportunity (TXOP) obtained by a non-Access Point (non-AP) station is shared with other stations through using an Access Point (AP) station of a basic-service-set (BSS), by performing steps comprising: (d)(i) embedding suggested parameter setting of a Trigger Frame (TF) in a Request Trigger Frame (RTF) to indicate its Quality-of-Service (QoS) requirements, by the station operating as a non-AP STA, and sending the RTF to its associated AP; (d)(i) receiving the RTF, by the station operating as the AP, and sending the TF as requested by the non-AP STA to trigger the transmissions of the non-AP STA as well as other non-AP STAs; and (d)(iii) wherein in response to receiving the TF from the AP, the non-AP STAs commence their transmissions as triggered by the AP.

An apparatus for wireless communication in a network, comprising: (a) a wireless communication circuit configured as a station for wirelessly communicating with at least one other station on a network using Carrier-Sense Multiple-Access Collision Avoidance (CSMA/CA), and in which multi-link operations for multi-link devices (MLDs) are applied; (b) a processor coupled to said station; and (c) a non-transitory memory storing instructions executable by the processor; (d) wherein said instructions, when executed by the processor, perform a communications protocol for said station and other stations on the network operating as either an Access Point (AP) station or non-AP stations, and wherein a transmit opportunity (TXOP) obtained by a non-Access Point (non-AP) station is shared with other stations through using an Access Point (AP) station of a basic-service-set (BSS), by performing steps comprising: (d)(i) sending a BSRP frame, by the station which is part of a multi-link device (MLD) and operating as a first AP, on one link to collect the buffer status and Quality-of-Service (QoS) requirement of the buffer from its associated non-AP MLDs; (d)(ii) sharing, by the station which is part of a multi-link device (MLD) and operating as the first AP, the buffer status and QoS requirement of the buffer for its associated non-AP MLDs, with all affiliated APs in multiple links; and (d)(iii) wherein the station operating as an affiliated AP to said first AP uses the buffer status and QoS requirements of the buffer from its associated non-AP MLDs to schedule transmissions.

An apparatus for wireless communication in a network, comprising: (a) a wireless communication circuit configured as a station for wirelessly communicating with at least one other station on a network using Carrier-Sense Multiple-Access Collision Avoidance (CSMA/CA), and in which multi-link operations for multi-link devices (MLDs) are applied; (b) a processor coupled to said station; and (c) a non-transitory memory storing instructions executable by the processor; (d) wherein said instructions, when executed by the processor, perform a communications protocol for said station and other stations on the network operating as either an Access Point (AP) station or non-AP stations, and wherein a transmit opportunity (TXOP) obtained by a non-Access Point (non-AP) station is shared with other stations through using an Access Point (AP) station of a basic-service-set (BSS), by performing steps comprising: (d)(i) accessing the channel, by the station operating as a non-AP station, on a first link and sharing its TXOP with its associated Access Point (AP) which is a station operating as the AP associated with said first link; (d)(ii) contending for the channel, by the station operating as the AP associated with said first link, on a second link and gaining channel access within the TXOP sharing duration on said first link; and (d)(iii) arranging transmissions on both said first link and said second link by the AP associated with said first link.

A wireless communication system/apparatus performing transmission of packets, where CSMA/CA is applied in the system/apparatus, comprising: non-AP STA obtains the TXOP and informs AP to share the TXOP within its BSS; AP of the BSS collects the buffer status and the QoS requirement of the buffer from the STAs; and AP arranges the transmissions during the shared TXOP to satisfy the QoS requirement of the buffer reported by the STAs.

A wireless communication system/apparatus performing transmission of packets, where CSMA/CA is applied in the system/apparatus, comprising: non-AP STA sends a request trigger frame (RTF) to its associated AP; the non-AP STA embeds the suggested parameter setting of TF in the RTF; and AP receives the RTF and sends the TF as requested by STA.

A wireless communication system/apparatus performing transmission of packets, where CSMA/CA and multi-link operation are applied, comprising: AP MLD sends BSRP frame on one link to collect the buffer status and QoS requirement of the buffer from its associated non-AP MLDs; AP MLD shares the buffer status and QoS requirement of the buffer of its associated non-AP MLDs with all its affiliated APs in multiple links; and each affiliated AP use the buffer status and QoS requirement of the buffer from its associated non-AP MLDs to schedule the transmissions.

A wireless communication system/apparatus performing transmission of packets, where CSMA/CA and multi-link operation are applied, comprising: non-AP STA accesses the channel on one link (denoted by link1) and shares its TXOP with its associated AP; the AP MLD of the associated AP contends the channel on another link (denoted by link2) and gains the channel access within the TXOP sharing duration on link1; the AP MLD arranges the transmissions on both of Link1 and Link2.

The apparatus of any preceding implementation, wherein said messaging received at the station operating as an AP, from the station operating as a non-AP station, on sharing its TXOP is prefixed with content carrying duplicate information about sharing the TXOP, toward eliminating communication errors, when the station operating as the AP processes the information on TXOP sharing.

The apparatus of any preceding implementation, wherein the station operating as a non-AP STA sharing its TXOP sends a frame to the station operating as an AP, wherein the preamble of the frame is prefixed with identical information for indicating TXOP sharing and payload carrying buffer status as transmitted by a random RU.

The apparatus of any preceding implementation, wherein the station operating as a non-AP STA sharing its TXOP sends a frame to the station operating as the AP whose receiver address is prefixed and negotiated with the station operating as the AP to indicate TXOP sharing and allowing the station operating as the AP to be the TXOP holder.

The apparatus of any preceding implementation, wherein the station operating as a non-AP STA sharing its TXOP sends a Clear-to-Send (CTS) frame to the station operating as the AP to indicate TXOP sharing and allowing the station operating as the AP to be the TXOP holder.

The apparatus of any preceding implementation, wherein the station operating as a non-AP STA sharing its TXOP sends a Buffer Status Report (BSR) frame to the station operating as the AP to indicate TXOP sharing and allowing the station operating as the AP to be the TXOP holder.

The apparatus of any preceding implementation, wherein the station operating as the AP station collecting buffer status from the at least one other station sends a Buffer Status Report Poll (BSRP) trigger frame to request the buffer status and the QoS requirement of the buffer from the at least one other station.

The apparatus of any preceding implementation, wherein the station operating as the non-AP station reporting buffer status to the AP station can send different types of Buffer Status Report (BSR) frames to report the buffer status and the QoS requirement of the buffer.

The apparatus of any preceding implementation, wherein the station operating as a non-AP STA reporting buffer status to the AP station reports expiration time of the buffered traffic.

The apparatus of any preceding implementation, wherein the station operating as a non-AP STA reporting buffer status to the AP station reports buffered traffic for peer-to-peer transmissions.

The apparatus of any preceding implementation, wherein the station operating as the AP station is configured for arranging the transmissions during the shared TXOP performs arranging peer-to-peer transmission by allocating a portion of the channel time for peer-to-peer transmissions.

The apparatus of any preceding implementation, wherein the station operating as the AP station is configured for arranging the transmissions by taking over TXOP and acting as TXOP holder during the shared TXOP and then arranges a multi-user transmission including downlink transmission and any peer-to-peer transmissions.

The apparatus of any preceding implementation, wherein the station operating as the AP station is configured for arranging the transmissions by taking over TXOP and acting as TXOP holder during the shared TXOP and then arranges a multi-user transmission including uplink transmission and any peer-to-peer transmissions.

The apparatus of any preceding implementation, wherein the station operating as a non-AP STA sending the request trigger frame (RTF) can embed buffer status report in RTF.

The apparatus of any preceding implementation, wherein the station operating as a non-AP STA sending the request trigger frame (RTF) can provide an indication to allow TXOP sharing.

The apparatus of any preceding implementation, wherein the non-AP station sharing said QoS requirement of the buffer also includes information on the expiration time of the buffer.

The apparatus of any preceding implementation, wherein the non-AP station sharing the buffer status also shares the buffer status of a P2P transmission.

The apparatus of any preceding implementation, wherein the AP gaining channel access on the second link sends a Clear To Send to self (CTS-to-self) frame to reserve the TXOP.

The apparatus of any preceding implementation, wherein the AP gaining channel access on the second link sends a Clear To Send to self (CTS-to-self) frame which incorporates padding to align the Physical-layer Protocol Data Unit (PPDU) end time on both first and second links.

The apparatus of any preceding implementation, wherein the AP arranging transmissions on both first and second links sends a Buffer Status Report (BSRP) frame to collect the buffer status and the Quality-of-Service (QoS) requirement of the buffer from non-AP STAs.

The apparatus of any preceding implementation, wherein any non-AP STA sharing its TXOP could send a frame to AP whose content is prefixed and the same.

The apparatus of any preceding implementation, wherein any non-AP STA sharing its TXOP could send a frame to AP whose preamble is prefixed and the same and payload is transmitted by a random RU.

The apparatus of any preceding implementation, wherein any non-AP STA sharing its TXOP could send a frame to AP whose receiver address is prefixed and negotiated with AP to indicate the frame is for TXOP sharing.

The apparatus of any preceding implementation, wherein any non-AP STA sharing its TXOP could send a CTS frame to AP to indicate the TXOP sharing.

The apparatus of any preceding implementation, wherein any non-AP STA sharing its TXOP could send a BSR frame to AP to indicate the TXOP sharing.

The apparatus of any preceding implementation, wherein AP collecting buffer status from the STAs could send a BSRP trigger frame to request the buffer status and the QoS requirement of the buffer from the STAs.

The apparatus of any preceding implementation, wherein non-AP STA reporting buffer status to AP could send different types of BSR frame to report the buffer status and the QoS requirement of the buffer.

The apparatus of any preceding implementation, wherein non-AP STA reporting buffer status to AP could report the expiration time of the buffered traffic.

The apparatus of any preceding implementation, wherein non-AP STA reporting buffer status to AP could report the buffered traffic for peer-to-peer transmission.

The apparatus of any preceding implementation, wherein AP arranging the transmissions during the shared TXOP could arrange the peer-to-peer transmission.

The apparatus of any preceding implementation, wherein AP arranging the transmissions during the shared TXOP could arrange a multi-user transmission including downlink transmission and the peer-to-peer transmission.

The apparatus of any preceding implementation, wherein AP arranging the transmissions during the shared TXOP could arrange a multi-user transmission including uplink transmission and the peer-to-peer transmission.

The apparatus of any preceding implementation, wherein a non-AP STA sending a request trigger frame (RTF) could embed buffer status report in RTF.

The apparatus of any preceding implementation, wherein a non-AP STA sending a request trigger frame (RTF) could indicate to allow the TXOP sharing.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

User Priority to Access Category (UP to AC) mapping

| Priority | User Priority (UP) | IEEE 802.1D designation | Transmit queue | AC |
|---|---|---|---|---|
| Low | 1 | Background (BK) | BK | BK |
| ↓ | 2 | Spare (—) | BK | BK |
|  | 0 | Best Effort (BE) | BE | BE |
|  | 3 | Excellent Effort (EE) | BE | BE |
|  | 4 | Control Load (CL) | A_VI | VI |
|  | 5 | Video (VI) | VI | VI |
|  | 6 | Voice (VO) | VO | VO |
| High | 7 | Network Control (NC) | A_VO | VO |

TABLE 2

Default Parameter Settings for EDCA Channel Access

| AC | CWmin | CWmax | AIFSN | TXOP limit (mS) |
|---|---|---|---|---|
| BK | 15 | 1023 | 7 | 0 |
| BE | 15 | 1023 | 3 | 0 |
| VI | 7 | 15 | 2 or 1 (AP) | 3 |
| VO | 3 | 7 | 2 or 1 (AP) | 1.5 |

What is claimed is:

1. An apparatus for wireless communication in a network as a station, comprising:
   (a) wherein the station is configured for wirelessly communicating with other stations on a network using Carrier-Sense Multiple-Access Collision Avoidance (CSMA/CA);
   (b) a processor within said station; and
   (c) a non-transitory memory storing instructions executable by the processor;
   (d) wherein said instructions, when executed by the processor, perform a communications protocol, in which the station is operating as either an Access Point (AP) of a basic-service-set (BSS), or a first non-AP station within non-AP stations operating on the BSS, and wherein a transmit opportunity (TXOP) obtained by the first non-AP station is shared with one or more non-AP stations on the network through using the AP, by performing steps comprising:
      (i) receiving messaging at the AP from the first non-AP station that has obtained the TXOP, with said messaging informing the AP on sharing the TXOP within the BSS; wherein said messaging is prefixed with content carrying duplicate information about sharing the TXOP, toward eliminating communication errors, when the AP processes the information on TXOP sharing;
      (ii) receiving a buffer status report (BSR) including Quality-of-Service (QoS) requirements from non-AP stations operating on the BSS indicating the requirements of its respective buffer; and
      (iii) wherein the station operating as the AP performs as TXOP holder instead of the first non-AP station that has obtained the TXOP during the shared TXOP, to satisfy the QoS requirements of the respective buffer as reported by non-AP stations operating on the BSS.

2. The apparatus of claim 1, wherein the preamble of the messaging from the first non-AP station on sharing its TXOP contains information for indicating TXOP sharing and payload carrying buffer status; wherein this information has been prefixed by a previous negotiation containing identical information on TXOP sharing and payload carrying buffer status as transmitted through a random resource unit (RU).

3. The apparatus of claim 1, wherein the first non-AP station prior to sharing its TXOP sends a frame to the AP, whose receiver address is prefixed and negotiated, to indicate TXOP sharing and thus allowing the AP to determine which station is to obtain and share the TXOP within the BSS.

4. The apparatus of claim 1, wherein the first non-AP station sharing its TXOP sends a buffer status report (BSR) frame to the AP to indicate TXOP sharing and allowing the AP to become the TXOP holder by sending a Clear-to-Send (CTS) frame to the AP to indicate TXOP sharing and allowing the AP station to become the TXOP holder.

5. The apparatus of claim 1, wherein the AP in collecting buffer status from non-AP stations operating on the BSS, sends a buffer status report poll (BSRP) trigger frame to request buffer status and QoS requirements from each of the one or more non-AP stations operating on the BSS, regarding its respective buffer.

6. The apparatus of claim 1, wherein buffer status being reported to the AP uses different types of buffer status report (BSR) frames, which are either for peer-to-peer transmissions or real time application transmissions, to report its buffer status and the QoS requirements.

7. The apparatus of claim 6, wherein buffer status being reported for the real time application transmissions to the AP contains an expiration time of buffered traffic.

8. The apparatus of claim 6, wherein buffer status being reported for peer-to-peer transmission to the AP contains information on the buffer used for peer-to-peer transmissions.

9. The apparatus of claim 1, wherein the AP is configured for arranging the transmissions during the shared TXOP by allocating a portion of the channel time for peer-to-peer transmissions.

10. The apparatus of claim 1, wherein the AP is configured for arranging the transmissions by taking over the TXOP and acting as TXOP holder during the shared TXOP and then for arranging a multi-user transmission including downlink transmissions and any peer-to-peer transmissions.

11. The apparatus of claim 1, wherein the AP is configured for arranging the transmissions by taking over the TXOP and acting as TXOP holder during the shared TXOP and then for arranging a multi-user transmission including uplink transmissions and any peer-to-peer transmissions.

12. The apparatus of claim 1, wherein said apparatus supports latency requirements of real time application (RTA) traffic, which is packetized as RTA packets when transmitted, within the network in which RTA packets and non-RTA packets coexist.

13. The apparatus of claim 1, wherein to support the QoS requirements of the respective buffer, the AP, which is performing as the TXOP holder, arranges transmissions thus ordering and scheduling transmissions during the shared TXOP.

14. The apparatus of claim 13, wherein said transmissions being arranged comprise transmissions between non-AP stations, as peer-to-peer (P2P) transmissions, performed during the shared TXOP, and wherein a BSR for ordering P2P transmissions reports the buffer for P2P traffic which includes a P2P receiver identification.

15. The apparatus of claim 13:
wherein said transmissions being arranged comprises a transmission that has latency requirements of real time application (RTA) traffic which is packetized as RTA packets when transmitted, within the network in which RTA packets and non-RTA packets coexist, and in which an RTA identification (RTA ID) is used to identify the RTA traffic;
wherein said BSR for RTA traffic comprises an RTA ID to which each QoS requirement of RTA traffic under the same traffic specification is linked, and parameters for the RTA traffic including expiration time; and
wherein said TXOP sharing considers time-validity of RTA traffic and minimizes RTA packet latency in a wireless network where RTA and non-RTA traffic coexist.

16. An apparatus for wireless communication in a network as a station, comprising:
(a) wherein the station is configured for wirelessly communicating with other stations on a network using Carrier-Sense Multiple-Access Collision Avoidance (CSMA/CA);
(b) a processor within said station; and
(c) a non-transitory memory storing instructions executable by the processor;
(d) wherein said instructions, when executed by the processor, perform a communications protocol, in which the station is operating as either an Access Point (AP) of a basic-service-set (BSS) or a first non-AP station within non-AP stations operating on the BSS, and wherein a transmit opportunity (TXOP) obtained by the first non-AP station is shared with one or more of the non-AP stations on the network through using the AP, by performing steps comprising:
(i) receiving messaging at the AP from the first non-AP station that has obtained the TXOP, with said messaging informing the AP on sharing the TXOP within the BSS;
(ii) wherein the first non-AP station prior to sharing its TXOP sends a frame to the AP, whose receiver address is prefixed and negotiated, to indicate TXOP sharing and thus allowing the AP to determine which station is to obtain and share the TXOP within the BSS;
(iii) receiving a buffer status report (BSR) including Quality-of-Service (QoS) requirements from non-AP stations operating on the BSS indicating the requirements of its respective buffer, by the station operating as an Access Point (AP) station; and
(iv) wherein the AP performs as TXOP holder instead of the first non-AP station that has obtained the TXOP during the shared TXOP, to satisfy the QoS requirements of the respective buffer as reported by one or more of the non-AP stations operating on the BSS.

17. An apparatus for wireless communication in a network as a station, comprising:
(a) wherein the station is configured for wirelessly communicating with other stations on a network using Carrier-Sense Multiple-Access Collision Avoidance (CSMA/CA);
(b) a processor within said station; and
(c) a non-transitory memory storing instructions executable by the processor;
(d) wherein said instructions, when executed by the processor, perform a communications protocol, in which the station is operating as either an Access Point (AP) of a basic-service-set (BSS), or a first non-AP station within non-AP stations operating on the BSS, and wherein a transmit opportunity (TXOP) obtained by the first non-AP station is shared with one or more of the non-AP stations on the network through using the AP, by performing steps comprising:
(i) receiving messaging at the AP from the first non-AP station that has obtained the TXOP, with said messaging informing the AP on sharing the TXOP within the BSS by sending a Clear-to-Send (CTS) frame to the AP to indicate TXOP sharing and allowing the AP station to become the TXOP holder;
(ii) wherein the first non-AP station intending to share its TXOP, sends a buffer status report (BSR) frame to the AP to indicate TXOP sharing and allowing the AP to become the TXOP holder;
(iii) receiving a buffer status report (BSR) including Quality-of-Service (QoS) requirements from non-AP stations operating on the BSS indicating the requirements of its respective buffer, by the AP; and
(iv) wherein the AP performs as TXOP holder instead of the first non-AP station that has obtained the TXOP during the shared TXOP, to satisfy the QoS requirements of the respective buffer as reported by non-AP stations operating on the BSS.

18. An apparatus for wireless communication in a network as a station, comprising:
(a) wherein the station is configured for wirelessly communicating with other stations on a network using Carrier-Sense Multiple-Access Collision Avoidance (CSMA/CA);
(b) a processor within said station; and
(c) a non-transitory memory storing instructions executable by the processor;
(d) wherein said instructions, when executed by the processor, perform a communications protocol, in which the station is operating as either an Access Point (AP) station or the first non-AP station, and wherein a transmit opportunity (TXOP) obtained by the first non-AP station is shared with non-AP stations on the network through using AP, by performing steps comprising:
(i) receiving messaging at the AP from the first non-AP station that has obtained the TXOP, with said messaging informing the AP on sharing the TXOP within the BSS;
(ii) receiving a buffer status report (BSR) including Quality-of-Service (QoS) requirements from non-AP stations operating on the BSS, indicating the requirements of its respective buffer, by the AP;
(iii) wherein the AP performs as TXOP holder instead of the first non-AP station that has obtained the TXOP during the shared TXOP, to satisfy the QoS requirements of the respective buffer as reported by non-AP stations operating on the BSS; and (iv) wherein the AP is configured for arranging the transmissions by taking over the TXOP and acting as TXOP holder during the shared TXOP and then arranges either (a) multi-user transmissions including downlink transmissions and any peer-to-peer transmissions, or (b) multi-user transmissions including uplink transmissions and any peer-to-peer transmissions.

* * * * *